# United States Patent [19]

Speakman et al.

[11] Patent Number: 5,991,741
[45] Date of Patent: Nov. 23, 1999

[54] IN$ITE: A FINANCE ANALYSIS MODEL FOR EDUCATION

[75] Inventors: Sheree Teresa Speakman, Highland Park, Ill.; Jay Frank May, New Freedom, Pa.

[73] Assignee: Fox River Holdings, L.L.C., Batavia, Ill.

[21] Appl. No.: 08/803,991

[22] Filed: Feb. 21, 1997

Related U.S. Application Data

[60] Provisional application No. 60/012,099, Feb. 22, 1996.

[51] Int. Cl.$^6$ .................................................. G06F 17/60
[52] U.S. Cl. .................................................. 705/30; 705/8
[58] Field of Search ................................. 705/1, 7, 8, 30, 705/35, 36; 707/7, 100, 104, 205, 563, 504, 517; 434/107

[56] References Cited

U.S. PATENT DOCUMENTS

| | | | |
|---|---|---|---|
| 3,749,892 | 7/1973 | Stenning | 235/150.5 |
| 4,346,442 | 8/1982 | Musmanno | 364/408 |
| 4,462,767 | 7/1984 | Lerner | 364/406 |
| 4,648,038 | 3/1987 | Roberts et al. | 364/408 |
| 4,694,397 | 9/1987 | Grant et al. | 364/408 |
| 4,736,294 | 4/1988 | Gill et al. | 364/408 |
| 4,787,036 | 11/1988 | Fleming | 364/401 |
| 4,839,804 | 6/1989 | Roberts et al. | 364/408 |
| 4,953,085 | 8/1990 | Atkins | 364/408 |
| 5,056,019 | 10/1991 | Schultz et al. | 364/405 |
| 5,117,356 | 5/1992 | Marks | 364/406 |
| 5,132,899 | 7/1992 | Fox | 364/408 |
| 5,189,608 | 2/1993 | Lyons et al. | 364/408 |
| 5,191,522 | 3/1993 | Bosco et al. | 364/401 |
| 5,227,967 | 7/1993 | Bailey | 364/408 |
| 5,262,942 | 11/1993 | Earle | 364/408 |
| 5,381,332 | 1/1995 | Wood | 364/401 |
| 5,390,113 | 2/1995 | Sampson | 364/419.19 |
| 5,799,286 | 8/1998 | Morgan et al. | 705/7 |

OTHER PUBLICATIONS

News Release "HP and Pentamation Announce Information–Systems Software for K–12 Districts" No Author, Dec. 1990.

Greenfield, "Administrative Modules: Giving Education a Helping Hand" The Journal v. 20 n11 p. 12(4), Jun. 1993.

*Primary Examiner*—Melanie A. Kemper
*Attorney, Agent, or Firm*—Jenkens & Gilchrist, A Professional Corporation

[57] ABSTRACT

An advanced software package for cost accounting and analysis, management reporting, performance assessment and decision support tool is described. The IN$ITE™ software package collects, organizes, manages and consolidates financial data and permits the standardized evaluation and comparison of different educational institutions. The software package implements the Finance Analysis Model For Education as a relational database for the efficient and cost-effective management of educational institutions.

Financial data is organized into three dimensions: Functions, Programs and Locations. IN$ITE has five Functions which are subdivided into 15 Subfunctions and further divided into 32 Detail Functions, each of which provides greater clarity of fund use. The Program Dimension of IN$ITE permits the identification and determination of the costs of various special programs within the school system. The Organizational (or Locational) Dimension of IN$ITE comprises three levels: Expenses that are to be charged to the central location, to various school-sites, or to be retained as non-allocated expenses. IN$ITE also permits reporting of decision-support data by school-site or cost-center.

30 Claims, 50 Drawing Sheets

A-1. Total District - Functions

Total District

$42,171,873   100.0%

Instruction

$21,942,073   52.0%

Instructional Support

$4,260,739   10.1%

Operations

$6,585,892   15.6%

Other Commitments

$5,637,859   13.4%

Leadership

$3,745,311   8.9%

Anywhere Public School District  
Printed: 2/07/97 by John Anybody

Page 1 of 1

1994-1995 Actual  
Summary Generated: 11/23/96

*FIG. 27*

A-2. Total District - Sub-Functions

| | | | |
|---|---|---|---|
| Total District | | $42,171,873 | |
| | | 100.0% | |

| Instruction | $21,942,073 52.0% | Face-to-Face Teaching | $20,649,291 49.0% |
| | | Classroom Materials | $1,292,782 3.1% |
| Instructional Support | $4,260,739 10.1% | Pupil Support | $3,201,620 7.6% |
| | | Teacher Support | $873,455 2.1% |
| | | Program Support | $185,663 0.4% |
| Operations | $6,585,892 15.6% | Non-Instructional Pupil Services | $3,374,785 8.0% |
| | | Facilities | $2,571,815 6.1% |
| | | Business Services | $639,293 1.5% |
| Other Commitments | $5,637,859 13.4% | Contingencies | $0 0.0% |
| | | Capital | $5,552,703 13.2% |
| | | Out-of-District Obligations | $85,156 0.2% |
| | | Legal Obligations | $0 0.0% |
| Leadership | $3,745,311 8.9% | School Management | $2,638,205 6.3% |
| | | Program/Operations Management | $615,581 1.5% |
| | | District Management | $491,524 1.2% |

Anywhere Public School District  
Printed: 2/07/97 by John Anybody  
Page 1 of 1  
1994-1995 Actual  
Summary Generated: 11/23/96

A-3. Total District – Detail Functions

| Number of Pupils 7,990 | FAM Code | Total District | Per Pupil | % to Total District |
|---|---|---|---|---|
| Total District | | $42,171,873 | $5,278 | 100.0% |
| Instruction | 100 | 21,942,073 | $2,746 | 52.0% |
| Face-to-Face Teaching | 110 | 20,649,291 | $2,584 | 49.0% |
| Instructional Teachers | 111 | 18,897,221 | $2,365 | 44.8% |
| Substitutes | 112 | 429,194 | $54 | 1.0% |
| Instructional Paraprofessionals | 113 | 1,322,876 | $166 | 3.1% |
| Classroom Materials | 120 | 1,292,782 | $162 | 3.1% |
| Pupil-Use Technology & Software | 121 | 24,250 | $3 | 0.1% |
| Instructional Materials, Trips & Supplies | 122 | 1,268,532 | $159 | 3.0% |
| Instructional Support | 200 | 4,260,739 | $533 | 10.1% |
| Pupil Support | 210 | 3,201,620 | $401 | 7.6% |
| Guidance & Counseling | 211 | 647,901 | $81 | 1.5% |
| Library & Media | 212 | 672,283 | $84 | 1.6% |
| Extracurricular | 213 | 1,426,533 | $179 | 3.4% |
| Student Health & Services | 214 | 454,903 | $57 | 1.1% |
| Teacher Support | 220 | 873,455 | $109 | 2.1% |
| Curriculum Development | 221 | 621,040 | $78 | 1.5% |
| In-Service, Staff Development & Support | 222 | 252,415 | $32 | 0.6% |
| Sabbaticals | 223 | 0 | $0 | 0.0% |
| Program Support | 230 | 185,663 | $23 | 0.4% |
| Program Development | 231 | 38,756 | $5 | 0.1% |
| Therapists, Psych, Eval, Pers Att. & Soc Workers | 232 | 146,907 | $18 | 0.3% |
| Operations | 300 | 6,585,892 | $824 | 15.6% |
| Non-Instructional Pupil Services | 310 | 3,374,785 | $422 | 8.0% |
| Transportation | 311 | 710,152 | $89 | 1.7% |
| Food Service | 312 | 2,664,633 | $333 | 6.3% |
| Safety | 313 | 0 | $0 | 0.0% |
| Facilities | 320 | 2,571,815 | $322 | 6.1% |
| Building Upkeep, Utilities & Maintenance | 321 | 2,571,815 | $322 | 6.1% |
| Business Services | 330 | 639,293 | $80 | 1.5% |
| Data Processing | 331 | 23,149 | $3 | 0.1% |
| Business Operations | 332 | 616,144 | $77 | 1.5% |
| Other Commitments | 400 | 5,637,859 | $706 | 13.4% |
| Contingencies | 410 | 0 | $0 | 0.0% |
| Budgeted Contingencies | 411 | 0 | $0 | 0.0% |
| Capital | 420 | 5,552,703 | $695 | 13.2% |
| Debt Service | 421 | 1,044,462 | $131 | 2.5% |
| Capital Projects | 422 | 4,508,241 | $564 | 10.7% |
| Out-of-District Obligations | 430 | 85,156 | $11 | 0.2% |
| Parochial, Pvt, Charter & Public Pass Through | 431 | 0 | $0 | 0.0% |
| Retiree Benefits & Other | 432 | 0 | $0 | 0.0% |
| Enterprise/Community Service Operations | 433 | 85,156 | $11 | 0.2% |
| Legal Obligations | 440 | 0 | $0 | 0.0% |
| Claims & Settlements | 441 | 0 | $0 | 0.0% |
| Leadership | 500 | 3,745,311 | $469 | 8.9% |
| School Management | 510 | 2,638,205 | $330 | 6.3% |
| Principals & Assistant Principals | 511 | 1,942,253 | $243 | 4.6% |
| School Office | 512 | 695,951 | $87 | 1.7% |
| Program/Operations Management | 520 | 615,581 | $77 | 1.5% |
| Deputies, Sr Admin, Rsrchrs & Prog Evaluators | 521 | 615,581 | $77 | 1.5% |
| District Management | 530 | 491,524 | $62 | 1.2% |
| Superintendent & School Board | 531 | 491,524 | $62 | 1.2% |
| Legal | 532 | 0 | $0 | 0.0% |

Anywhere Public School District  
Printed: 2/07/97 by John Anybody  
Page 1 of 1  
1994-1995 Actual  
Summary Generated: 11/23/96

FIG. 30

A-4. Total District – Program Summary $

| | Total District | Special Education | Bilingual /ESL | Chapter 1 /Title 1 | Vocational Education | Other Programs | General Education |
|---|---|---|---|---|---|---|---|
| Total Program | $42,171,873 | $2,998,310 | $0 | $1,046,093 | $1,839,596 | $2,931,723 | $33,356,152 |
| Instruction | 21,942,073 | 2,633,972 | 0 | 863,119 | 1,455,260 | 1,888,128 | 15,101,594 |
| Teaching | 20,649,291 | 2,589,214 | 0 | 856,586 | 1,317,822 | 1,584,911 | 14,300,758 |
| Istrl Teachers | 18,897,221 | 2,366,588 | 0 | 524,412 | 1,301,187 | 1,088,832 | 13,616,204 |
| Substitutes | 429,194 | 31,750 | 0 | 5,717 | 9,150 | 62,527 | 320,051 |
| Instrl Paraprof | 1,322,876 | 190,878 | 0 | 326,457 | 7,485 | 433,552 | 364,503 |
| Classrm Material | 1,292,782 | 44,758 | 0 | 6,533 | 137,439 | 303,217 | 800,836 |
| Pupil Technology | 24,250 | 0 | 0 | 0 | 0 | 24,250 | 0 |
| Instrl Materials | 1,268,532 | 44,758 | 0 | 6,533 | 137,439 | 278,967 | 800,836 |
| Support | 4,260,739 | 143,776 | 0 | 111,886 | 105,007 | 751,918 | 3,148,152 |
| Pupil Support | 3,201,620 | 74,997 | 0 | 48,062 | 105,007 | 360,693 | 2,612,862 |
| Guidance | 647,901 | 0 | 0 | 0 | 0 | 30,695 | 512,199 |
| Library Media | 672,283 | 0 | 0 | 0 | 0 | 65,007 | 607,276 |
| Extracurricular | 1,426,533 | 0 | 0 | 0 | 0 | 0 | 1,426,533 |
| Student Health | 454,903 | 74,997 | 0 | 48,062 | 0 | 264,991 | 66,853 |
| Teacher Support | 873,455 | 5,191 | 0 | 63,824 | 0 | 358,881 | 445,559 |
| Curriculum Dev | 621,040 | 5,191 | 0 | 15,816 | 0 | 312,280 | 287,753 |
| Staff Dev | 252,415 | 0 | 0 | 48,008 | 0 | 46,601 | 157,806 |
| Sabbaticals | 0 | 0 | 0 | 0 | 0 | 0 | 0 |
| Program Support | 185,663 | 63,588 | 0 | 0 | 0 | 32,344 | 89,731 |
| Program Dev | 38,756 | 0 | 0 | 0 | 0 | 32,344 | 6,412 |
| Therapists et al | 146,907 | 63,588 | 0 | 0 | 0 | 0 | 83,319 |
| Operations | 6,585,892 | 107,529 | 0 | 0 | 0 | 23,789 | 6,454,574 |
| Pupil Services | 3,374,785 | 102,122 | 0 | 0 | 0 | 23,589 | 3,249,074 |
| Transportation | 710,152 | 102,122 | 0 | 0 | 0 | 11,106 | 596,925 |
| Food Service | 2,664,633 | 0 | 0 | 0 | 0 | 12,483 | 2,652,149 |
| Safety | 0 | 0 | 0 | 0 | 0 | 0 | 0 |
| Facilities | 2,571,815 | 0 | 0 | 0 | 0 | 200 | 2,571,615 |
| Building Upkeep | 2,571,815 | 0 | 0 | 0 | 0 | 200 | 2,571,615 |
| Busn. Services | 639,293 | 5,408 | 0 | 0 | 0 | 0 | 633,885 |
| Data Processing | 23,149 | 5,408 | 0 | 0 | 0 | 0 | 17,741 |
| Busn. Operations | 616,144 | 0 | 0 | 0 | 0 | 0 | 616,144 |
| Othr Commitme | 5,637,859 | 0 | 0 | 731 | 0 | 70,189 | 5,566,939 |
| Contingencies | 0 | 0 | 0 | 0 | 0 | 0 | 0 |
| Bgt Contingncies | 0 | 0 | 0 | 0 | 0 | 0 | 0 |
| Capital | 5,552,703 | 0 | 0 | 0 | 0 | 0 | 5,552,703 |
| Debt Servc | 1,044,462 | 0 | 0 | 0 | 0 | 0 | 1,044,462 |
| Capital Projects | 4,508,241 | 0 | 0 | 0 | 0 | 0 | 4,508,241 |
| Out-of-District | 85,156 | 0 | 0 | 731 | 0 | 70,189 | 14,236 |
| Pass-Throughs | 0 | 0 | 0 | 0 | 0 | 0 | 0 |
| Retiree Benefits | 0 | 0 | 0 | 0 | 0 | 0 | 0 |
| Enterprise Ops | 85,156 | 0 | 0 | 731 | 0 | 70,189 | 14,236 |
| Legal Obligation | 0 | 0 | 0 | 0 | 0 | 0 | 0 |
| Claims/Setlments | 0 | 0 | 0 | 0 | 0 | 0 | 0 |
| Leadership | 3,745,311 | 113,033 | 0 | 70,357 | 279,329 | 197,699 | 3,084,893 |
| Schl Management | 2,638,205 | 0 | 0 | 0 | 0 | 41,460 | 2,596,745 |
| Principals | 1,942,253 | 0 | 0 | 0 | 0 | 37,134 | 1,905,120 |
| School Office | 695,951 | 0 | 0 | 0 | 0 | 4,327 | 691,625 |
| Prog/Ops Mngt | 615,581 | 113,033 | 0 | 70,357 | 279,329 | 152,790 | 72 |
| Deputies et al | 615,581 | 113,033 | 0 | 70,357 | 279,329 | 152,790 | 72 |
| District Mngt | 491,524 | 0 | 0 | 0 | 0 | 3,449 | 488,076 |
| Superintendnt/Bd | 491,524 | 0 | 0 | 0 | 0 | 3,449 | 488,076 |
| Legal | 0 | 0 | 0 | 0 | 0 | 0 | 0 |

Anywhere Public School District  
Printed: 2/07/97 by John Anybody  
Page 1 of 1  
1994–1995 Actual  
Summary Generated: 11/23/96

FIG. 31

A-5. Total District - Program Summary %

| | Total District | Special Education | Bilingual /ESL | Chapter 1 /Title 1 | Vocational Education | Other Programs | General Education |
|---|---|---|---|---|---|---|---|
| Total Program | $42,171,873 | 7.1% | 0.0% | 2.5% | 4.4% | 7.0% | 79.1% |
| Instruction | 21,942,073 | 12.0% | 0.0% | 3.9% | 6.6% | 8.6% | 68.8% |
| Teaching | 20,649,291 | 12.5% | 0.0% | 4.1% | 6.4% | 7.7% | 69.3% |
| Instrl Teachers | 18,897,221 | 12.5% | 0.0% | 2.8% | 6.9% | 5.8% | 72.1% |
| Substitutes | 429,194 | 7.4% | 0.0% | 1.3% | 2.1% | 14.6% | 74.6% |
| Instrl Paraprof | 1,322,876 | 14.4% | 0.0% | 24.7% | 0.6% | 32.8% | 27.6% |
| Classrm Material | 1,292,782 | 3.5% | 0.0% | 0.5% | 10.6% | 23.5% | 61.9% |
| Pupil Technology | 24,250 | 0.0% | 0.0% | 0.0% | 0.0% | 100.0% | 0.0% |
| Instrl Materials | 1,268,532 | 3.5% | 0.0% | 0.5% | 10.8% | 22.0% | 63.1% |
| Support | 4,260,739 | 3.4% | 0.0% | 2.6% | 2.5% | 17.6% | 73.9% |
| Pupil Support | 3,201,620 | 2.3% | 0.0% | 1.5% | 3.3% | 11.3% | 81.6% |
| Guidance | 647,901 | 0.0% | 0.0% | 0.0% | 16.2% | 4.7% | 79.1% |
| Library Media | 672,283 | 0.0% | 0.0% | 0.0% | 0.0% | 9.7% | 90.3% |
| Extracurricular | 1,426,533 | 0.0% | 0.0% | 0.0% | 0.0% | 0.0% | 100.0% |
| Student Health | 454,903 | 16.5% | 0.0% | 10.6% | 0.0% | 58.3% | 14.7% |
| Teacher Support | 873,455 | 0.6% | 0.0% | 7.3% | 0.0% | 41.1% | 51.0% |
| Curriculum Dev | 621,040 | 0.8% | 0.0% | 2.5% | 0.0% | 50.3% | 46.3% |
| Staff Dev | 252,415 | 0.0% | 0.0% | 19.0% | 0.0% | 18.5% | 62.5% |
| Sabbaticals | 0 | 0.0% | 0.0% | 0.0% | 0.0% | 0.0% | 0.0% |
| Program Support | 185,663 | 34.2% | 0.0% | 0.0% | 0.0% | 17.4% | 48.3% |
| Program Dev | 38,756 | 0.0% | 0.0% | 0.0% | 0.0% | 83.5% | 16.5% |
| Therapists et al | 146,907 | 43.3% | 0.0% | 0.0% | 0.0% | 0.0% | 56.7% |
| Operations | 6,585,892 | 1.6% | 0.0% | 0.0% | 0.0% | 0.4% | 98.0% |
| Pupil Services | 3,374,785 | 3.0% | 0.0% | 0.0% | 0.0% | 0.7% | 96.3% |
| Transportation | 710,152 | 14.4% | 0.0% | 0.0% | 0.0% | 1.6% | 84.1% |
| Food Service | 2,664,633 | 0.0% | 0.0% | 0.0% | 0.0% | 0.5% | 99.5% |
| Safety | 0 | 0.0% | 0.0% | 0.0% | 0.0% | 0.0% | 0.0% |
| Facilities | 2,571,815 | 0.0% | 0.0% | 0.0% | 0.0% | 0.0% | 100.0% |
| Building Upkeep | 2,571,815 | 0.0% | 0.0% | 0.0% | 0.0% | 0.0% | 100.0% |
| Busn. Services | 639,293 | 0.8% | 0.0% | 0.0% | 0.0% | 0.0% | 99.2% |
| Data Processing | 23,149 | 23.4% | 0.0% | 0.0% | 0.0% | 0.0% | 76.6% |
| Busn. Operations | 616,144 | 0.0% | 0.0% | 0.0% | 0.0% | 0.0% | 100.0% |
| Othr Commitme | 5,637,859 | 0.0% | 0.0% | 0.0% | 0.0% | 1.2% | 98.7% |
| Contingencies | 0 | 0.0% | 0.0% | 0.0% | 0.0% | 0.0% | 0.0% |
| Bgt Contingncies | 0 | 0.0% | 0.0% | 0.0% | 0.0% | 0.0% | 0.0% |
| Capital | 5,552,703 | 0.0% | 0.0% | 0.0% | 0.0% | 0.0% | 100.0% |
| Debt Servc | 1,044,462 | 0.0% | 0.0% | 0.0% | 0.0% | 0.0% | 100.0% |
| Capital Projects | 4,508,241 | 0.0% | 0.0% | 0.0% | 0.0% | 0.0% | 100.0% |
| Out-of-District | 85,156 | 0.0% | 0.0% | 0.9% | 0.0% | 82.4% | 16.7% |
| Pass-Throughs | 0 | 0.0% | 0.0% | 0.0% | 0.0% | 0.0% | 0.0% |
| Retiree Benefits | 0 | 0.0% | 0.0% | 0.0% | 0.0% | 0.0% | 0.0% |
| Enterprise Ops | 85,156 | 0.0% | 0.0% | 0.9% | 0.0% | 82.4% | 16.7% |
| Legal Obligation | 0 | 0.0% | 0.0% | 0.0% | 0.0% | 0.0% | 0.0% |
| Claims/Setlments | 0 | 0.0% | 0.0% | 0.0% | 0.0% | 0.0% | 0.0% |
| Leadership | 3,745,311 | 3.0% | 0.0% | 1.9% | 7.5% | 5.3% | 82.4% |
| Schl Management | 2,638,205 | 0.0% | 0.0% | 0.0% | 0.0% | 1.6% | 98.4% |
| Principals | 1,942,253 | 0.0% | 0.0% | 0.0% | 0.0% | 1.9% | 98.1% |
| School Office | 695,951 | 0.0% | 0.0% | 0.0% | 0.0% | 0.6% | 99.4% |
| Prog/Ops Mngt | 615,581 | 18.4% | 0.0% | 11.4% | 45.4% | 24.8% | 0.0% |
| Deputies et al | 615,581 | 18.4% | 0.0% | 11.4% | 45.4% | 24.8% | 0.0% |
| District Mngt | 491,524 | 0.0% | 0.0% | 0.0% | 0.0% | 0.7% | 99.3% |
| Superintendnt/Bd | 491,524 | 0.0% | 0.0% | 0.0% | 0.0% | 0.7% | 99.3% |
| Legal | 0 | 0.0% | 0.0% | 0.0% | 0.0% | 0.0% | 0.0% |

Anywhere Public School District
Printed: 2/07/97 by John Anybody 1994-1995 Actual
Summary Generated: 11/23/96

FIG. 32

A-6. Total District By Education Level-Summary $

| | Education Levels | | | | | Non-School |
|---|---|---|---|---|---|---|
| | Elementary | Middle | High | Alternative | Other | |
| Total Program | $16,585,130 | $5,624,658 | $10,910,936 | $142,657 | $608,525 | $8,299,967 |
| Instruction | 10,524,632 | 3,568,098 | 7,000,782 | 126,653 | 563,085 | 158,822 |
| Teaching | 10,243,716 | 3,466,806 | 6,537,398 | 123,420 | 139,968 | 137,984 |
|   Instrl Teachers | 9,225,366 | 3,278,880 | 6,130,019 | 100,257 | 116,576 | 46,122 |
|   Substitutes | 166,216 | 58,944 | 133,599 | 0 | 0 | 70,435 |
|   Instrl Paraprof | 852,133 | 128,982 | 273,780 | 23,162 | 23,392 | 21,426 |
| Classrm Material | 280,916 | 101,292 | 463,384 | 3,233 | 423,117 | 20,838 |
|   Pupil Technology | 0 | 0 | 24,250 | 0 | 0 | 0 |
|   Instrl Materials | 280,916 | 101,292 | 439,135 | 3,233 | 423,117 | 20,838 |
| Support | 2,058,329 | 692,798 | 1,262,548 | 0 | 40,332 | 206,731 |
| Pupil Support | 1,619,046 | 528,808 | 979,554 | 0 | 0 | 74,212 |
|   Guidance | 201,527 | 89,996 | 340,201 | 0 | 0 | 16,177 |
|   Library Media | 356,745 | 126,243 | 167,871 | 0 | 0 | 21,424 |
|   Extracurricular | 721,071 | 268,246 | 437,216 | 0 | 0 | 0 |
|   Student Health | 339,703 | 44,324 | 34,265 | 0 | 0 | 36,611 |
| Teacher Support | 439,283 | 163,989 | 268,607 | 0 | 1,576 | 0 |
|   Curriculum Dev | 311,694 | 116,525 | 191,244 | 0 | 1,576 | 0 |
|   Staff Dev | 127,588 | 47,464 | 77,362 | 0 | 0 | 0 |
|   Sabbaticals | 0 | 0 | 0 | 0 | 0 | 0 |
| Program Support | 0 | 0 | 14,388 | 0 | 38,756 | 132,519 |
|   Program Dev | 0 | 0 | 0 | 0 | 38,756 | 0 |
|   Therapists et al | 0 | 0 | 14,388 | 0 | 0 | 132,519 |
| Operations | 2,790,466 | 862,283 | 1,738,665 | 16,004 | 5,107 | 1,173,367 |
| Pupil Services | 1,859,885 | 556,075 | 818,130 | 16,004 | 5,107 | 119,585 |
|   Transportation | 341,214 | 124,605 | 223,222 | 16,004 | 5,107 | 0 |
|   Food Service | 1,518,671 | 431,469 | 594,907 | 0 | 0 | 119,585 |
|   Safety | 0 | 0 | 0 | 0 | 0 | 0 |
| Facilities | 930,581 | 306,208 | 895,652 | 0 | 0 | 439,373 |
|   Building Upkeep | 930,581 | 306,208 | 895,652 | 0 | 0 | 439,373 |
| Busn. Services | 0 | 0 | 24,883 | 0 | 0 | 614,410 |
|   Data Processing | 0 | 0 | 0 | 0 | 0 | 23,149 |
|   Busn. Operations | 0 | 0 | 24,883 | 0 | 0 | 591,261 |
| Othr Commitme | 0 | 0 | 0 | 0 | 0 | 5,637,859 |
| Contingencies | 0 | 0 | 0 | 0 | 0 | 0 |
|   Bgt Contingncies | 0 | 0 | 0 | 0 | 0 | 0 |
| Capital | 0 | 0 | 0 | 0 | 0 | 5,552,703 |
|   Debt Servc | 0 | 0 | 0 | 0 | 0 | 1,044,462 |
|   Capital Projects | 0 | 0 | 0 | 0 | 0 | 4,508,241 |
| Out-of-District | 0 | 0 | 0 | 0 | 0 | 85,156 |
|   Pass-Throughs | 0 | 0 | 0 | 0 | 0 | 0 |
|   Retiree Benefits | 0 | 0 | 0 | 0 | 0 | 0 |
|   Enterprise Ops | 0 | 0 | 0 | 0 | 0 | 85,156 |
| Legal Obligation | 0 | 0 | 0 | 0 | 0 | 0 |
|   Claims/Setlments | 0 | 0 | 0 | 0 | 0 | 0 |
| Leadership | 1,211,703 | 501,479 | 908,941 | 0 | 0 | 1,123,188 |
| Schl Management | 1,211,703 | 501,479 | 895,322 | 0 | 0 | 29,701 |
|   Principals | 889,472 | 387,622 | 665,160 | 0 | 0 | 0 |
|   School Office | 322,231 | 113,857 | 230,162 | 0 | 0 | 29,701 |
| Prog/Ops Mngt | 0 | 0 | 13,619 | 0 | 0 | 601,962 |
|   Deputies et al | 0 | 0 | 13,619 | 0 | 0 | 601,962 |
| District Mngt | 0 | 0 | 0 | 0 | 0 | 491,524 |
|   Superintendnt/Bd | 0 | 0 | 0 | 0 | 0 | 491,524 |
|   Legal | 0 | 0 | 0 | 0 | 0 | 0 |

Anywhere Public School District
Printed: 2/07/97 by John Anybody
Page 1 of 1
1994-1995 Actual
Summary Generated: 11/23/96

FIG. 33

A-7. Total District By Education Level-Summary %

| | Total District | Education Levels | | | | | Non School |
|---|---|---|---|---|---|---|---|
| | | Elementary | Middle | High | Alertnative | Other | |
| Total Program | $42,171,873 | 39.3% | 13.3% | 25.9% | 0.3% | 1.4% | 19.7% |
| Instruction | 21,942,073 | 48.0% | 16.3% | 31.9% | 0.6% | 2.6% | 0.7% |
| Teaching | 20,649,291 | 49.6% | 16.8% | 31.7% | 0.6% | 0.7% | 0.7% |
| Instrl Teachers | 18,897,221 | 48.8% | 17.4% | 32.4% | 0.5% | 0.6% | 0.2% |
| Substitutes | 429,194 | 38.7% | 13.7% | 31.1% | 0.0% | 0.0% | 16.4% |
| Instrl Paraprof | 1,322,876 | 64.4% | 9.8% | 20.7% | 1.8% | 1.8% | 1.6% |
| Classrm Material | 1,292,782 | 21.7% | 7.8% | 35.8% | 0.3% | 32.7% | 1.6% |
| Pupil Technology | 24,250 | 0.0% | 0.0% | 100.0% | 0.0% | 0.0% | 0.0% |
| Instrl Materials | 1,268,532 | 22.1% | 8.0% | 34.6% | 0.3% | 33.4% | 1.6% |
| Support | 4,260,739 | 48.3% | 16.3% | 29.6% | 0.0% | 0.9% | 4.9% |
| Pupil Support | 3,201,620 | 50.6% | 16.5% | 30.6% | 0.0% | 0.0% | 2.3% |
| Guidance | 647,901 | 31.1% | 13.9% | 52.5% | 0.0% | 0.0% | 2.5% |
| Library Media | 672,283 | 53.1% | 18.8% | 25.0% | 0.0% | 0.0% | 3.2% |
| Extracurricular | 1,426,533 | 50.5% | 18.8% | 30.6% | 0.0% | 0.0% | 0.0% |
| Student Health | 454,903 | 74.7% | 9.7% | 7.5% | 0.0% | 0.0% | 8.0% |
| Teacher Support | 873,455 | 50.3% | 18.8% | 30.8% | 0.0% | 0.2% | 0.0% |
| Curriculum Dev | 621,040 | 50.2% | 18.8% | 30.8% | 0.0% | 0.3% | 0.0% |
| Staff Dev | 252,415 | 50.5% | 18.8% | 30.6% | 0.0% | 0.0% | 0.0% |
| Sabbaticals | 0 | 0.0% | 0.0% | 0.0% | 0.0% | 0.0% | 0.0% |
| Program Support | 185,663 | 0.0% | 0.0% | 7.7% | 0.0% | 20.9% | 71.4% |
| Program Dev | 38,756 | 0.0% | 0.0% | 0.0% | 0.0% | 100.0% | 0.0% |
| Therapists et al | 146,907 | 0.0% | 0.0% | 9.8% | 0.0% | 0.0% | 90.2% |
| Operations | 6,585,892 | 42.4% | 13.1% | 26.4% | 0.2% | 0.1% | 17.8% |
| Pupil Services | 3,374,785 | 55.1% | 16.5% | 24.2% | 0.5% | 0.2% | 3.5% |
| Transportation | 710,152 | 48.0% | 17.5% | 31.4% | 2.3% | 0.7% | 0.0% |
| Food Service | 2,664,633 | 57.0% | 16.2% | 22.3% | 0.0% | 0.0% | 4.5% |
| Safety | 0 | 0.0% | 0.0% | 0.0% | 0.0% | 0.0% | 0.0% |
| Facilities | 2,571,815 | 36.2% | 11.9% | 34.8% | 0.0% | 0.0% | 17.1% |
| Building Upkeep | 2,571,815 | 36.2% | 11.9% | 34.8% | 0.0% | 0.0% | 17.1% |
| Busn. Services | 639,293 | 0.0% | 0.0% | 3.9% | 0.0% | 0.0% | 96.1% |
| Data Processing | 23,149 | 0.0% | 0.0% | 0.0% | 0.0% | 0.0% | 100.0% |
| Busn. Operations | 616,144 | 0.0% | 0.0% | 4.0% | 0.0% | 0.0% | 96.0% |
| Othr Commitme | 5,637,859 | 0.0% | 0.0% | 0.0% | 0.0% | 0.0% | 100.0% |
| Contingencies | 0 | 0.0% | 0.0% | 0.0% | 0.0% | 0.0% | 0.0% |
| Bgt Contingncies | 0 | 0.0% | 0.0% | 0.0% | 0.0% | 0.0% | 0.0% |
| Capital | 5,552,703 | 0.0% | 0.0% | 0.0% | 0.0% | 0.0% | 100.0% |
| Debt Servc | 1,044,462 | 0.0% | 0.0% | 0.0% | 0.0% | 0.0% | 100.0% |
| Capital Projects | 4,508,241 | 0.0% | 0.0% | 0.0% | 0.0% | 0.0% | 100.0% |
| Out-of-District | 85,156 | 0.0% | 0.0% | 0.0% | 0.0% | 0.0% | 100.0% |
| Pass-Throughs | 0 | 0.0% | 0.0% | 0.0% | 0.0% | 0.0% | 0.0% |
| Retiree Benefits | 0 | 0.0% | 0.0% | 0.0% | 0.0% | 0.0% | 0.0% |
| Enterprise Ops | 85,156 | 0.0% | 0.0% | 0.0% | 0.0% | 0.0% | 100.0% |
| Legal Obligation | 0 | 0.0% | 0.0% | 0.0% | 0.0% | 0.0% | 0.0% |
| Claims/Setlments | 0 | 0.0% | 0.0% | 0.0% | 0.0% | 0.0% | 0.0% |
| Leadership | 3,745,311 | 32.4% | 13.4% | 24.3% | 0.0% | 0.0% | 30.0% |
| Schl Management | 2,638,205 | 45.9% | 19.0% | 33.9% | 0.0% | 0.0% | 1.1% |
| Principals | 1,942,253 | 45.8% | 20.0% | 34.2% | 0.0% | 0.0% | 0.0% |
| School Office | 695,951 | 46.3% | 16.4% | 33.1% | 0.0% | 0.0% | 4.3% |
| Prog/Ops Mngt | 615,581 | 0.0% | 0.0% | 2.2% | 0.0% | 0.0% | 97.8% |
| Deputies et al | 615,581 | 0.0% | 0.0% | 2.2% | 0.0% | 0.0% | 97.8% |
| District Mngt | 491,524 | 0.0% | 0.0% | 0.0% | 0.0% | 0.0% | 100.0% |
| Superintendnt/Bd | 491,524 | 0.0% | 0.0% | 0.0% | 0.0% | 0.0% | 100.0% |
| Legal | 0 | 0.0% | 0.0% | 0.0% | 0.0% | 0.0% | 0.0% |

Anywhere Public School District  
Printed: 2/07/97 by John Anybody  
Page 1 of 1  
1994-1995 Actual  
Summary Generated: 11/23/96

FIG. 34a

A-8. Total District By Fund - Summary $

| After all Mapping and Benefits Allocation | Total All Funds | GENERAL FUND | HEALTHY START PROJECT | WORKPLACE GRANT CHALLENGER | NAT. WRITING PROJ. LOCAL FUNDS | ACTIVITY BUS FUND |
|---|---|---|---|---|---|---|
| Total Fund | $42,171,873 | $26,546,013 | $884 | $2,257 | $4,792 | $32,303 |
| Instruction | 21,942,073 | $17,519,009 | $0 | $2,257 | $0 | $0 |
| Teaching | 20,649,291 | $16,686,916 | $0 | $1,428 | $0 | $0 |
| Instrl Teachers | 18,897,221 | $15,819,446 | $0 | $1,428 | $0 | $0 |
| Substitutes | 429,194 | $336,901 | $0 | $0 | $0 | $0 |
| Instrl Paraprof | 1,322,876 | $530,569 | $0 | $0 | $0 | $0 |
| Classrm Material | 1,292,782 | $832,093 | $0 | $829 | $0 | $0 |
| Pupil Technology | 24,250 | $0 | $0 | $0 | $0 | $0 |
| Instrl Materials | 1,268,532 | $832,093 | $0 | $829 | $0 | $0 |
| Support | 4,260,739 | $1,692,469 | $0 | $0 | $4,792 | $0 |
| Pupil Support | 3,201,620 | $1,144,657 | $0 | $0 | $0 | $0 |
| Guidance | 647,901 | $512,199 | $0 | $0 | $0 | $0 |
| Library Media | 672,283 | $607,276 | $0 | $0 | $0 | $0 |
| Extracurricular | 1,426,533 | $0 | $0 | $0 | $0 | $0 |
| Student Health | 454,903 | $25,182 | $0 | $0 | $0 | $0 |
| Teacher Support | 873,455 | $443,693 | $0 | $0 | $4,792 | $0 |
| Curriculum Dev | 621,040 | $285,888 | $0 | $0 | $4,792 | $0 |
| Staff Dev | 252,415 | $157,806 | $0 | $0 | $0 | $0 |
| Sabbaticals | 0 | $0 | $0 | $0 | $0 | $0 |
| Program Support | 185,663 | $104,119 | $0 | $0 | $0 | $0 |
| Program Dev | 38,756 | $6,412 | $0 | $0 | $0 | $0 |
| Therapists et al | 146,907 | $97,707 | $0 | $0 | $0 | $0 |
| Operations | 6,585,892 | $4,236,290 | $0 | $0 | $0 | $32,303 |
| Pupil Services | 3,374,785 | $1,074,283 | $0 | $0 | $0 | $32,303 |
| Transportation | 710,152 | $566,671 | $0 | $0 | $0 | $32,303 |
| Food Service | 2,664,633 | $507,612 | $0 | $0 | $0 | $0 |
| Safety | 0 | $0 | $0 | $0 | $0 | $0 |
| Facilities | 2,571,815 | $2,528,122 | $0 | $0 | $0 | $0 |
| Building Upkeep | 2,571,815 | $2,528,122 | $0 | $0 | $0 | $0 |
| Busn. Services | 639,293 | $633,885 | $0 | $0 | $0 | $0 |
| Data Processing | 23,149 | $17,741 | $0 | $0 | $0 | $0 |
| Busn. Operations | 616,144 | $616,144 | $0 | $0 | $0 | $0 |
| Othr Commitme | 5,637,859 | $13,352 | $884 | $0 | $0 | $0 |
| Contingencies | 0 | $0 | $0 | $0 | $0 | $0 |
| Bgt Contingncies | 0 | $0 | $0 | $0 | $0 | $0 |
| Capital | 5,552,703 | $0 | $0 | $0 | $0 | $0 |
| Debt Servc | 1,044,462 | $0 | $0 | $0 | $0 | $0 |
| Capital Projects | 4,508,241 | $0 | $0 | $0 | $0 | $0 |
| Out-of-District | 85,156 | $13,352 | $884 | $0 | $0 | $0 |
| Pass-Throughs | 0 | $0 | $0 | $0 | $0 | $0 |
| Retiree Benefits | 0 | $0 | $0 | $0 | $0 | $0 |
| Enterprise Ops | 85,156 | $13,352 | $884 | $0 | $0 | $0 |
| Legal Obligation | 0 | $0 | $0 | $0 | $0 | $0 |
| Claims/Setlments | 0 | $0 | $0 | $0 | $0 | $0 |
| Leadership | 3,745,311 | $3,084,893 | $0 | $0 | $0 | $0 |
| Schl Management | 2,638,205 | $2,596,745 | $0 | $0 | $0 | $0 |
| Principals | 1,942,253 | $1,905,120 | $0 | $0 | $0 | $0 |
| School Office | 695,951 | $691,625 | $0 | $0 | $0 | $0 |
| Prog/Ops Mngt | 615,581 | $72 | $0 | $0 | $0 | $0 |
| Deputies et al | 615,581 | $72 | $0 | $0 | $0 | $0 |
| District Mngt | 491,524 | $488,076 | $0 | $0 | $0 | $0 |
| Superintendnt/Bd | 491,524 | $488,076 | $0 | $0 | $0 | $0 |
| Legal | 0 | $0 | $0 | $0 | $0 | $0 |

Anywhere Public School District
Printed: 2/07/97 by John Anybody
1994-1995 Actual
Summary Generated: 11/23/96

FIG. 34b

A-8. Total District By Fund - Summary $

| After all Mapping and Benefits Allocation | Total All Funds | STUDENT INDUSTRY PARTNERS | PRIM AFTER SCHOOL TUTOR | AFTER SCHOOL TUTOR | ELEM AFTER SCHOOL TUTOR | LOCAL ADULT EDUCATION |
|---|---|---|---|---|---|---|
| Total Fund | $42,171,873 | $3,216 | $15,726 | $12,348 | $3,271 | $1,121 |
| Instruction | 21,942,073 | $0 | $15,726 | $12,348 | $3,271 | $0 |
| Teaching | 20,649,291 | $0 | $15,726 | $12,348 | $3,028 | $0 |
| Instrl Teachers | 18,897,221 | $0 | $7,902 | $8,097 | $202 | $0 |
| Substitutes | 429,194 | $0 | $7,824 | $4,251 | $2,826 | $0 |
| Instrl Paraprof | 1,322,876 | $0 | $0 | $0 | $0 | $0 |
| Classrm Material | 1,292,782 | $0 | $0 | $0 | $243 | $0 |
| Pupil Technology | 24,250 | $0 | $0 | $0 | $0 | $0 |
| Instrl Materials | 1,268,532 | $0 | $0 | $0 | $243 | $0 |
| Support | 4,260,739 | $3,216 | $0 | $0 | $0 | $0 |
| Pupil Support | 3,201,620 | $0 | $0 | $0 | $0 | $0 |
| Guidance | 647,901 | $0 | $0 | $0 | $0 | $0 |
| Library Media | 672,283 | $0 | $0 | $0 | $0 | $0 |
| Extracurricular | 1,426,533 | $0 | $0 | $0 | $0 | $0 |
| Student Health | 454,903 | $0 | $0 | $0 | $0 | $0 |
| Teacher Support | 873,455 | $3,216 | $0 | $0 | $0 | $0 |
| Curriculum Dev | 621,040 | $3,216 | $0 | $0 | $0 | $0 |
| Staff Dev | 252,415 | $0 | $0 | $0 | $0 | $0 |
| Sabbaticals | 0 | $0 | $0 | $0 | $0 | $0 |
| Program Support | 185,663 | $0 | $0 | $0 | $0 | $0 |
| Program Dev | 38,756 | $0 | $0 | $0 | $0 | $0 |
| Therapists et al | 146,907 | $0 | $0 | $0 | $0 | $0 |
| Operations | 6,585,892 | $0 | $0 | $0 | $0 | $0 |
| Pupil Services | 3,374,785 | $0 | $0 | $0 | $0 | $0 |
| Transportation | 710,152 | $0 | $0 | $0 | $0 | $0 |
| Food Service | 2,664,633 | $0 | $0 | $0 | $0 | $0 |
| Safety | 0 | $0 | $0 | $0 | $0 | $0 |
| Facilities | 2,571,815 | $0 | $0 | $0 | $0 | $0 |
| Building Upkeep | 2,571,815 | $0 | $0 | $0 | $0 | $0 |
| Busn. Services | 639,293 | $0 | $0 | $0 | $0 | $0 |
| Data Processing | 23,149 | $0 | $0 | $0 | $0 | $0 |
| Busn. Operations | 616,144 | $0 | $0 | $0 | $0 | $0 |
| Othr Commitme | 5,637,859 | $0 | $0 | $0 | $0 | $1,121 |
| Contingencies | 0 | $0 | $0 | $0 | $0 | $0 |
| Bgt Contingncies | 0 | $0 | $0 | $0 | $0 | $0 |
| Capital | 5,552,703 | $0 | $0 | $0 | $0 | $0 |
| Debt Servc | 1,044,462 | $0 | $0 | $0 | $0 | $0 |
| Capital Projects | 4,508,241 | $0 | $0 | $0 | $0 | $0 |
| Out-of-District | 85,156 | $0 | $0 | $0 | $0 | $1,121 |
| Pass-Throughs | 0 | $0 | $0 | $0 | $0 | $0 |
| Retiree Benefits | 0 | $0 | $0 | $0 | $0 | $0 |
| Enterprise Ops | 85,156 | $0 | $0 | $0 | $0 | $1,121 |
| Legal Obligation | 0 | $0 | $0 | $0 | $0 | $0 |
| Claims/Settlements | 0 | $0 | $0 | $0 | $0 | $0 |
| Leadership | 3,745,311 | $0 | $0 | $0 | $0 | $0 |
| Schl Management | 2,638,205 | $0 | $0 | $0 | $0 | $0 |
| Principals | 1,942,253 | $0 | $0 | $0 | $0 | $0 |
| School Office | 695,951 | $0 | $0 | $0 | $0 | $0 |
| Prog/Ops Mngt | 615,581 | $0 | $0 | $0 | $0 | $0 |
| Deputies et al | 615,581 | $0 | $0 | $0 | $0 | $0 |
| District Mngt | 491,524 | $0 | $0 | $0 | $0 | $0 |
| Superintendnt/Bd | 491,524 | $0 | $0 | $0 | $0 | $0 |
| Legal | 0 | $0 | $0 | $0 | $0 | $0 |

Anywhere Public School District  
Printed: 2/07/97 by John Anybody  
1994-1995 Actual  
Summary Generated: 11/23/96

FIG. 35a

A-9. Total District By Fund – Summary %

| After all Mapping and Benefits Allocation | Total All Funds | GENERAL FUND | HEALTHY START PROJECT | WORKPLACE GRANT CHALLENGER | NAT. WRITING PROJ. LOCAL FUNS | ACTIVITY BUS FUND |
|---|---|---|---|---|---|---|
| Total Fund | $42,171,873 | 62.9% | 0.0% | 0.0% | 0.0% | 0.1% |
| Instruction | 21,942,073 | 79.8% | 0.0% | 0.0% | 0.0% | 0.0% |
| Teaching | 20,649,291 | 80.8% | 0.0% | 0.0% | 0.0% | 0.0% |
|   Instrl Teachers | 18,897,221 | 83.7% | 0.0% | 0.0% | 0.0% | 0.0% |
|   Substitutes | 429,194 | 78.5% | 0.0% | 0.0% | 0.0% | 0.0% |
|   Instrl Paraprof | 1,322,876 | 40.1% | 0.0% | 0.0% | 0.0% | 0.0% |
| Classrm Material | 1,292,782 | 64.4% | 0.0% | 0.1% | 0.0% | 0.0% |
|   Pupil Technology | 24,250 | 0.0% | 0.0% | 0.0% | 0.0% | 0.0% |
|   Instrl Materials | 1,268,532 | 65.6% | 0.0% | 0.1% | 0.0% | 0.0% |
| Support | 4,260,739 | 39.7% | 0.0% | 0.0% | 0.1% | 0.0% |
| Pupil Support | 3,201,620 | 35.8% | 0.0% | 0.0% | 0.0% | 0.0% |
|   Guidance | 647,901 | 79.1% | 0.0% | 0.0% | 0.0% | 0.0% |
|   Library Media | 672,283 | 90.3% | 0.0% | 0.0% | 0.0% | 0.0% |
|   Extracurricular | 1,426,533 | 0.0% | 0.0% | 0.0% | 0.0% | 0.0% |
|   Student Health | 454,903 | 5.5% | 0.0% | 0.0% | 0.0% | 0.0% |
| Teacher Support | 873,455 | 50.8% | 0.0% | 0.0% | 0.5% | 0.0% |
|   Curriculum Dev | 621,040 | 46.0% | 0.0% | 0.0% | 0.8% | 0.0% |
|   Staff Dev | 252,415 | 62.5% | 0.0% | 0.0% | 0.0% | 0.0% |
|   Sabbaticals | 0 | 0.0% | 0.0% | 0.0% | 0.0% | 0.0% |
| Program Support | 185,663 | 56.1% | 0.0% | 0.0% | 0.0% | 0.0% |
|   Program Dev | 38,756 | 16.5% | 0.0% | 0.0% | 0.0% | 0.0% |
|   Therapists et al | 146,907 | 66.5% | 0.0% | 0.0% | 0.0% | 0.0% |
| Operations | 6,585,892 | 64.3% | 0.0% | 0.0% | 0.0% | 0.5% |
| Pupil Services | 3,374,785 | 31.8% | 0.0% | 0.0% | 0.0% | 1.0% |
|   Transportation | 710,152 | 79.8% | 0.0% | 0.0% | 0.0% | 4.5% |
|   Food Service | 2,664,633 | 19.0% | 0.0% | 0.0% | 0.0% | 0.0% |
|   Safety | 0 | 0.0% | 0.0% | 0.0% | 0.0% | 0.0% |
| Facilities | 2,571,815 | 98.3% | 0.0% | 0.0% | 0.0% | 0.0% |
|   Building Upkeep | 2,571,815 | 98.3% | 0.0% | 0.0% | 0.0% | 0.0% |
| Busn. Services | 639,293 | 99.2% | 0.0% | 0.0% | 0.0% | 0.0% |
|   Data Processing | 23,149 | 76.6% | 0.0% | 0.0% | 0.0% | 0.0% |
|   Busn. Operations | 616,144 | 100.0% | 0.0% | 0.0% | 0.0% | 0.0% |
| Othr Commitme | 5,637,859 | 0.2% | 0.0% | 0.0% | 0.0% | 0.0% |
| Contingencies | 0 | 0.0% | 0.0% | 0.0% | 0.0% | 0.0% |
|   Bgt Contingncies | 0 | 0.0% | 0.0% | 0.0% | 0.0% | 0.0% |
| Capital | 5,552,703 | 0.0% | 0.0% | 0.0% | 0.0% | 0.0% |
|   Debt Servc | 1,044,462 | 0.0% | 0.0% | 0.0% | 0.0% | 0.0% |
|   Capital Projects | 4,508,241 | 0.0% | 0.0% | 0.0% | 0.0% | 0.0% |
| Out-of-District | 85,156 | 15.7% | 1.0% | 0.0% | 0.0% | 0.0% |
|   Pass-Throughs | 0 | 0.0% | 0.0% | 0.0% | 0.0% | 0.0% |
|   Retiree Benefits | 0 | 0.0% | 0.0% | 0.0% | 0.0% | 0.0% |
|   Enterprise Ops | 85,156 | 15.7% | 1.0% | 0.0% | 0.0% | 0.0% |
| Legal Obligation | 0 | 0.0% | 0.0% | 0.0% | 0.0% | 0.0% |
|   Claims/Setlments | 0 | 0.0% | 0.0% | 0.0% | 0.0% | 0.0% |
| Leadership | 3,745,311 | 82.4% | 0.0% | 0.0% | 0.0% | 0.0% |
| Schl Management | 2,638,205 | 98.4% | 0.0% | 0.0% | 0.0% | 0.0% |
|   Principals | 1,942,253 | 98.1% | 0.0% | 0.0% | 0.0% | 0.0% |
|   School Office | 695,951 | 99.4% | 0.0% | 0.0% | 0.0% | 0.0% |
| Prog/Ops Mngt | 615,581 | 0.0% | 0.0% | 0.0% | 0.0% | 0.0% |
|   Deputies et al | 615,581 | 0.0% | 0.0% | 0.0% | 0.0% | 0.0% |
| District Mngt | 491,524 | 99.3% | 0.0% | 0.0% | 0.0% | 0.0% |
|   Superintendnt/Bd | 491,524 | 99.3% | 0.0% | 0.0% | 0.0% | 0.0% |
|   Legal | 0 | 0.0% | 0.0% | 0.0% | 0.0% | 0.0% |

Anywhere Public School District  
Printed: 2/07/97 by John Anybody  
Page 1 of 21  
1994–1995 Actual  
Summary Generated: 11/23/96

FIG. 35b

A-9. Total District By Fund - Summary %

| After all Mapping and Benefits Allocation | Total All Funds | STUDENT INDUSTRY PARTNERS | PRIM AFTER SCHOOL TUTOR | AFTER SCHOOL TUTOR | ELEM AFTER SCHOOL TUTOR | LOCAL ADULT EDUCATION |
|---|---|---|---|---|---|---|
| Total Fund | $42,171,873 | 0.0% | 0.0% | 0.0% | 0.0% | 0.0% |
| Instruction | 21,942,073 | 0.0% | 0.1% | 0.1% | 0.0% | 0.0% |
| Teaching | 20,649,291 | 0.0% | 0.1% | 0.1% | 0.0% | 0.0% |
| Instrl Teachers | 18,897,221 | 0.0% | 0.0% | 0.0% | 0.0% | 0.0% |
| Substitutes | 429,194 | 0.0% | 1.8% | 1.0% | 0.7% | 0.0% |
| Instrl Paraprof | 1,322,876 | 0.0% | 0.0% | 0.0% | 0.0% | 0.0% |
| Classrm Material | 1,292,782 | 0.0% | 0.0% | 0.0% | 0.0% | 0.0% |
| Pupil Technology | 24,250 | 0.0% | 0.0% | 0.0% | 0.0% | 0.0% |
| Instrl Materials | 1,268,532 | 0.0% | 0.0% | 0.0% | 0.0% | 0.0% |
| Support | 4,260,739 | 0.1% | 0.0% | 0.0% | 0.0% | 0.0% |
| Pupil Support | 3,201,620 | 0.0% | 0.0% | 0.0% | 0.0% | 0.0% |
| Guidance | 647,901 | 0.0% | 0.0% | 0.0% | 0.0% | 0.0% |
| Library Media | 672,283 | 0.0% | 0.0% | 0.0% | 0.0% | 0.0% |
| Extracurricular | 1,426,533 | 0.0% | 0.0% | 0.0% | 0.0% | 0.0% |
| Student Health | 454,903 | 0.0% | 0.0% | 0.0% | 0.0% | 0.0% |
| Teacher Support | 873,455 | 0.4% | 0.0% | 0.0% | 0.0% | 0.0% |
| Curriculum Dev | 621,040 | 0.5% | 0.0% | 0.0% | 0.0% | 0.0% |
| Staff Dev | 252,415 | 0.0% | 0.0% | 0.0% | 0.0% | 0.0% |
| Sabbaticals | 0 | 0.0% | 0.0% | 0.0% | 0.0% | 0.0% |
| Program Support | 185,663 | 0.0% | 0.0% | 0.0% | 0.0% | 0.0% |
| Program Dev | 38,756 | 0.0% | 0.0% | 0.0% | 0.0% | 0.0% |
| Therapists et al | 146,907 | 0.0% | 0.0% | 0.0% | 0.0% | 0.0% |
| Operations | 6,585,892 | 0.0% | 0.0% | 0.0% | 0.0% | 0.0% |
| Pupil Services | 3,374,785 | 0.0% | 0.0% | 0.0% | 0.0% | 0.0% |
| Transportation | 710,152 | 0.0% | 0.0% | 0.0% | 0.0% | 0.0% |
| Food Service | 2,664,633 | 0.0% | 0.0% | 0.0% | 0.0% | 0.0% |
| Safety | 0 | 0.0% | 0.0% | 0.0% | 0.0% | 0.0% |
| Facilities | 2,571,815 | 0.0% | 0.0% | 0.0% | 0.0% | 0.0% |
| Building Upkeep | 2,571,815 | 0.0% | 0.0% | 0.0% | 0.0% | 0.0% |
| Busn. Services | 639,293 | 0.0% | 0.0% | 0.0% | 0.0% | 0.0% |
| Data Processing | 23,149 | 0.0% | 0.0% | 0.0% | 0.0% | 0.0% |
| Busn. Operations | 616,144 | 0.0% | 0.0% | 0.0% | 0.0% | 0.0% |
| Othr Commitme | 5,637,859 | 0.0% | 0.0% | 0.0% | 0.0% | 0.0% |
| Contingencies | 0 | 0.0% | 0.0% | 0.0% | 0.0% | 0.0% |
| Bgt Contingncies | 0 | 0.0% | 0.0% | 0.0% | 0.0% | 0.0% |
| Capital | 5,552,703 | 0.0% | 0.0% | 0.0% | 0.0% | 0.0% |
| Debt Servc | 1,044,462 | 0.0% | 0.0% | 0.0% | 0.0% | 0.0% |
| Capital Projects | 4,508,241 | 0.0% | 0.0% | 0.0% | 0.0% | 0.0% |
| Out-of-District | 85,156 | 0.0% | 0.0% | 0.0% | 0.0% | 1.3% |
| Pass-Throughs | 0 | 0.0% | 0.0% | 0.0% | 0.0% | 0.0% |
| Retiree Benefits | 0 | 0.0% | 0.0% | 0.0% | 0.0% | 0.0% |
| Enterprise Ops | 85,156 | 0.0% | 0.0% | 0.0% | 0.0% | 1.3% |
| Legal Obligation | 0 | 0.0% | 0.0% | 0.0% | 0.0% | 0.0% |
| Claims/Setlments | 0 | 0.0% | 0.0% | 0.0% | 0.0% | 0.0% |
| Leadership | 3,745,311 | 0.0% | 0.0% | 0.0% | 0.0% | 0.0% |
| Schl Management | 2,638,205 | 0.0% | 0.0% | 0.0% | 0.0% | 0.0% |
| Principals | 1,942,253 | 0.0% | 0.0% | 0.0% | 0.0% | 0.0% |
| School Office | 695,951 | 0.0% | 0.0% | 0.0% | 0.0% | 0.0% |
| Prog/Ops Mngt | 615,581 | 0.0% | 0.0% | 0.0% | 0.0% | 0.0% |
| Deputies et al | 615,581 | 0.0% | 0.0% | 0.0% | 0.0% | 0.0% |
| District Mngt | 491,524 | 0.0% | 0.0% | 0.0% | 0.0% | 0.0% |
| Superintendnt/Bd | 491,524 | 0.0% | 0.0% | 0.0% | 0.0% | 0.0% |
| Legal | 0 | 0.0% | 0.0% | 0.0% | 0.0% | 0.0% |

Anywhere Public School District
Printed: 2/07/97 by John Anybody
1994-1995 Actual
Summary Generated: 11/23/96

IN$ITE: A FINANCE ANALYSIS MODEL FOR EDUCATION

PRIORITY UNDER 35 U.S.C. §119(e) & 37 C.F.R. §1.78(a) (1)

This Nonprovisional U.S. Patent Application claims priority from Provisional U.S. Patent Application entitled FINANCE ANALYSIS MODEL (FAM) : A SYSTEM AND METHOD FOR ANALYZING SCHOOL FINANCES, Ser. No. 60/012,099 (Attorney Docket No. 03522-00019), filed on Feb. 22, 1996 in the names of Sheree Teresa SPEAKMAN and Jay Frank MAY, who are also the inventors of the subject matter of the present Nonprovisional Patent Application. The earlier-filed Provisional U.S. Patent Application is currently pending and has not been abandoned.

CROSS REFERENCES TO RELATED APPLICATIONS

This Nonprovisional U.S. Patent Application is based upon an earlier-filed, currently pending Provisional U.S. Patent Application entitled FINANCE ANALYSIS MODEL (FAM): A SYSTEM AND METHOD FOR ANALYZING SCHOOL FINANCES, Ser. No. 60/012,099 (Attorney Docket No. 03522-00019), filed on Feb. 22, 1996 in the names of Sheree Teresa SPEAKMAN and Jay Frank MAY, who are also the inventors of the subject matter of the present Nonprovisional Patent Application.

The earlier-filed Provisional U.S. Patent Application identified above and any Nonprovisional Patent Applications deriving therefrom in the U.S. or in other countries and the disclosure(s) contained therein are all hereby incorporated by reference herein.

The earlier-filed Provisional U.S. Patent Application(s) identified above, the present Nonprovisional Patent Application and all other patent applications deriving therefrom have all been assigned, or are under an obligation of assignment, to Coopers & Lybrand, L.L.P., a limited liability partnership registered under the laws of the State of Delaware and having its principal place of business at 1251 Avenue of the Americas, New York, N.Y. 10020-1157.

DESCRIPTION

A portion of the disclosure of this nonprovisional patent document contains material which is subject to copyright protection. The copyright owner has no objection to the facsimile reproduction by any one of the patent documents or of the patent disclosure, as it appears in the U.S. Patent and Trademark Office patent file or records, but otherwise reserves all copyrights whatsoever.

1. Field of the Invention

The invention relates to a system and method for promoting comparability of financial or performance records, and more particularly, to a computer program for financial accounting, management reporting and performance assessment in an educational environment.

2. Background Art

Educational systems have endured intensive public scrutiny in recent years. Businesses complain that too many job applicants can't read, write or do simple arithmetic. Parents fear that teachers are more concerned with their pensions than their classrooms. Economists worry that a weak school system hurts the ability of the nation to compete in the global economy, and many standardized tests reveal that students in public schools still rank behind most of their international peers in science and mathematics.

Schools and educational systems have also been subject to substantial financial pressures. Tight budgets result in overcrowded classrooms, less individualized attention, deferred maintenance and elimination of such "frills" as music, art and sports. Schools also often have difficulty paying for the computers and other information technology to prepare students for the new workplace. The root of the school squeeze is an enrollment boom coupled with the lack of support for increases in public spending. Taxpayers are increasingly unwilling to pour more money into a system that is widely perceived as having limitations.

It has been argued that a substantial part of the blame for the financial problems of schools are indeed due to the management practices of school districts themselves. For example, in a typical large urban school district, only 52%–55% of every school dollar actually gets into a classroom. Schools have also expended substantial sums of money in the past fifteen years without any visible improvement in school performance. Throughout the 1980's per-pupil expenditures, adjusted for inflation, rose more than 25%.

It has been estimated that the U.S. spends nearly $270 billion every year on public, elementary and secondary education, making it the second largest industry in the United States. Also, the six million people working for public schools account for almost 30% of all civilian government employment. Consequently, there is a great impetus for the reform of public education systems throughout the country.

Schools, long used to speaking the language of education, such as curriculum, test scores and standards, now need to start discussing and evaluating the issues of cost and efficiency. They need to become more productive by getting rid of needless layers of management and focusing on improving efficiency in the delivery of their services. Public schools have to get more of their funds to the place where the process of learning actually occurs—the classroom.

As is now well-recognized in the corporate environment, productivity and quality cannot be improved without accurate information about current operations. However, the vast majority of public school districts cannot answer the obvious question of how many of total educational dollars are actually getting into the classroom.

Sound basic education has long been a tenet of the American dream of prosperity. As the end of the millennium approaches, parents, business and community leaders, educators and children alike are openly debating if today's education system continues to improve young minds and whether or not the system still provides students with the skills needed to remain competitive in the work place.

Recent debate to reform the nation's educational system has been influenced by both positive and negative pressures—federal and state reform initiatives, irate taxpayers, critical reviewers, the accountability movement, funding shortfalls and the like. As federal and state programs continue to recognize individual schools and teachers for their excellence, the question has often been raised as to why more than thirty years of constant attempts to improve education have resulted in higher costs, extensive regulation and more controls without concomitantly realizing significant increases in student achievement.

Continuous increases in funding for education have led to only one conclusion—that more funding does not guarantee enhanced student performance. In fact, as federal, state and local funding agencies find fewer options for providing new resources to schools, school decision makers are having to do much more with the same or fewer dollars. Today it is more critical than ever to find and apply comprehensive solutions to the problems facing schools—allocating scarce education dollars efficiently.

The system and method of the present invention, as embodied in the IN$ITE™ software program (hereinafter "IN$ITE"), aids community efforts to redefine education. IN$ITE organizes a school's financial records into a standardized reporting format that can be easily understood by teachers, parents, business leaders and students alike. Although the IN$ITE model in and of itself cannot solve all of a school district's problems, in the hands of citizens, school and business leaders, teachers and parents, IN$ITE can facilitate the creation of a process that permits all members of the community to make informed decisions that can improve the education of the children in the community.

Pressure for school reform has mounted since the ground breaking report, *A Nation at Risk*, alerted the country to declining educational standards. The report made a convincing argument that U.S. children must learn more math and science, embrace technology and learn how to communicate more effectively if the nation is to remain competitive in the global marketplace.

However, schools continue to face problems that directly impact on learning. Schools need to help children who live in extreme poverty and deprivation, and provide services to students who face physical or mental challenges. Schools also have had to counsel students having substance-abuse problems, and cope with crime in the schools. Mustering all conceivable resources to support the bodies and minds of children is an everyday reality for many schools. To further complicate matters, the pupil population is growing again, particularly in major urban areas that are already under financial pressure.

In addition to the emerging national consensus about the need to improve schools and the increasing demands being placed upon school systems, a third factor that has impacted upon the management of school systems is the issue of school finance. Traditionally, state and local governments have directed funds to each school district. The school district then has had the responsibility to report to the state on the results of the budgeting of funds and subsequent financial activity. Even with the volumes of data that are contained in these financial reports, few legislators can understand how funds are actually spent in individual schools and on students themselves. This lack of an understandable data construct obstructs the efforts of states to manage shortfalls in tax revenue and cutbacks in public funding. Therefore, not only has it been difficult for states to adjust funding patterns across districts, but in periods of austerity, school decision makers have found it difficult to predict just how financial shortfalls would affect the student/teacher ratio, course offerings and the teaching and learning of students.

In essence, educators are expected today to do more, for more students, under more pressure—while keeping within the same budget. This pressure has served as a catalyst for the creation of the IN$ITE model. States and school districts have shown a real interest in reform, and key stakeholders have all come to agree that unless schools adopt better financial management and reporting techniques, school leaders will face challenges in making informed decisions.

Systemic educational reform is a term used to describe the movement to improve education from the top down and bottom up through state policies that support change at the local level. In order to support systemic reform, the nation's schools need a new standard of information that is related to current accounting, budgeting, auditing and testing procedures. This new standard of information needs to present information in a clear and accessible manner to permit informed decision making and a common basis for action.

In today's tight financial environment, schools also need to generate detailed reports that are responsive to taxpayer demands. While school districts have in the past been required to provide detailed information on demographics and expenditures to state educational regulators, few have been asked to provide the local citizens with the financial information that clearly defines the costs of education. School budgets are so large and complex that most communities cannot understand their operation or results.

It has only been recently that educators and legislators have focused on the system-wide concept of school-site management and decision-making. With this move also came the need for school-based information, ongoing assessments of school-by-school achievement and the associated patterns of spending in individual schools. Despite this need, however, educators have continued to focus on district-level revenue and expense reporting and analysis, which obscures the often significant swings in school-based spending.

Consequently, those districts involved in school-based management programs have been searching for decision-support tools as they have attempted to reorganize their practices and procedures around the development and implementation of information useful to school-based leaders and educators.

However, every school district, regardless of its philosophical approach to the issue of school-based management, can still benefit from tools that analyze expenditures on a school-by-school basis. The financial records of school systems—including both the yearly budgets and actual expenditures—are the financial expression of the educational priorities of the community, its board of education and senior administrative staff. As such, one of the objectives of financial accounting for a school system is to provide reports to the public as a basis for judging past, present and future decision-making. There has been a great public need for answers to a number of questions such as:

What is the cost of running a school district?

What is the cost of running each school site?

How much money is directed to classroom instruction and pupils?

How much money is used for pupil, teacher and program support?

What is the cost allocation between the operation of schools and the central office?

How much of the resources are used for school leadership at each school and at the central office?

The availability of a standardized and therefore, comparable answer to these basic questions would permit each community to determine how best to use or modify resources to meet district and state educational goals. The need, therefore, is not to make the existing financial reporting systems more complex, but rather to construct and implement a simplified, financial reporting procedure that embodies the most advanced levels of technology available today. This demand for an easy-to-use financial analysis and reporting package is addressed by the system and method of the present invention.

Financial accounting and analysis software packages can generally be divided into two categories. The first, basic financial systems, includes a General Ledger, a budgeting system, a Purchasing and Distribution system and an Accounts Receivable and Accounts Payable system. These systems generally incorporate flat files, and more recently, databases that are customized to a single user's needs. The second category, which includes report writers and database packages, uses information generated by the basic financial systems to array specific information for customized financial analysis and reporting.

Spreadsheet applications permit organizations to generate a two-dimensional chart of their existing financial data. It should be noted that report writers may be custom designed to complement and connect to basic financial systems. Alternatively, report writers may be used to transfer data to spreadsheet programs for further work.

Illustrative of such spreadsheet applications are the IBM/Lotus Development Corporation's Lotus 1-2-3™ and the Microsoft Corporation's Excel™ application programs. Such spreadsheet programs allow a user to set up two-dimensional worksheets in the form of a grid made up of horizontal rows and vertical columns. Each intersection of a row and a column is called a cell. Data can be stored in these cells in the form of numeric data (such as dollar sums), as text (such as fund name), or as arithmetic operators (such as a formula relating to the contents of other cells).

Data is usually entered into a worksheet, cell by cell, by manual means such as via a keyboard. Users employing spreadsheet application programs such as Lotus 1-2-3™ or Excel™ to perform detailed analysis of input data often also create "macros" to facilitate data entry management and reporting capabilities. Macros comprise complex strings of basic commands that are most often created by individual users. Macros are often difficult to package and transfer since they are often tailored to a macro writer's specific needs. The utility of such macros across the diverse needs of a large organization is often limited. Spreadsheet programs are also limited in that they permit the presentation and evaluation of data in only two dimensions.

Another type of information management software that is often used in organizations is a database package such as Ashton Tate's dBASE III™. Database packages permit an organization to store and manage more complex or high volume financial data electronically on a computer. Databases are "empty" when purchased—the storage format of data in a database package has to be designed, inputted and reported in the formats desired by the individual user. Therefore, for both spreadsheet and database applications, report generation is often tedious and usually requires a substantial amount of data input and manipulation before data can be exported from a spreadsheet or a database program and used for information reporting purposes.

In addition to the above limitations, personal computer programs also generally lack the capacity to implement complex information management and financial controls such as audit trails and password protection capabilities that are needed in high-level or multi-user financial applications.

SUMMARY OF THE INVENTION

Therefore, it is a primary object of the present invention to create and implement a management reporting technique that is easy to use as well as computationally efficient in its operation and use of system resources. The system and method of the present invention facilitates the analysis of financial and performance assessment data.

IN$ITE A FINANCE ANALYSIS MODEL FOR EDUCATION is a computer program that facilitates locational or site-based reporting for locational or site-based management of educational institutions. Traditionally, public-sector educational institutions, like most other not-for-profit entities, have not used computer-aided decision-support tools. IN$ITE is both a methodology and technology that is directed toward disclosing information on education in a standardized format that can permit community members to know with certainty how much it costs to run schools and what fraction of the money expended is directed to the teaching and learning of children and the results of these efforts.

The use of IN$ITE also promotes comparability between schools, across districts and across states. This comparability facilitates the sharing of information that can help communities implement a shared vision of the best way to support the needs of local students and helps ensure that the process of educational reform is carried out in an informed manner. The standardized baseline and benchmark financial information produced by IN$ITE is one of its hallmarks.

IN$ITE is a technology-based information tool for schools that analyzes data at the state-level, the district-level or at the level of individual school sites (i.e. the locational level). Unlike any other financial reporting system used by not-for-profit or governmental entities, IN$ITE promotes the capture and identification of 100% of the expenditures for managing both school as well as district operations. This increases the transparency of educational expenditures and thus promotes increased accountability and comparability in educational institutions.

Thus the IN$ITE model provides a new reporting and analysis system for districts that are committed to transparency, accountability and site-based management. The model brings best practices to the education sector, adapting, enhancing and integrating financial processes developed by the business, education and academic communities into individualized solutions that are suitable for each locality.

In one embodiment of the present invention, IN$ITE is a computer software program that operates on a standard personal computer in either a stand-alone mode or in networked operation. IN$ITE can be used by school districts to find and track long-range patterns in expenditures. IN$ITE is designed to analyze 100% of a school district's General Ledger expenditures.

In addition to collecting information on a school district's budgeted or actual expenditures, IN$ITE also analyzes information at individual school sites. School-by-school data allow community leaders to view how schools within the same district compare on spending patterns, and whether some schools invest resources in teaching and learning more efficiently than others.

In one embodiment of the present invention, the Finance Analysis Model incorporates a relational database that compiles information expenditure information at the state, district and/or school-site levels. The three basic dimensions of IN$ITE include a Functional Dimension, a Program Dimension and a Grade-Level (or Locational) Dimension. The Functional Dimension of IN$ITE shows expenditures and budgets that comprise 100% of a school district's funds and categorizes such expenditures into one of five classes: Instruction, Instructional Support, Operations, Other Commitments and Leadership.

The Program Dimension of IN$ITE provides community leaders with accurate information on the costs of all educational programs in place in a district or school site such as special education, education for the gifted and talented, vocational education, bilingual education, Title 1 and Title 2 education (Federal educational grants supporting children from poor families who qualify for free and reduced-price lunches), technology and innovation programs, summer school programs, general education and other programs.

The Grade-Level or Locational Dimension of IN$ITE allows school districts to determine the costs of functions and programs in the district's elementary, middle and high schools, alternate schools and all other schools.

The IN$ITE model is organized to present expenditure information in both numerical and graphical form using five IN$ITE functions so that communities can gain enough knowledge to work with a district's board and administrators to achieve the proper balance between instructional spending and all other costs. Working in cooperation with the community, school districts can also use IN$ITE-derived management information to identify programs where resources can be added to enhance student performance.

In one aspect, IN$ITE is a software program based on a relational database that embodies a method for cost accounting and analysis, management reporting, performance assessment and decision support in an educational institution. IN$ITE can thus permits the standardized evaluation and comparison of expenditure data of one educational institution with other institutions. The methodology of the IN$ITE software package starts with the import of line items of financial data from a General Ledger system of the institution being analyzed. Selected line items of financial data are first classified as benefit expenditure line items. The imported line items of financial data are then mapped to a specific and standardized set of Functions, Programs and/or Locations.

Selected imported line items and selected benefit expenditure line items are allocated to one or more Locations based upon user input. The allocation of selected imported line items is performed by an allocations process while the allocation of said benefit expenditure line items is performed by a benefits allocation process.

The allocated expenditures are then analyzed and summary expenditure data for each Location are created next. Finally, IN$ITE generates one or more user-selected standardized reports based upon the results of the analysis.

The allocations process in IN$ITE begins with the selection of an allocation method and category. One or more of the imported line items are identified as needing to be allocated to specified or selected Locations. Each of these line items is mapped to a selected allocation method and category. An allocation weight is then computed for each of the mapped line items. The process ends when the user approves the proposed automatic creation or deletion of line items as a result of the allocations process.

The benefits allocations process in IN$ITE begins with the identification of the imported line items as salary line items. These identified salary line items are mapped to selected salary types. Simultaneously, some of the imported line items are identified as actual benefit expenditure line items. A distribution percentage is next selected for each of the salary types. The allocation of benefits is then iteratively estimated till the selected distribution percentage results in the allocation of substantially all the actual benefit expenditures.

Any shortfall between actual benefit expenditure line items and estimated benefit expenditure line items is then mapped to a Function. As with the allocations process, the benefits allocation process ends after the user approves the proposed automatic creation or deletion of line items as a result of the allocations process.

BRIEF DESCRIPTION OF THE DRAWINGS

A more complete understanding of the method and system of the present invention may be obtained by reference to the detailed description of the preferred embodiment(s) that follows, taken in conjunction with the accompanying drawings, wherein:

FIGS. 27–35 show a number of standard report formats that can be generated by the IN$ITE software.

DESCRIPTION OF THE PREFERRED EMBODIMENT

Figure 1:
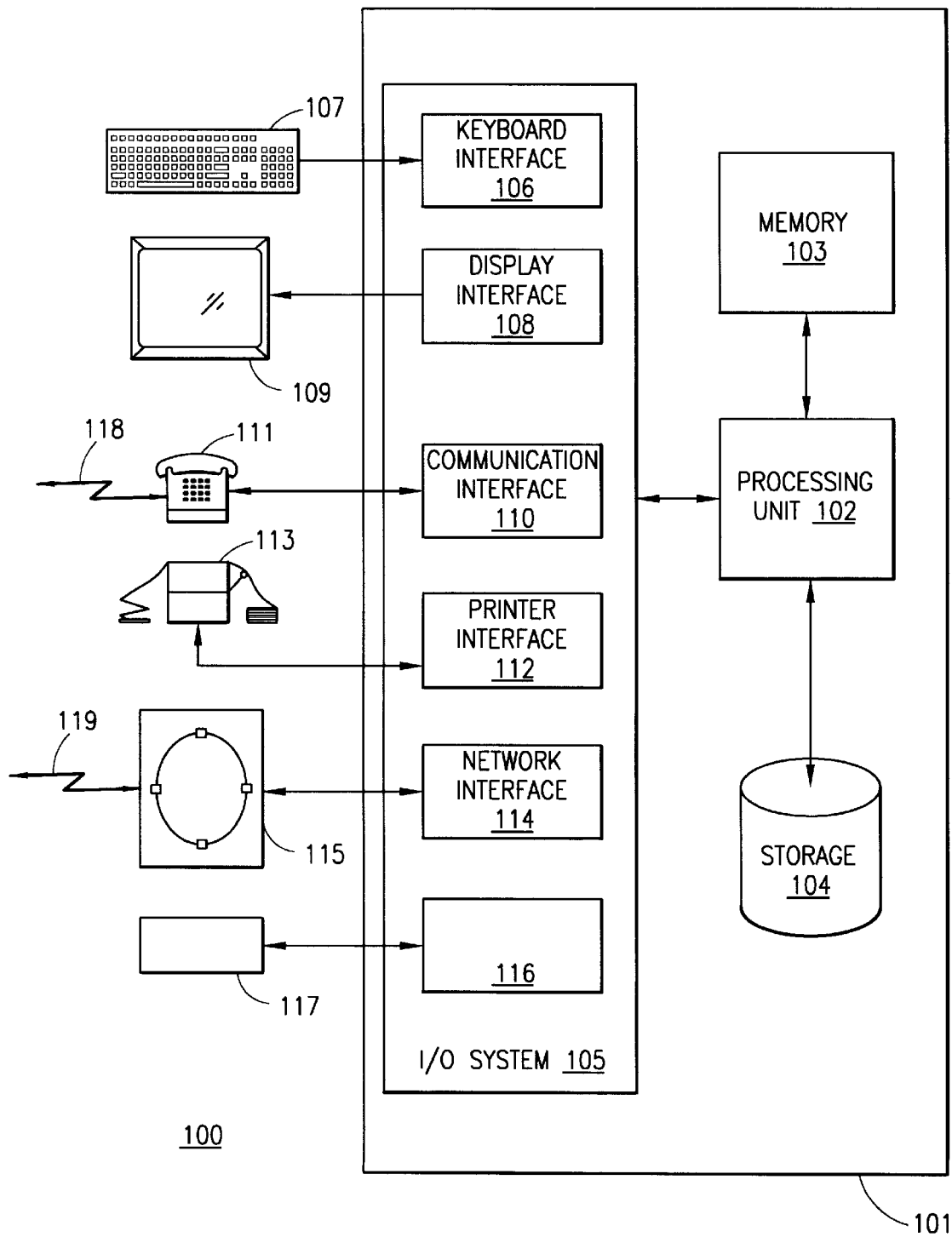
FIG. 1 is an illustrative block diagram of a computing system.

As shown in FIG. 1, a computing system 101 comprises a processing unit 102 connected to a memory 103, storage 104 and input/output systems 105. The processing unit 102 may further be comprised of one or more processors, not shown in the figure. The input/output systems 105 are further comprised of one or more keyboard interfaces 106 connected to various keyboards 107; one or more display interfaces 108, connected to display monitors 109; one or more communication interfaces 110, connected to communications devices 111; one or more printer interfaces 112 connected to printers 113; one or more network interfaces 114 connected to one or more networks 115 and other interfaces 116 connected to other input/output devices 117.

It should be noted that the system shown in FIG. 1 is purely illustrative and the operation of the invention described in this patent application will not be limited by the absence of any of the components shown or by the presence of other components not shown in the figure.

Figure 2:
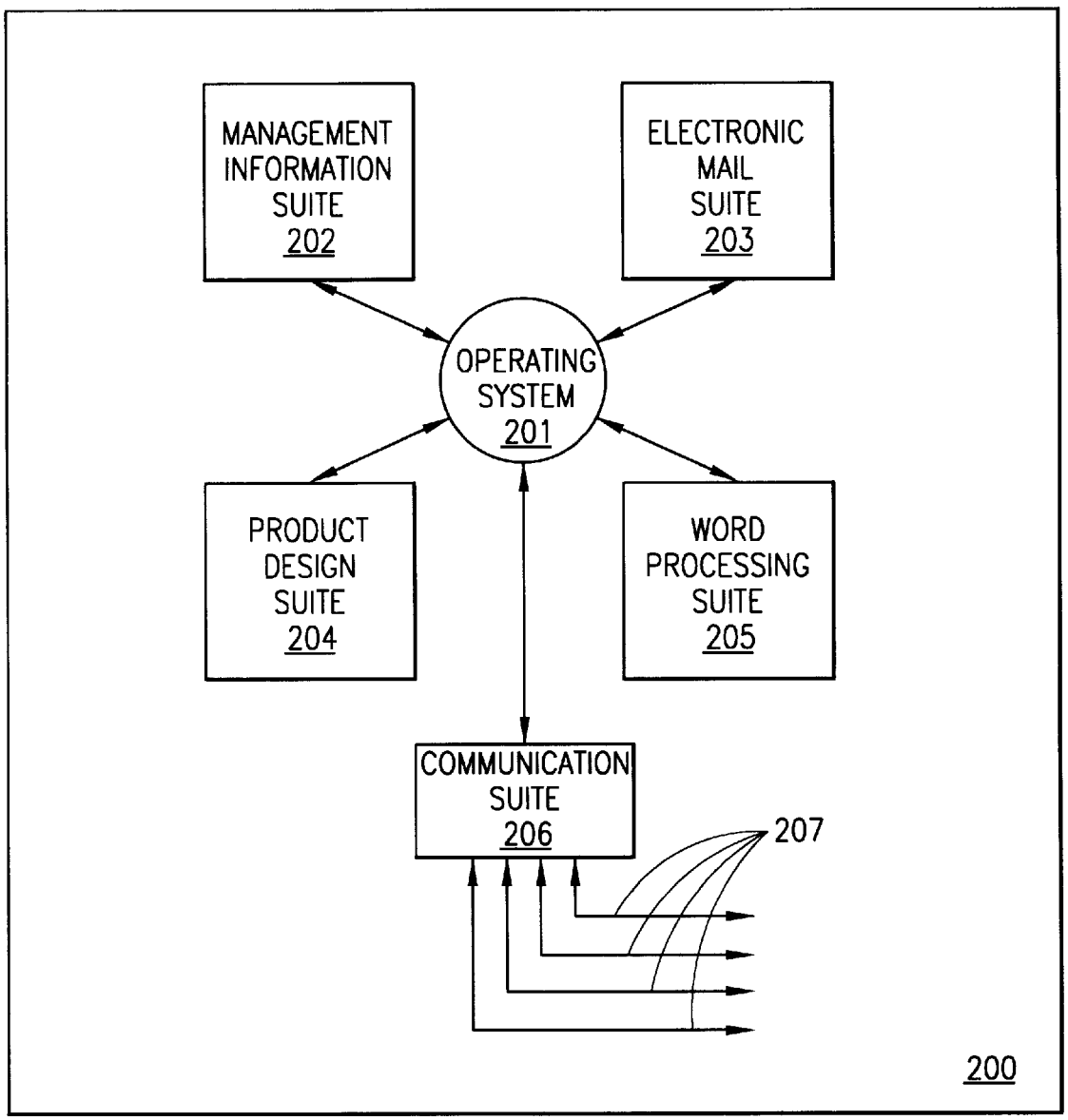
FIG. 2 is an illustrative block diagram of the various software units in a computing system.

In addition to the hardware elements of the computing system shown in FIG. 1, a computing system is also comprised of multiple software units as shown in FIG. 2. Thus, the software contained within a computing system usually comprises an operating system 201 that interacts with multiple application program suites. Examples of such application programs include a Management Information Suite 202, an Electronic Mail Suite 203, a Product Design Suite 204, a Word Processing Suite 205, and a Communications Suite 206. The Management Information Suite 202 may additionally comprise a financial analysis and management reporting package such as the IN$ITE Software Environment of the present invention.

The Communications Suite 206 permits the computer system to communicate with other hardware and input/output elements via communications links 207. Each of the application program suites communicates with other application program suites and external input/output devices through the operating system 201. One of the most popular computer operating systems for personal computers is the Microsoft Corporation's Windows™ Operating System (which includes, inter alia, Windows 3.1™, Windows 95™ and Windows NT™).

Figure 3:
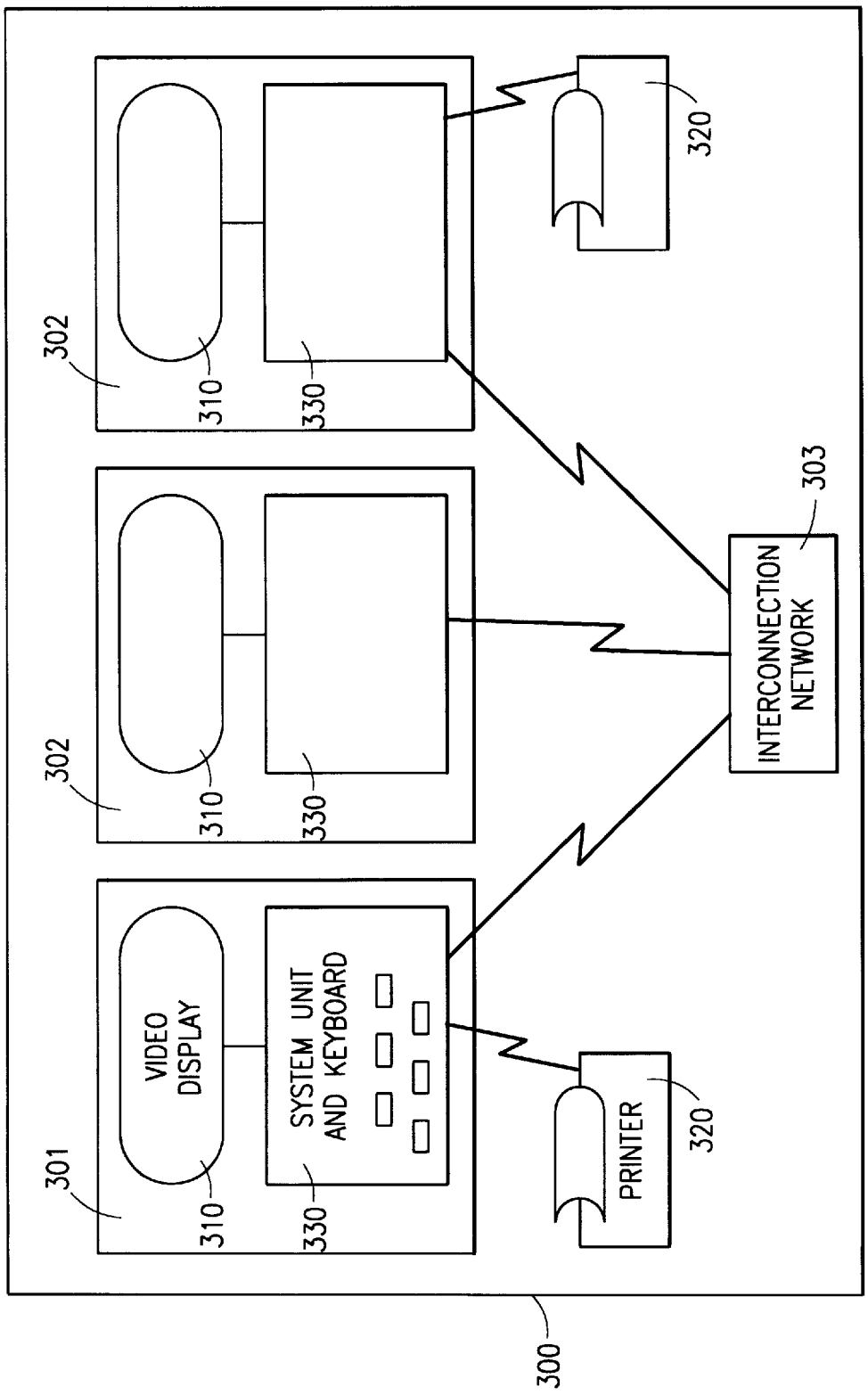
FIG. 3 is a block diagram showing a networked computing system.

As shown in FIG. 3, the preferred embodiment of the invention is a computer system 301 illustratively comprising a plurality of personal computers 302 and an interconnection network 303. The personal computers can be scalably networked to as many users as desired. It should be noted that one or more of the personal computers 302 can also be network servers that distribute application programs and data to various users upon request, as long as the users are connected to the interconnection network 303. Resident in the memory of one or more of the computers 302 and accessible to all of the computers connected to the interconnection network 303 is the IN$ITE Program of the present invention which in one aspect facilitates the analysis of 100% of an educational institution's general ledger expenditures.

The personal computers 302 illustrated in FIG. 3 are advanced personal computers, preferably those capable of operating in the Windows™ environment. As is well-known, such personal computers include a processor, a read/write memory and means for reading and writing data into and from said memory.

Conventional Financial Analysis Software

Figure 4:
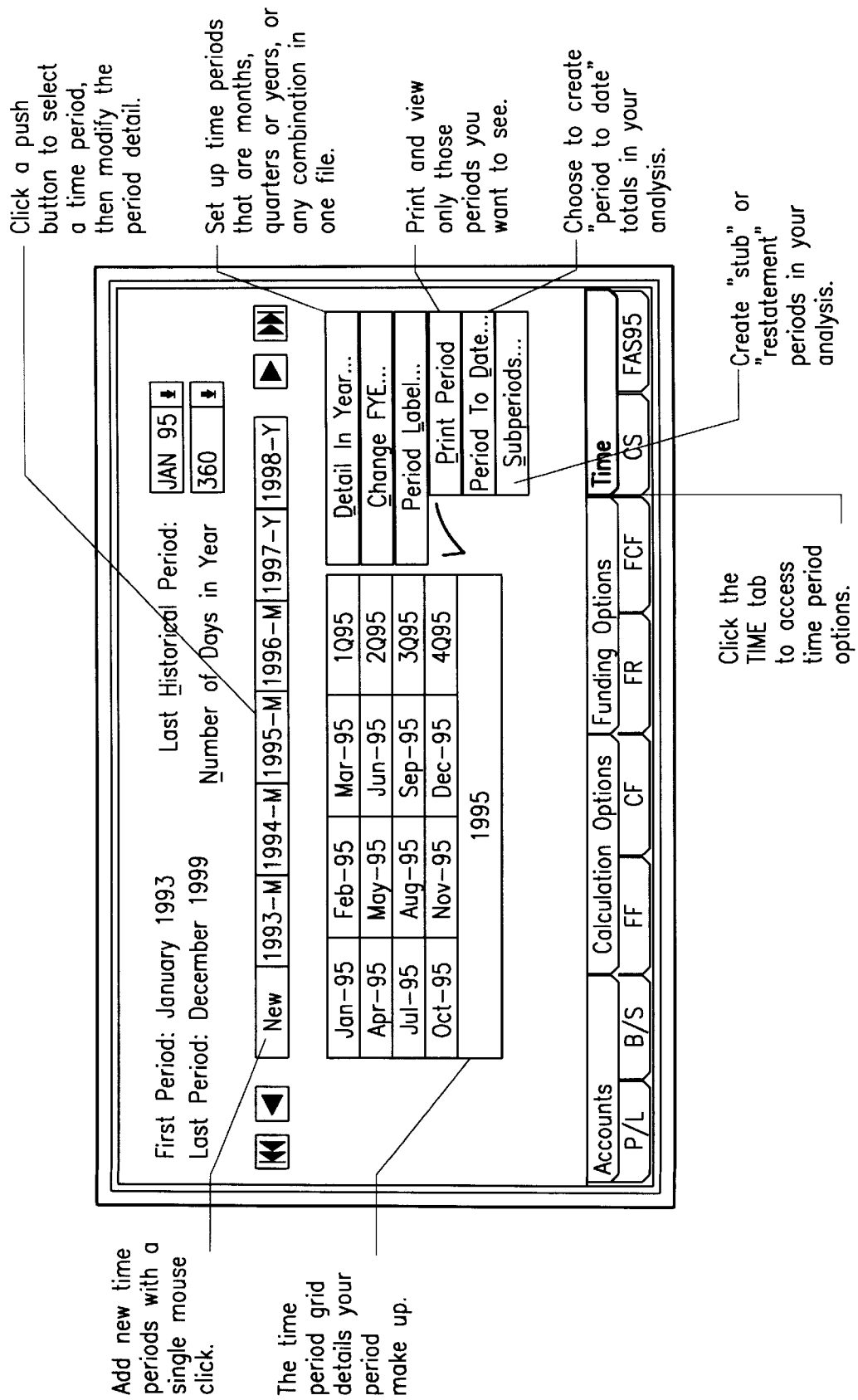
FIG. 4 is an annotated screen printout of a conventional financial analysis software package.

Referring next to FIG. 4, there is shown an annotated screen printout of ALCAR FOR WINDOWS™, a conventional financial analysis software program. ALCAR™ is a Windows™-based financial forecasting software program produced by The Alcar Group for the analysis of time-series data. However, ALCAR does not permit the allocation of costs or benefits or the splitting and combination of line item entries. Furthermore, ALCAR program does not accept or read the original General Ledger file of a business or a not-for-profit entity.

Financial Accounting Concepts

Accounting has been defined by the American Accounting Association as "the process of identifying, measuring, and communicating economic information to permit informed judgments and decisions by users of the information." Financial accounting is essentially the activity of general purpose external financial reporting by business enterprises (including schools). Management accounting, in contrast, is the activity of meeting the informational needs of internal management for purposes of planning and control.

Management accounting is the process of measuring, analyzing and estimating to management on the cost, benefits, and current status of individual activities and segments in an organization. Management reporting is the dissemination of the same information to the internal managers of an organization.

Introduction to the IN$ITE Methodology

IN$ITE is designed to analyze 100% of an educational institution's general ledger expenditures. An educational institution can choose to analyze budgeted figures or actual spending, depending on the institution's accounting cycle. Since the IN$ITE software can analyze either budgeted or actual expenditures, school management can use it to determine if a district is meeting budgeted targets. Thus in one aspect, the IN$ITE software of the present invention acts as an overlay to a general ledger program.

In addition to collecting information on a district's budgeted or actual expenditures, IN$ITE also analyzes information at the level of individual school sites. School-by-school data allows community leaders to view how schools that are within the same district compare on spending patterns, and whether some schools are more efficient than others.

Presently school districts aggregate data at the district-level using "top down" methods and processes that eliminate the underlying specificity needed to disaggregate data down to the school-level. Aggregating data at the district-level is distinctly different from IN$ITE'S methodology for "rolling up" detail data from each school into a district total. Aggregation pools expenditures into summary totals making a later disaggregation to the school-level impossible. In contrast, by using the school site as a unit of analysis and In$ite's unique "rolling up" methodology to arrive at district-level reporting preserves the specificity needed to analyze both school site and district-level expenditures.

The IN$ITE model uses a relational database to tabulate and present multi-dimensional information on district and school expenditures. The three basic dimensions of IN$ITE include a Functional Dimension, a Program Dimension and a Locational (or site-based) Dimension.

As mentioned earlier, basic financial systems, such as a General Ledger, or a Budgeting system generally incorporate flat files, and more recently, databases that are customized to a single user's needs. In contrast, In$ite translates an (imported) flat file into a relational database. This saves users the cost of upgrading and migrating their basic financial systems and data sets to a state-of-the-art relational database, not to mention the comcomitant performance enhancement resulting therefrom.

The Functional Dimension of IN$ITE

The Functional Dimension of IN$ITE starts with expenditure and budget data and categorizes 100% of an educational institution's funds into one of five classes—Instruction, Instructional Support, Operations, Other Commitments and Leadership. These five functions represent a vital process in education, starting with the core mission of schooling—teaching and learning. Without all five functions, a school district would fail to achieve its mission.

Obviously, a school district cannot operate without buildings, buses, materials, management and high quality leadership. To date, however, educational institutions have not developed a system for determining the best ratio of instructional expenses to other costs that support instruction. In the absence of real data, the argument often comes down to "the more in the classroom and the less in overhead, support and other costs, the better." However, the "perfect" system is not one in which zero dollars are used for leadership and administration and supervision and 100% of the funds are used in the classroom.

The IN$ITE software package aids in generating and providing real information about the need for and the cost of administration in education. The IN$ITE model incorporates the observation that each level supports, sustains and leverages the level above as part of the education process.

The IN$ITE model is organized to present expenditures for all five functions so that communities can arrive at the proper balance between instructional spending and other costs. Identifying and addressing this balance will not be the same for all pupils in all schools in all communities. What is common is that all five functions always exist in every educational institution and in every school district. Any attempt to improve the efficiency of schools needs to involve reviewing and reallocating the functions and costs of Instruction, Instructional Support, Operations, Other Commitments and Leadership in a systemic way.

Figure 5:
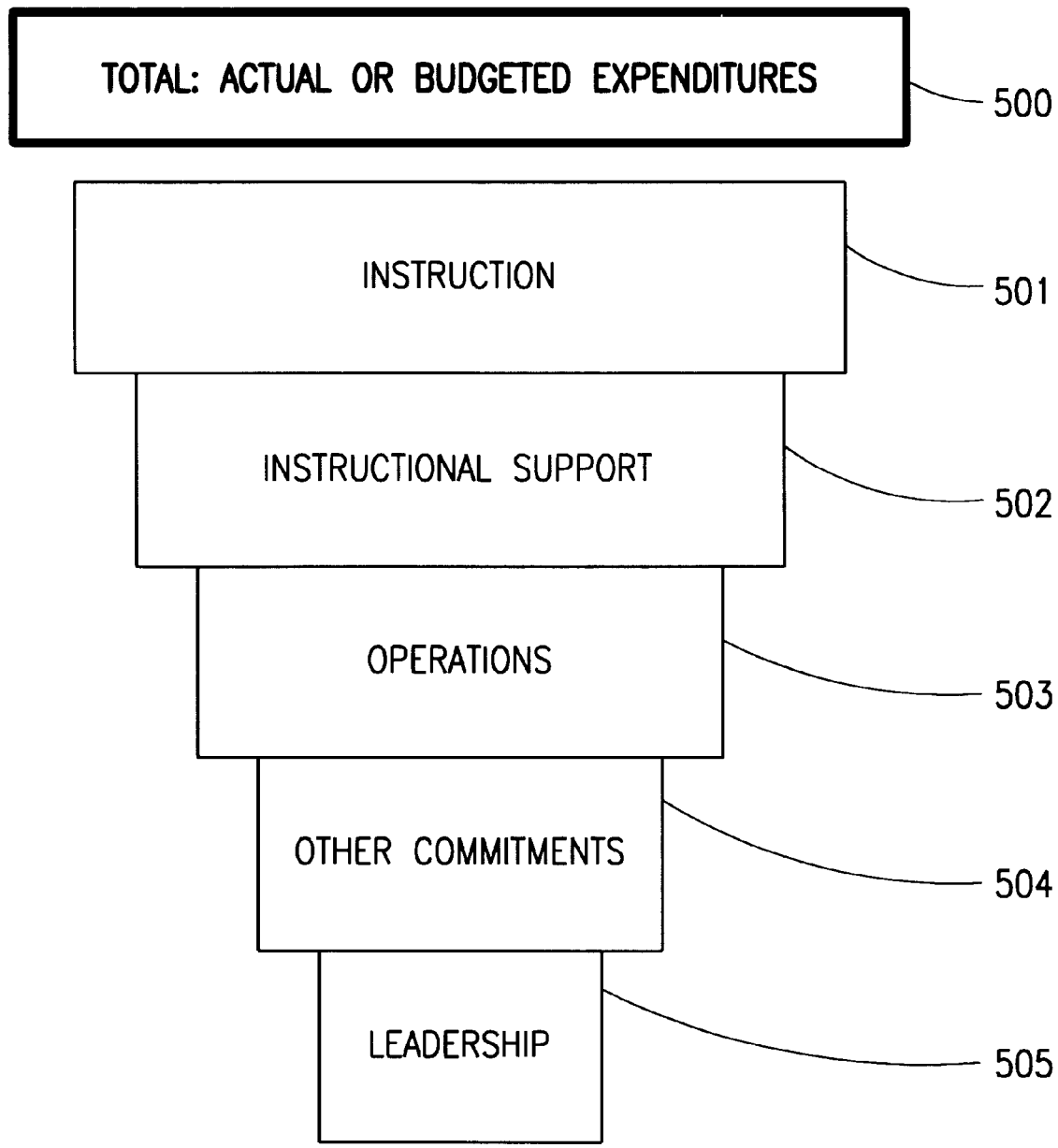
FIG. 5 shows the Functional Dimension of the Finance Analysis Model embodied in IN$ITE.

The Functional Dimension of IN$ITE is illustrated in FIG. 5. As can be seen from FIG. 5, the Total Spending 500, whether budgeted or actual, can be split into five categories 501–505. These five categories are Instructional Expenditures 501, Instructional Support Expenditures 502, Operations Expenditures 503, Other Commitments 504 and Leadership Costs 505.

The use of a standardized methodology for the analysis of school and district performance and expenditures, also permits the benchmarking of effective ratios of spending between Instruction and Instructional Support, among others. Rural, urban and suburban districts are likely to have different benchmarks for the value and efficiency of non-instructional expenditures as measured against the value of Instructional Spending. A demographic analysis may demonstrate that certain children use more pupil-support services than others because of poor home nutrition, health and other conditions. Some educational institutions may have greater costs associated with operations than others. For example, an educational system may have higher costs in some regions because of higher average distance of pupils from the school, variable heating and cooling costs, and security and control needs.

In order to implement the IN$ITE model, an understanding of its five functions is essential. The five IN$ITE functions are described next. The IN$ITE Instruction Function 501 represents the very foundation of education because it is directed at capturing a student's interest in learning, understanding and applying knowledge. The IN$ITE model interprets the term "Instruction" as including face-to-face teaching, irrespective whether the setting is a science laboratory or a field trip. Most costs of classroom instruction pertain to teachers (their salaries, benefits and pensions), their helpers (instructional paraprofessionals, substitutes) and materials (textbooks, desks, technology, software, workbooks, laboratory books and supplies).

Each of the five IN$ITE Functions can be split into Subfunctions and Detail Functions as illustrated in FIG. 6. FIG. 6a shows that the IN$ITE Instruction Function 501 can be split into the Subfunctions of Face-To-Face Teaching 601 and Classroom Materials 602. The IN$ITE Subfunction Face-To-Face Teaching 601 can be further subdivided into the IN$ITE Detail Functions: Instructional Teachers 611, Substitutes 612 and Instructional Paraprofessionals 613. Likewise the IN$ITE Subfunction Classroom Materials 602 can be subdivided into the Detail Functions of Pupil Use, Technology and Software 614 and Instructional Materials, Trips and Supplies 615.

Instructional Support 502 covers all aspects of student and teacher services that are unrelated to teaching. Guidance counseling, mental and physical health, media, curriculum development, program development and library services are all considered instructional support. Extracurricular activities such as sports and clubs fall within this category. Expenditures for teacher staff development are also included in this category. All short-term and long-term programs supporting general instruction likewise belong to this category. However, Instructional Support 502 does not include the direct and indirect costs of senior district administrators who are not involved in the daily delivery of programs to students as they are categorized instead under the IN$ITE Leadership Function 505.

Categorizing expenditures (actual or budgeted) as belonging to Instructional Support 502, is best justified when an expenditure makes possible improved instruction by better prepared and trained staff of students who are physically and psychologically well and ready to learn. As can be seen from FIG. 6b, the IN$ITE Instructional Support Function 502 can be subdivided into IN$ITE Subfunctions 621–623, which in turn can be further subdivided into IN$ITE Detail Functions 631–639.

The IN$ITE Operations Function 503 includes the infrastructural needs of schools. These needs include non-instructional pupil services (such as transportation, food services and safety), school facility costs, non-school facility costs and business services such as payroll, human resources, finance and accounting. School and non-school facilities include maintenance costs, utilities, custodian services and grounds keeping. The costs of senior administrative staff who are not involved in the daily delivery of these services are not included in the IN$ITE Operations Function 503 but are instead included in the IN$ITE Leadership Function 505.

Figure 6A:
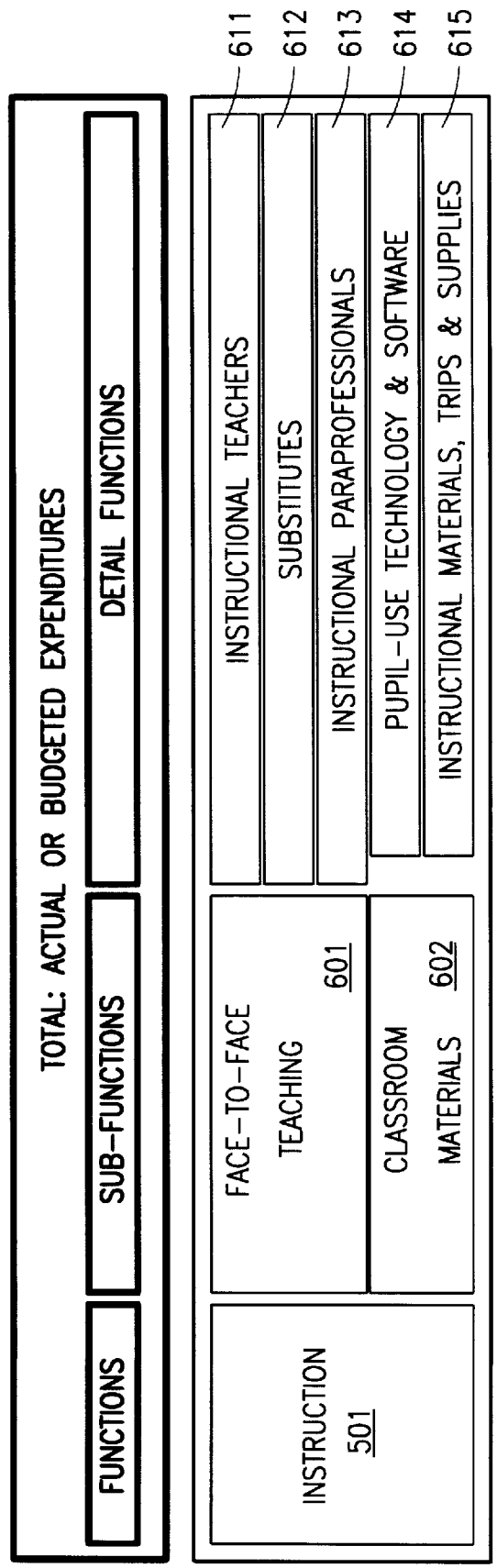
FIGS. 6a–6e show the interrelationship between IN$ITE Functions, IN$ITE Subfunctions and IN$ITE Detail Functions.
Figure 6B:
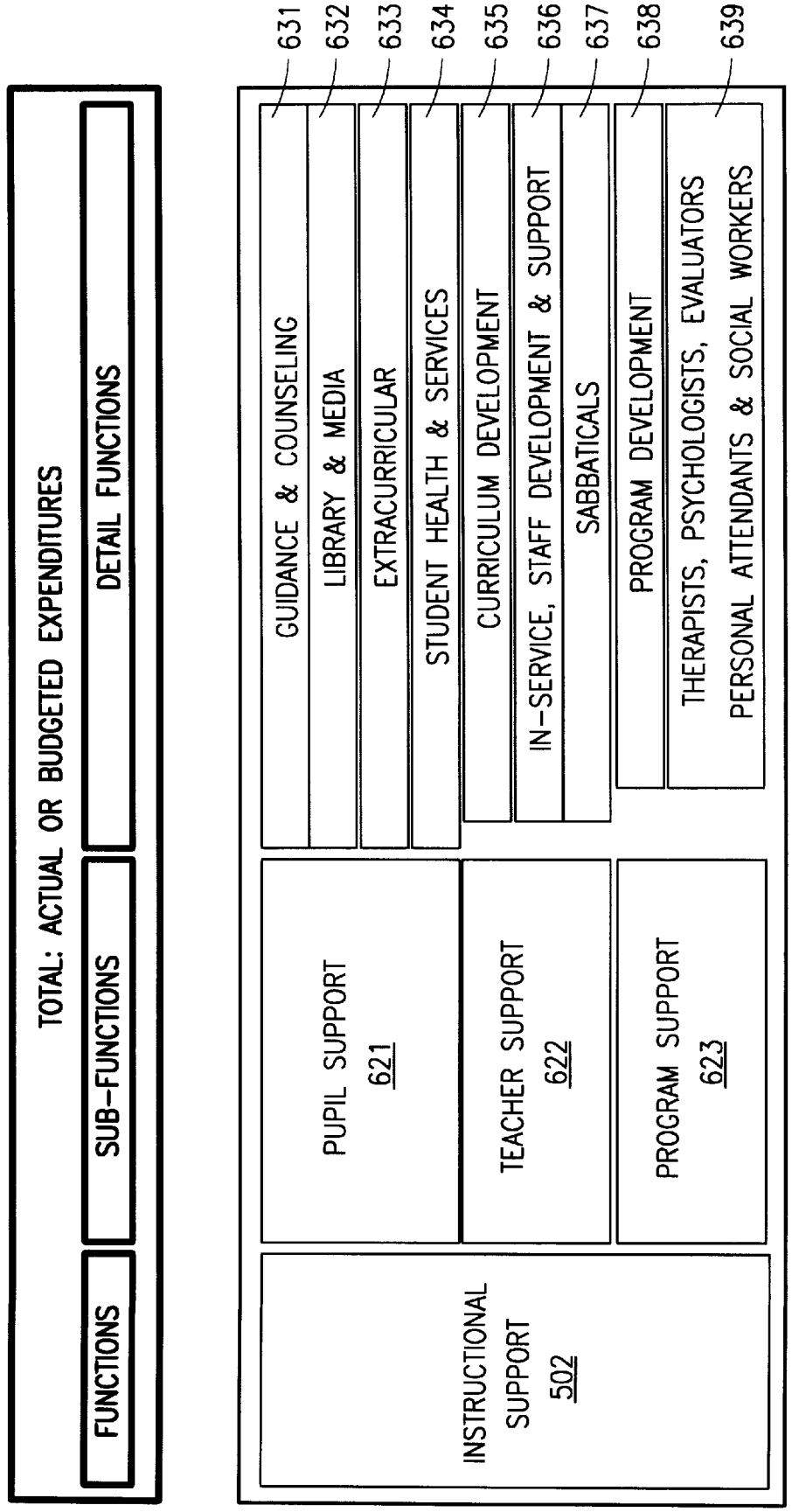
Figure 6C:
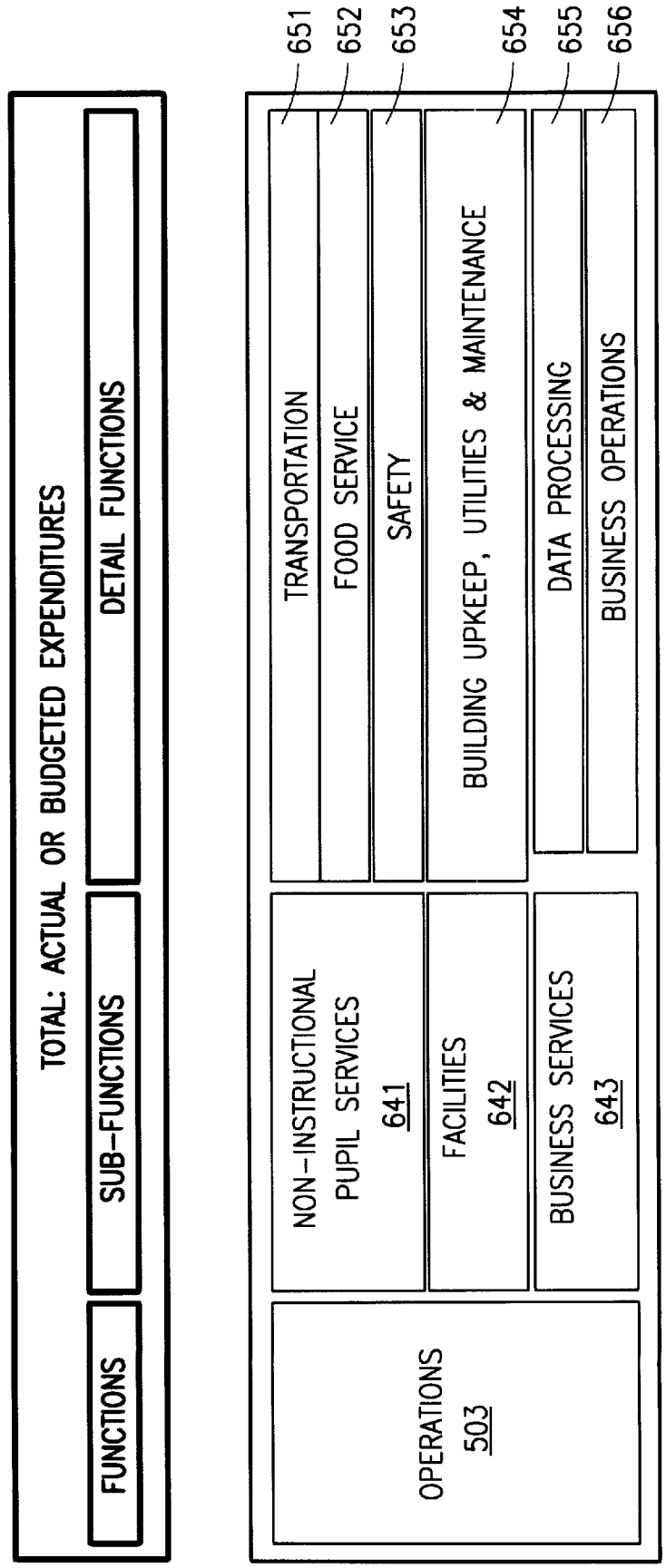

As illustrated in FIG. 6c, the IN$ITE Operations Function 503 can be subdivided into IN$ITE Subfunctions 641–643 which in turn can be subdivided into IN$ITE Detail Functions 651–656.

The IN$ITE Other Commitments Function 504 covers items that are not considered part of a school's day-to-day operations. It has been found that Other Commitments expenditures can fluctuate significantly from one school district to the next, even when the districts are contiguous or within the same state. This category facilitates the standardization and comparison of school districts of similar size. Such a comparison would be virtually impossible if these expenditures were allocated among every IN$ITE program and function. By capturing such obligations in a separate category, the IN$ITE model makes it possible to compare expenditures from school-to-school and district-to-district across the country.

School districts and states, often have expenses related to borrowing money (i.e., debt obligations) that need to be retired, costs of pensions, fringe benefits and incentives for early retirement. Under federal and state programs, some funds "flow through" the district's accounting records. Examples of such funds include funds for school district children who attend schools outside the district or for eligible students in private and parochial schools who receive federally-supported Title 1 services for low-income families. Traditionally, such costs—although paid for through the district—are excluded from cost analyses. The goal of the IN$ITE model, however, is to capture all relevant costs by state, district and school to permit a full analysis of real costs.

Figure 6D:
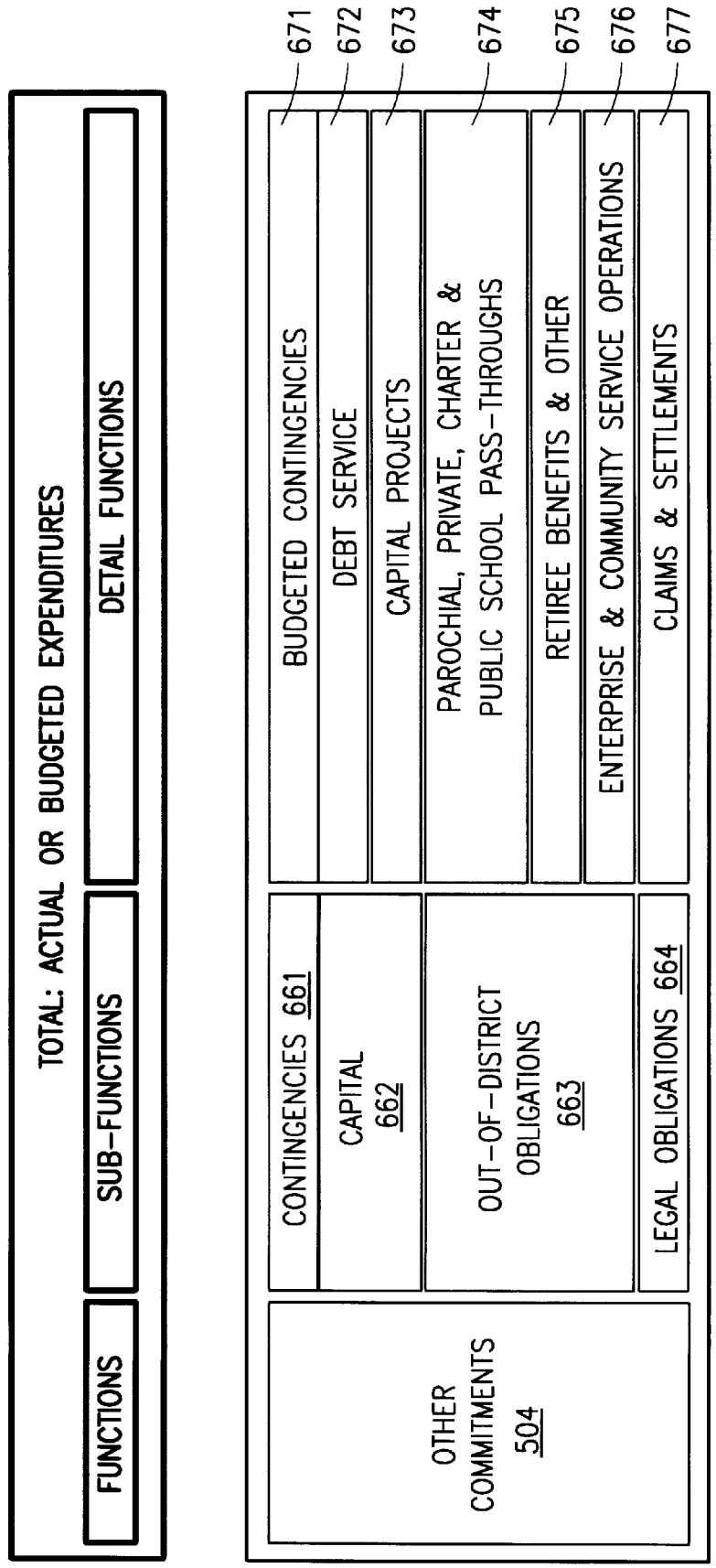

As shown in FIG. 6d, the IN$ITE Other Commitments Function 504 can be subdivided into IN$ITE Subfunctions 661–664 which in turn can be further divided into IN$ITE Detail Functions 671–677.

The IN$ITE Leadership Function 505 is the primary driving force of an organization. This classification includes those people and functions who make plans, direct goals and oversee the implementation of the mission of the district and its schools. The Finance Analysis Model recognizes that direction is given to an educational institution by creative active leadership. These individuals give shape to the use of facilities and operations, see that students and staff receive adequate support and ensure that the classroom is the center of the instructional system.

Thus, the IN$ITE model identifies all the costs that are related to managing the school system as belonging to the IN$ITE Leadership Function 505. Such costs often include the salaries and benefits of the superintendent, assistants and deputies, senior administrators, legal affairs and the school board. Leadership expenses 505 also include the costs of principals and assistant principals.

Figure 6E:
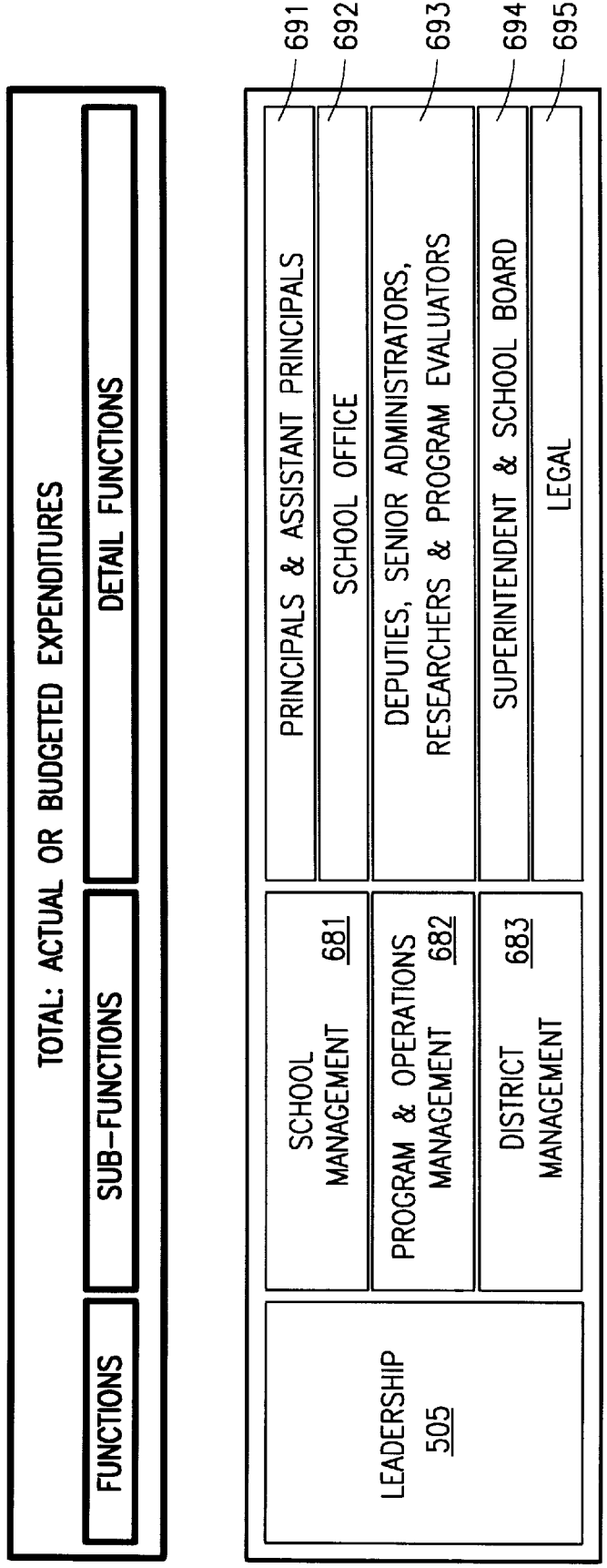

As shown in FIG. 6e, the IN$ITE Leadership Function 505 can be subdivided into IN$ITE subfunctions 681–683 and each of these in turn can be further divided into IN$ITE Detail Functions 691–695.

Figure 7:
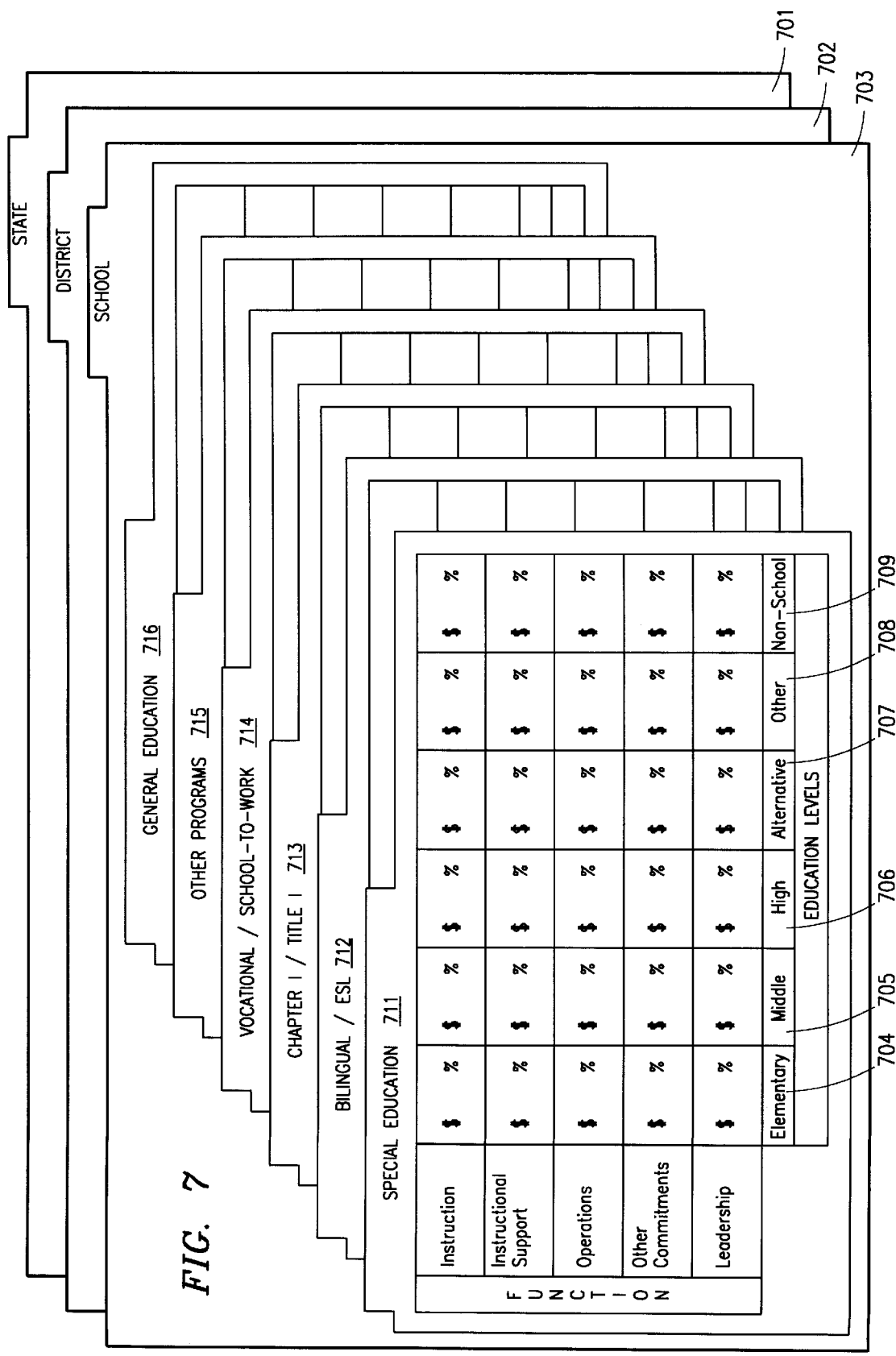
FIG. 7 shows the Program and School-Site Dimensions of the Finance Analysis Model.

The second and third dimensions of IN$ITE, namely, the Program Dimension and the School-Site (or Locational) Dimension, are illustrated in FIG. 7. Various expenditures (that can be either actual or budgeted) can be summarized at the State-level 701, the District-level 702 or the School-level 703. As shown in FIG. 7, School-level expenditures may also be further sub-categorized by educational level or location such as by Elementary School 704, Middle School 705, High Schools 706, Alternative Schools 707, Other Schools 708 and Non-School expenditures 709.

The IN$ITE methodology also permits expenditures to be visually displayed by program such as Special Education 711, Bilingual Education 712, Chapter I/Title I Education 713, Vocational Education 714, Other Programs 715 and General Education 716. Under any of the above classifications, the IN$ITE model permits the review of expenditure data by any of the five IN$ITE Functions 501-505 or IN$ITE Subfunctions or IN$ITE Detail Functions 601–695.

The IN$ITE Software Environment

Figure 8:
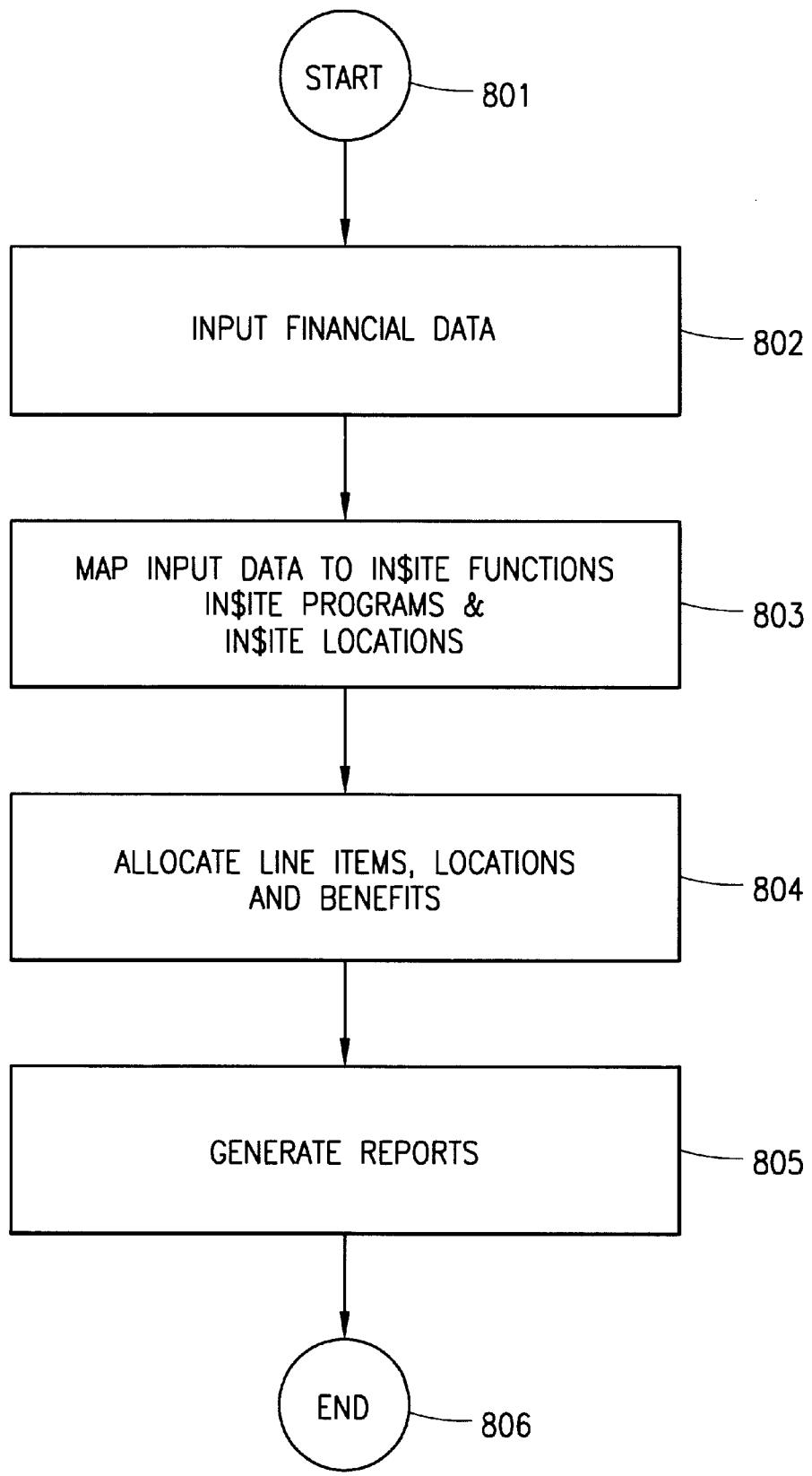
FIG. 8 is a high-level overview of the IN$ITE Finance Analysis Model software of the present invention.

A high-level overview of the IN$ITE software environment is depicted in FIG. 8. The process of using the IN$ITE software environment starts at 801 with the installation of the IN$ITE software. Various security features such as the establishment of user IDs and passwords are also handled at this stage. The next principal step in the use of the IN$ITE software package is the import of financial data from a school district's general ledger program as shown at 802. This input data is then mapped at 803 to a specific and standardized set of IN$ITE Functions, IN$ITE Programs and IN$ITE Locations [Please confirm]. It should be emphasized that the IN$ITE program is capable of mapping financial data to various locations unlike other currently-available financial analysis packages. For example, when a school district maintains its general ledger without location codes, the expenditures associated with various cost centers can be mapped to those locations by using IN$ITE'S line item maintenance utility in conjunction with the allocations engine.

Next, line items, locations and benefits are allocated at 804 as described elsewhere in this patent application. Finally, reports are generated at 805 before the process ends at 806.

IN$ITE is an overlay program that "sits on top of" a general ledger package. In one aspect, IN$ITE is a data mining tool that operates on a scrubbed version of the original input file. Using database management terminology, the original input file is the data warehouse. The data in the data warehouse is scrubbed for data mining using the mapping and the allocations engines of IN$ITE. Thus, the system and method of the present invention creates a standard for converting financial data from a general ledger package into a standardized format that may be easily and safely analyzed by data mining tools, such as data blades.

Figure 9:
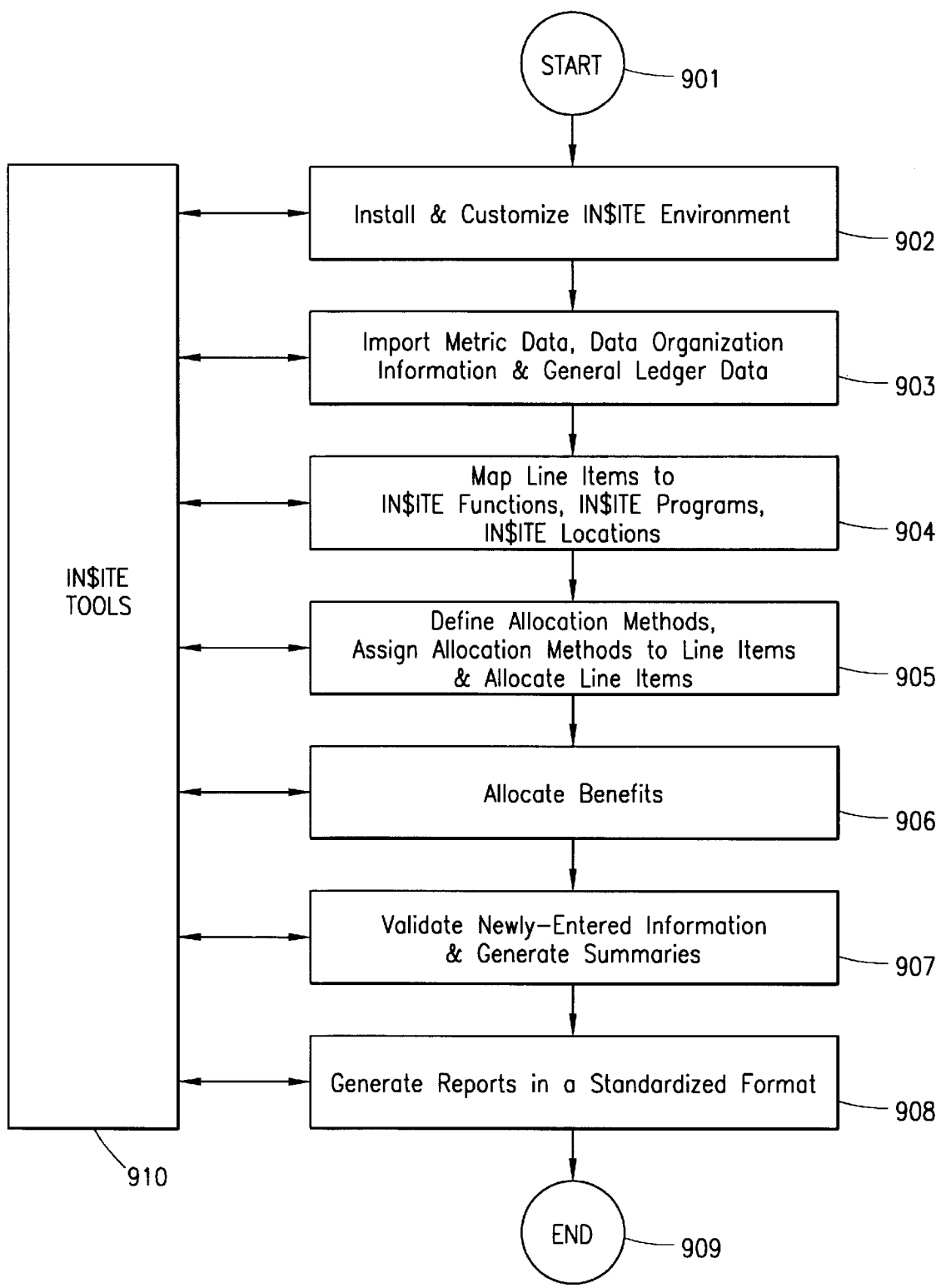
FIG. 9 shows an intermediate-level block diagram of the interaction of various components of the IN$ITE software environment.

FIG. 9 shows an intermediate-level block diagram of the interaction of various components of the IN$ITE software environment. As shown in FIG. 9, a user invokes the IN$ITE environment at 901. The first step, as shown at 902, is the installation and customization of the IN$ITE software environment. It should be noted that the IN$ITE software program is designed to work in harmony with Microsoft Corporation's Windows™ operating system environment. Consequently the IN$ITE software environment provides a number of Windows™ compatible features and functions. These include the minimize and maximize buttons and paging buttons to permit the display and review of multiple-page displays. Such Windows™ features are not illustrated in FIG. 9.

Step 901 includes the installation of the IN$ITE software and establishment of various security procedures such as user IDs and passwords. As described in the IN$ITE User Manual entitled IN$ITE™: SYSTEM USER'S GUIDE hereby incorporated by reference herein, and which is essentially identical to Appendix A of the earlier-filed provisional patent application, the IN$ITE software environment offers a multitude of choices for the customization of the IN$ITE environment to match user needs.

The next step is the setup of the system at 903. This includes providing primary information to the IN$ITE software such as the name of the school district, the school year that is to be analyzed and the total expenditures and budget of the school system for the analysis year.

The User Labels screen is then setup to provide information to the IN$ITE software about the structure of input files, to activate user fields and to establish field descriptions and formats. Program enrollment data is then input. The final stage of step 903 is the import of data in one or more stages.

Location data is first imported followed by the import of code table data (that comprise explanatory descriptors of the numerical data fields). It should be noted that the import of the code table data is optional in IN$ITE and while often useful, may not be necessary in every situation. Finally, detailed data is imported from the General Ledger system of the school district. The next major step in the operation of the IN$ITE software is the mapping of line items to standardized IN$ITE Functions, IN$ITE Programs and IN$ITE locations at 904. This step includes the reconciliation of duplicate line items and of non-expenditure line items in order to avoid the double counting of financial information.

The mapping process is followed by allocation. As can be seen from FIG. 9, there can be two kinds of allocations: Allocation of Costs at 905 and Allocation of Benefits at 906. Different methodologies are used for the allocations of costs and of benefits. This is detailed in the text accompanying FIGS. 10 to 13. Newly-entered information is validated for conformance with range limitations and summaries are generated at 907. Finally, these summaries are used to generate reports in a plurality of standardized formats at 908.

It should be emphasized that the use of a standardized reporting format in combination with a standardized methodology for the allocation of costs and benefits and mapping of line items to IN$ITE Functions and IN$ITE Programs permits the comparison of different school systems even when they are not geographically proximate.

As shown in FIG. 9, there are a variety of IN$ITE Tools that may be accessed by the IN$ITE software environment at any stage during the operation of the program. The IN$ITE Tools that are shown at 910 constitute an extension of those features that are commonly available in the Windows™ operating system environment.

Allocating Costs and Benefits

Prior to a more detailed consideration of the IN$ITE User Interface, it would be useful to review the methodological and implementational differences between the allocation of costs and the allocation of benefits. The term *Allocation of Costs* refers to the distribution among school sites of the costs of goods or services delivered to a student or staff member. In contrast, the term *Allocation of Benefits* refers to the distribution among school sites of the costs of various staff and other benefits. Benefits allocation is also used to distribute centrally-managed benefit costs to salary line items as needed. The process of allocating costs or benefits can be performed only after line items have been mapped to IN$ITE Functions, IN$ITE Programs and IN$ITE Locations.

An allocation method determines the way a cost is distributed. Examples of such allocation methods include the number of meals served, the number of miles traveled by bus, or the like. IN$ITE contains dozens of pre-specified allocation categories. In addition, a user may create his or her own allocation metrics. The allocation weight determines the amount to be allocated to a particular location. Thus, a school that serves 1500 meals a day would be assigned an allocation weight of 1500 if the basis for allocating costs were to be the number of meals served per day.

Figure 10:
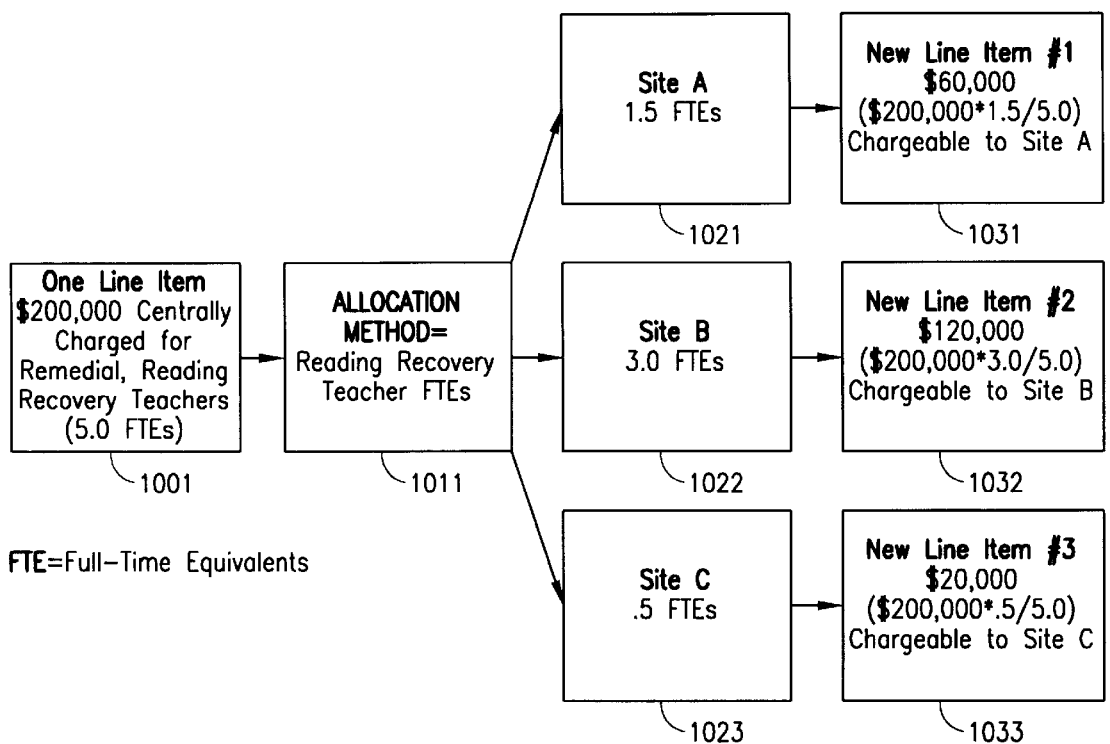
FIG. 10 shows an illustrative example of the Allocation of Costs Process based upon the deliverer of instruction.
Figure 11:
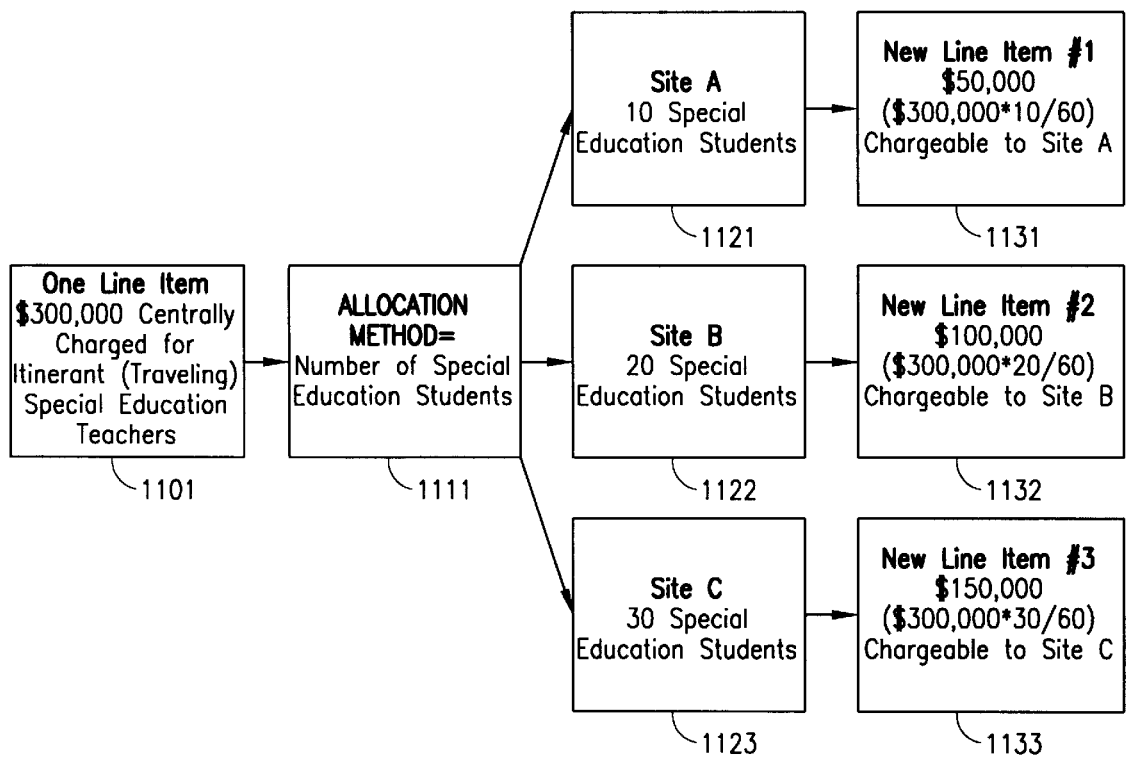
FIG. 11 depicts an exemplary allocation based upon the receiver of instruction.
Figure 12:
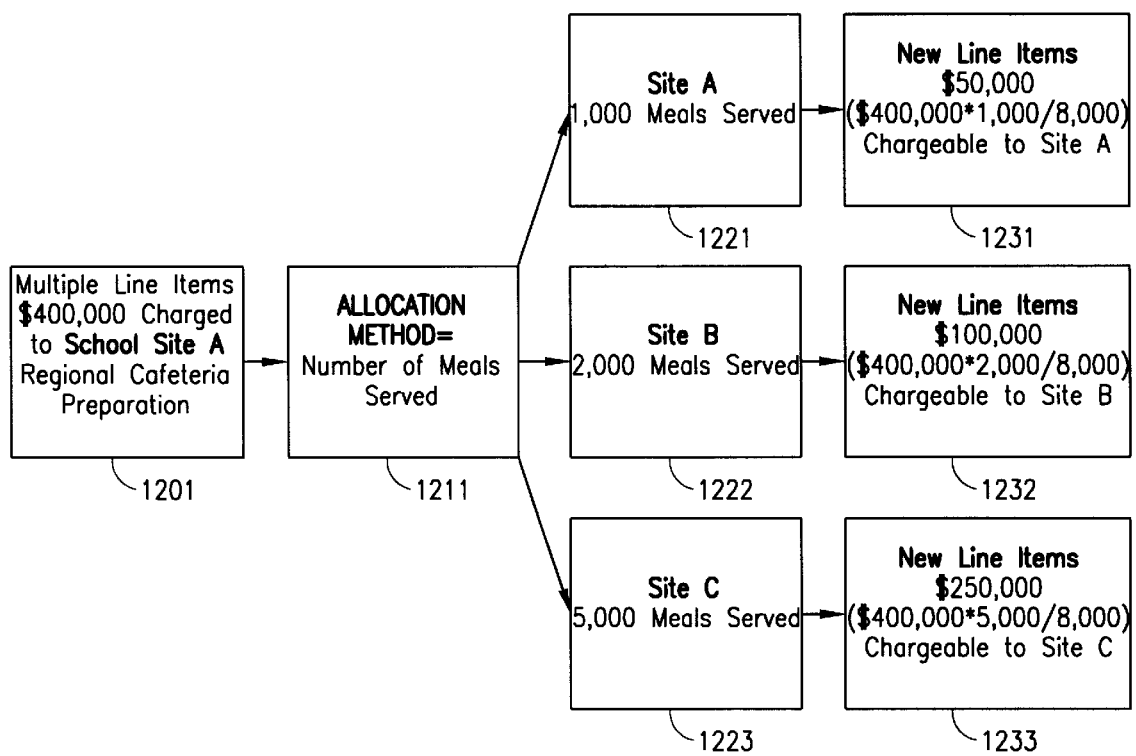
FIG. 12 depicts an exemplary allocation from one school to multiple school sites.
Figure 13:
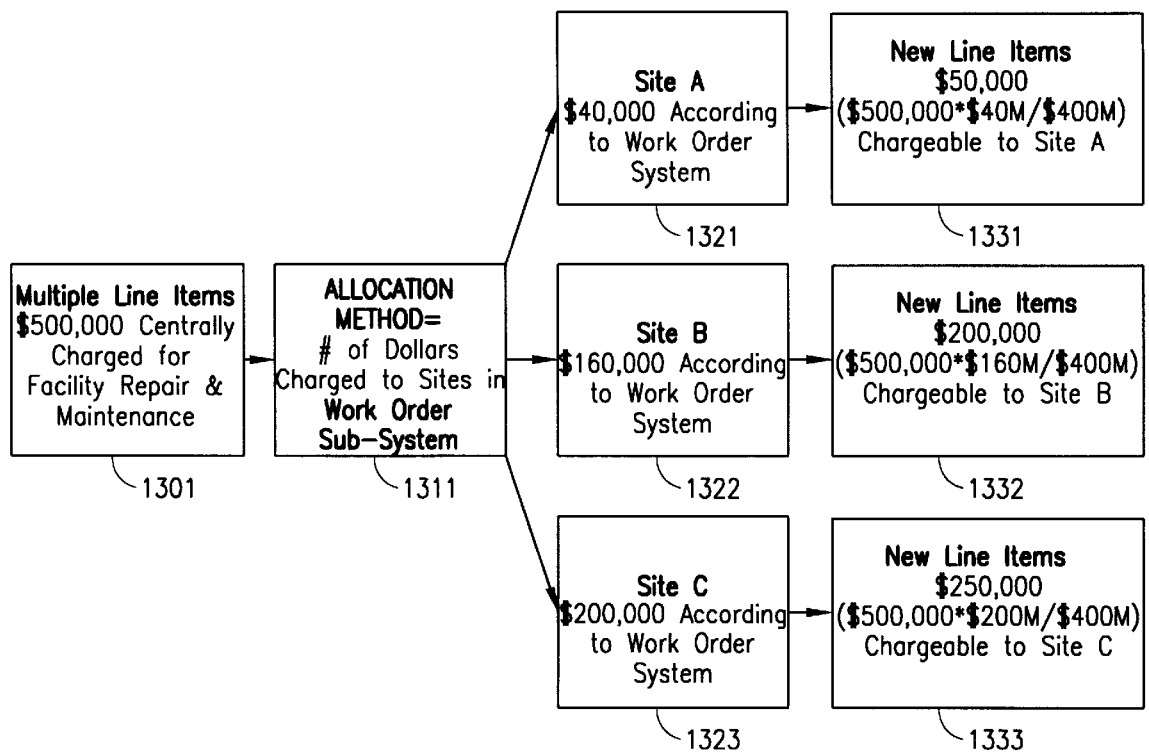
FIG. 13 depicts an exemplary allocation based on a proxy metric.
Figure 14:
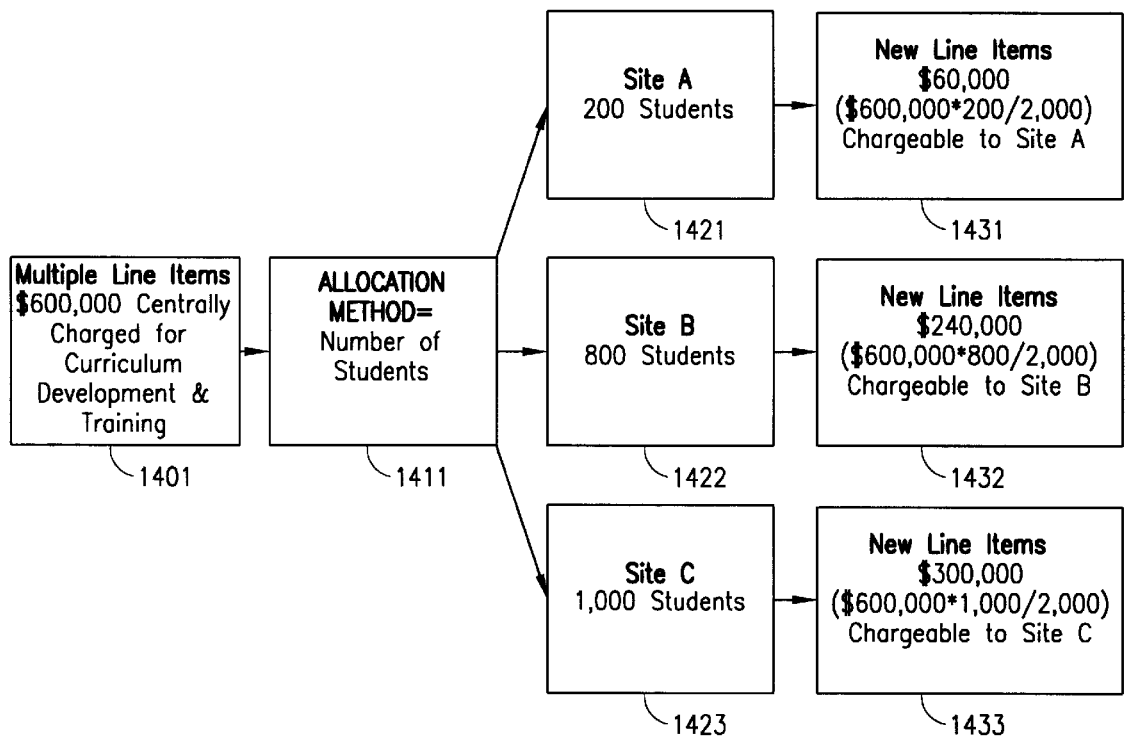
FIG. 14 depicts an exemplary allocation of instructional resources by student enrollment.
Figure 15:
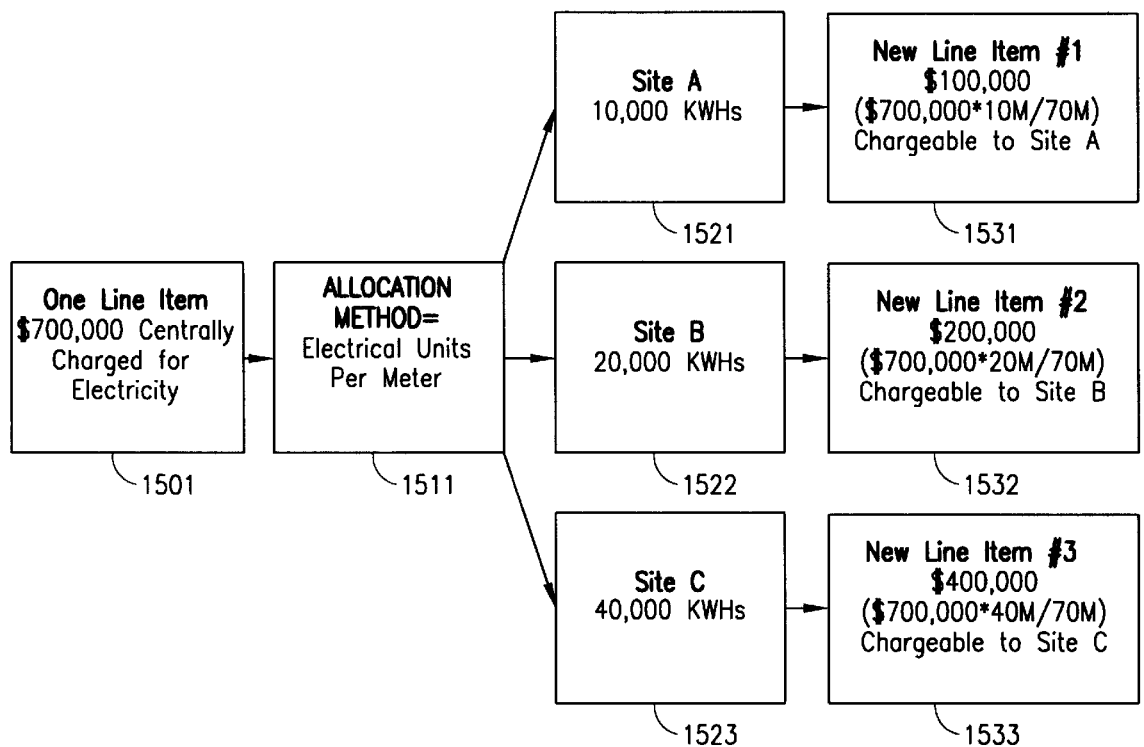
FIG. 15 depicts an exemplary allocation of non-instructional resources by an usage metric.

The Allocation of Costs Process is illustrated in FIGS. 10–15 for various exemplary allocation metrics. FIG. 10 depicts allocation based upon the deliverer of instruction. FIG. 11 depicts allocation based upon the receiver of instruction. FIG. 12 depicts allocation from one school to multiple school sites. FIG. 13 depicts allocation based on a proxy metric. FIG. 14 depicts allocation of instructional resources by student enrollment. And, FIG. 15 depicts allocation of non-instructional resources by usage metric.

FIG. 10 shows an illustrative situation where one line item totaling $200,000 that has been centrally charged for five remedial reading recovery teachers needs to be allocated between three school sites A, B and C on the basis of the number of the Reading Recovery Teacher FTEs at each school site. The amount to be allocated (namely, $200,000) is shown at 1001 and the allocation method (namely, based upon the number of Reading Recovery Teacher FTEs) is shown at 1011.

Assume that sites A, B and C have 1.5, 3.0 and 0.5 FTEs respectively as shown at 1021–1023. The IN$ITE software environment divides the centralized cost of $200,000 among the school sites A, B and C based upon the allocation weight for each site. It should be noted that the allocation method and the rate need to be established a priori for each of the locations involved.

The $200,000 remedial education item is divided into three new line items. The dollar amount allocated to each of sites A, B and C is based upon the allocation method (i.e., the weight) assigned to each site. Since the weight in this case is the number of Reading Recovery Teacher FTEs, we get three new line items as shown at 1031–1033. Line item 1031 reveals that a cost of $60,000 is chargeable to site A while line item 1032 shows a cost of $120,000 chargeable to site B. Line item 1033 shows that only $20,000 is chargeable to site C.

It should be noted that the new line items that are created have the same chart of accounts structure as the location to which they are being allocated. As a final step, the original line item is deactivated (although retained for verification purposes) to prevent double counting.

FIG. 11 shows an illustrative situation where one line item totaling $300,000 that has been centrally charged for Itinerant Special Education Teachers needs to be allocated between three school sites A, B and C on the basis of the number of the number of Special Education Students at each school site. The amount to be allocated (namely, $300,000) is shown at 1101 and the allocation method (namely, based upon the number of Special Education Students) is shown at 1111.

Assume that sites A, B and C have 10, 20 and 30 Special Education Students respectively as shown at 1121–1123. The IN$ITE software environment divides the centralized cost of $300,000 among the school sites A, B and C based upon the allocation weight for each site.

The $300,000 Special Education item is divided into three new line items based upon the number of Special Education Students at each school site as shown at 1131–1133. Line item 1131 reveals that a cost of $50,000 is chargeable to site A while line item 1132 shows a cost of $100,000 chargeable to site B. Line item 1133 shows that $150,000 is chargeable to site C.

It should be noted, as before, that the new line items that are created have the same chart of accounts structure as the location to which they are being allocated. Again as before, the original line item is deactivated (yet retained for verification purposes as a final step to prevent double counting.

FIG. 12 shows an illustrative situation where multiple line items totaling $400,000 that have been charged to school site A for the operation of a regional cafeteria need to be allocated between three school sites A, B and C on the basis of the number of meals served at each school site. The amount to be allocated (namely, $400,000) is shown at 1201 and the allocation method (namely, based upon the number of meals served) is shown at 1211.

Assume that 1000, 2000 and 5000 meals are served at sites A, B and C as shown at 1221–1223. The IN$ITE software environment divides the centralized cost of $400,000 among the school sites A, B and C based upon the number of meals served at each school site. The $400,000 food service item is divided into three new line items as shown at 1231–1233. Line item 1231 reveals that a cost of $50,000 is chargeable to site A, line item 1232 shows a cost of $100,000 chargeable to site B and line item 1233 shows $250,000 chargeable to site C.

FIG. 13 shows an illustrative situation where one line item totaling $500,000 that has been centrally charged for Repair and Maintenance of Facilities needs to be allocated between three school sites A, B and C on the basis of an internal bookkeeping measure, such as that used in a Work Order Sub-System. In many educational institutions, the costs of repairs and maintenance are charged to various locations based upon an approximate hourly cost of the service provided. Since the actual hourly cost of the service may be different from the rate charged, the allocations engine has to correct such accounting inaccuracies. The amount to be allocated (namely, $500,000) is shown at 1301 and the allocation method (namely, based upon site costs shown in the Work Order Sub-System) is shown at 1311.

Assume that sites A, B and C have been charged $40,000, $160,000 and $200,000 respectively in the Work Order Sub-System as shown at 1321–1323. The IN$ITE software environment divides the centralized cost of $500,000 among the school sites A, B and C based upon the allocation weight for each site. The $500,000 Facilities Repair and Maintenance item is divided into three new line items as shown at 1331–1333. Line item 1331 reveals that a cost of $50,000 is chargeable to site A, line item 1332 shows a cost of $200,000 chargeable to site B and line item 1333 shows $250,000 chargeable to site C.

FIG. 14 shows an illustrative situation where one line item totaling $600,000 that has been centrally charged for Curriculum Development and Training needs to be allocated between three school sites A, B and C on the basis of the number of students enrolled at each site. The amount to be allocated (namely, $600,000) is shown at 1401 and the allocation method (namely, based upon the number of students enrolled at each site) is shown at 1411.

Assume that 200, 800 and 1000 students are enrolled at sites A, B and C respectively as shown at 1421–1423. The IN$ITE software environment divides the centralized cost of $600,000 among the school sites A, B and C based upon the enrollment at each site. The $600,000 Curriculum Development and Training item is divided into three new line items as shown at 1431–1433. Line item 1431 reveals that a cost of $60,000 is chargeable to site A, line item 1432 shows a cost of $240,000 chargeable to site B and line item 1433 shows $300,000 chargeable to site C.

FIG. 15 shows an illustrative situation where one line item totaling $700,000 that has been centrally charged for Electricity needs to be allocated between three school sites A, B and C on the basis of the metered electricity consumption. The amount to be allocated (namely, $700,000) is shown at 1501 and the allocation method (namely, the metered consumption of electricity) is shown at 1511.

Assume that the metered electricity consumption at sites A, B and C are 10,000, 20,000 and 40,000 kilowatt hours (KWHS) respectively as shown at 1521–1523. The IN$ITE software environment divides the centralized cost of $700,000 among the school sites A, B and C based upon the metered electricity consumption at each site. The $700,000 Electricity item is divided into three new line items as shown at 1531–1533. Line item 1531 reveals that a cost of $100,000 is chargeable to site A, line item 1532 shows a cost of $200,000 chargeable to site B and line item 1533 shows $400,000 chargeable to site C.

Figure 16:
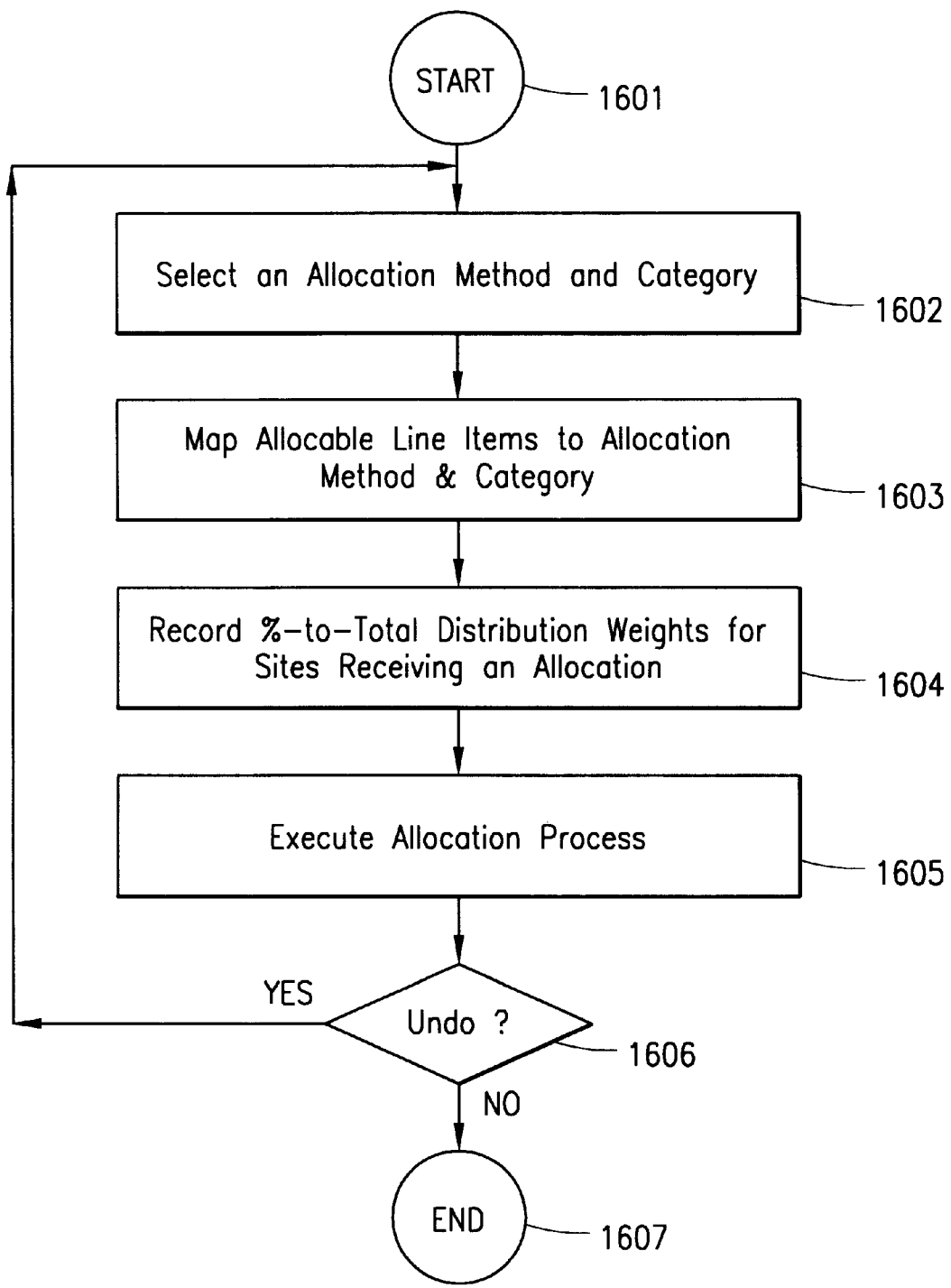
FIG. 16 is a high-level flow chart of the Allocation of Costs Process.

A high-level description of the Cost Allocation Process is detailed in FIG. 16. The process starts at 1601. An allocation method and category is selected at 1602. Allocable line items are mapped to allocation method and category at 1603. Percentage distribution weights for sites receiving an allocation are computed at 1604. The allocation process is then executed at 1605. The user is then provided an opportunity to review the results of the allocation process at 1606. If the user wishes to undo the allocation, the process loops back to 1602. If the allocation results are acceptable to the user, the process ends at 1607.

Figure 17:
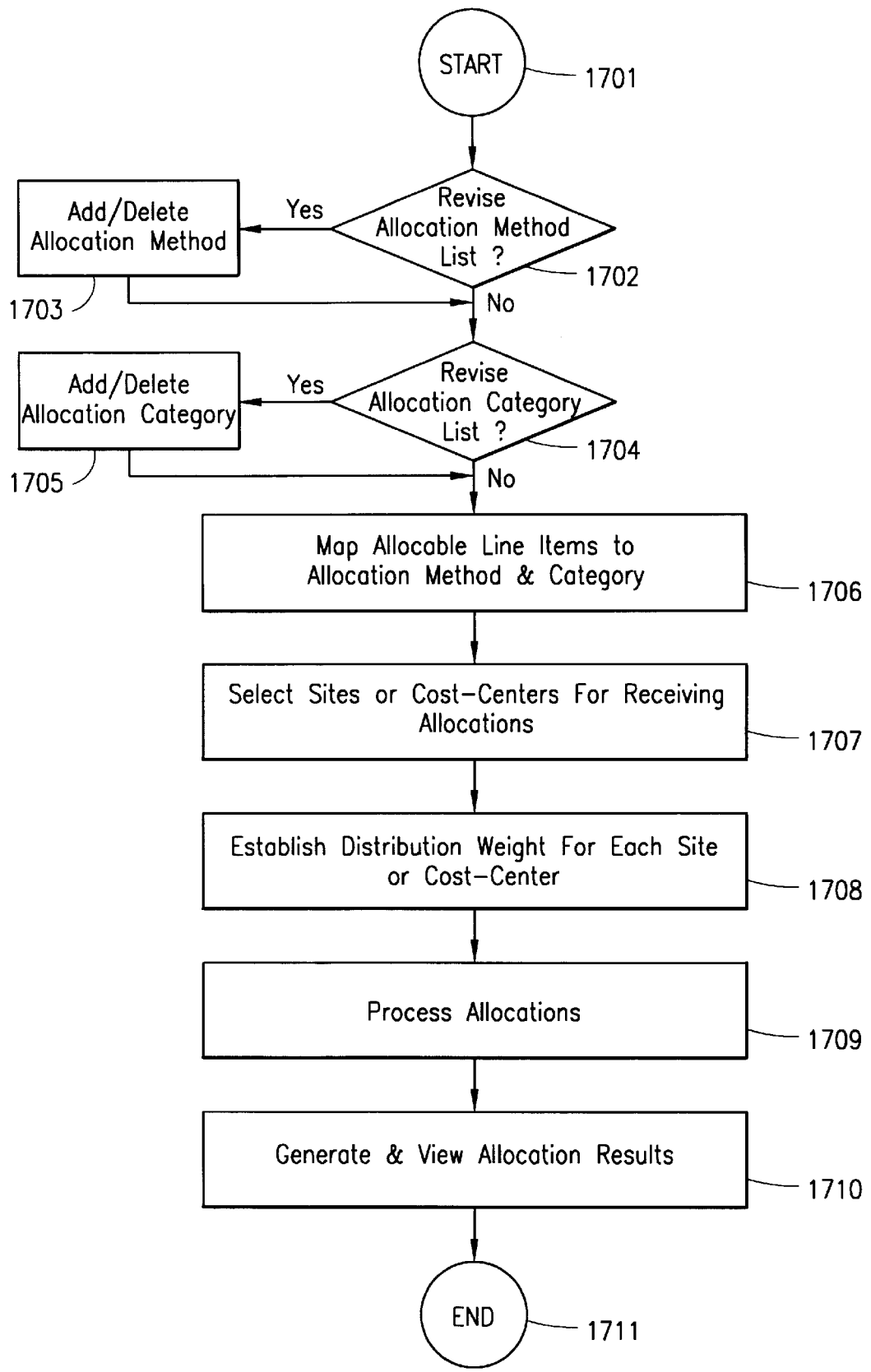
FIG. 17 is an intermediate-level flow chart detailing the steps of the Allocation of Costs Process.

An intermediate-level description of the Cost Allocation Process is detailed in FIG. 17. The process starts at 1701. The first step involves determining the allocation methods that are needed. Costs can be distributed based upon a variety of normative metrics, such as the number of students, number of meals served, number of bus miles traveled, or other methods.

The IN$ITE software environment also allows users to add, revise or delete predefined allocation methods as shown at 1703. If a user does not wish to revise the allocation method list at 1702, then the process jumps straight from 1702 to 1704 wherein the user is presented with the option of revising the allocation category list.

A user wishing to add or delete an allocation category does so at 1705 after which the cost allocation process moves forward to 1706. If a user does not wish to revise an allocation category list, then the process jumps straight from 1704 to 1706. Each allocable line item is then mapped to a specific allocation method and category at 1706. This mapping can be done either line-by-line or collectively using the mass map feature of the IN$ITE software environment.

The most common type of costs that are allocated using this technique are centrally-controlled cost items. Every line item that is allocated needs to have a destination school-site or cost center as indicated at 1707. The locations that the costs are to be allocated to (i.e., the destinations of the financial allocations process) are also selected at this time.

The user then establishes the distribution rate for each site or cost center at 1708 to indicate the allocation weight for each location bearing a portion of the expense being allocated. An allocation weight is the quantity used to distribute the costs such as the school count.

It should be noted that if the allocation method is set so as to be based upon the total number of all students, this figure is automatically extracted by the IN$ITE software from the school enrollment figure. The allocations process is then executed at 1709 and results are generated at 1710. These allocation results are then reviewed and if they do not reflect the reality of school-received resources, the user may iteratively repeat the process in whole or in part until the allocations match the usage of resources in individual locations.

Figure 18:
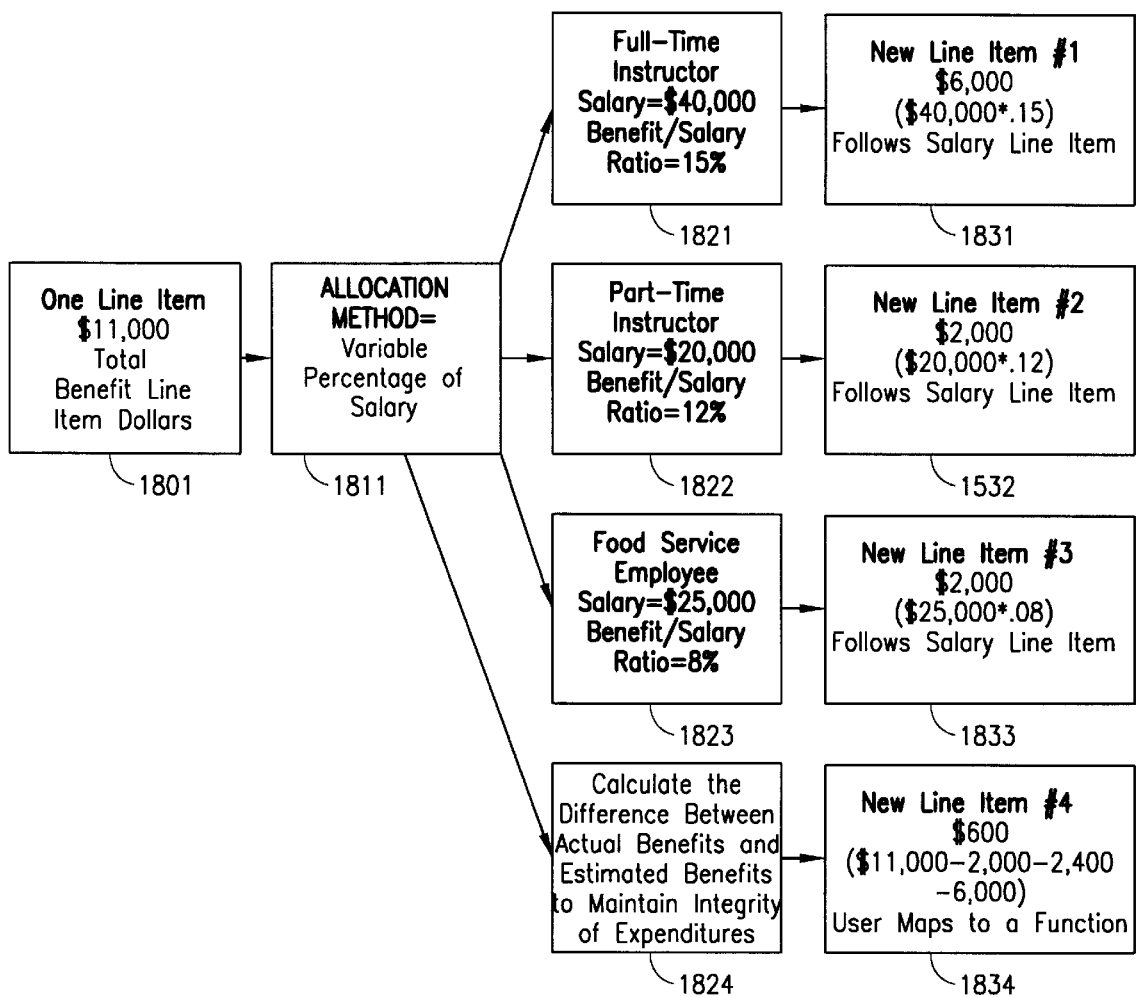
FIG. 18 depicts a specific benefits allocation scenario.

Unlike the deterministic nature of the Allocation of Costs Process, the Allocation of Benefits Process is inherently an iterative process. An example of benefits allocation is illustrated in FIG. 18. As shown at 1801, assume that $11,000 in employee benefits needs to be distributed among three salary line items 1821–1823. The first line item is for a Full Time Instructor earning an annual salary of $40,000. The second line item shown at 1822 is for a Part-Time Instructor earning an annual salary of $20,000. The third line item is for a Food Service employee earning an annual salary of $25,000 as shown at 1823.

Assume that the allocation method to be used for the allocation of benefits is to base the apportionment upon a variable percentage of the salary line item concerned as indicated at 1811. Further, it is assumed in this example that the Full-Time Instructor gets 15% of his or her salary in benefits, the Part-Time Instructor gets 12% of his or her salary in benefits and the Food Service Employee gets 8% of his or her salary in benefits.

We can now estimate the benefits allocation for these three line items as shown at 1831–1833. A new line item 1831 is created allocating $6,000 of the total benefits to the costs of the Full-Time Instructor. Similarly, new line items 1832 and 1833 are created allocating $2,400 and $2,000 of the benefit expenses to the costs of the Part-Time Instructor and the Food Service employee respectively.

Since the total of the allocated costs are less than the total amount of employee benefits needing to be allocated, the shortfall of $600 is reconciled into a new line item whose IN$ITE Function number is 000 and whose IN$ITE Program number is 0. This line item needs to be mapped as shown at 1834 to ensure that the control totals (that are maintained constantly within IN$ITE) match throughout the processing. The reconciliation line item of $600 shown at 1834 represents the excess of actual benefits over estimated benefits. Since all of the $11,000 in benefit costs have now been allocated to other line items, the original line item is finally deactivated.

Figure 19:
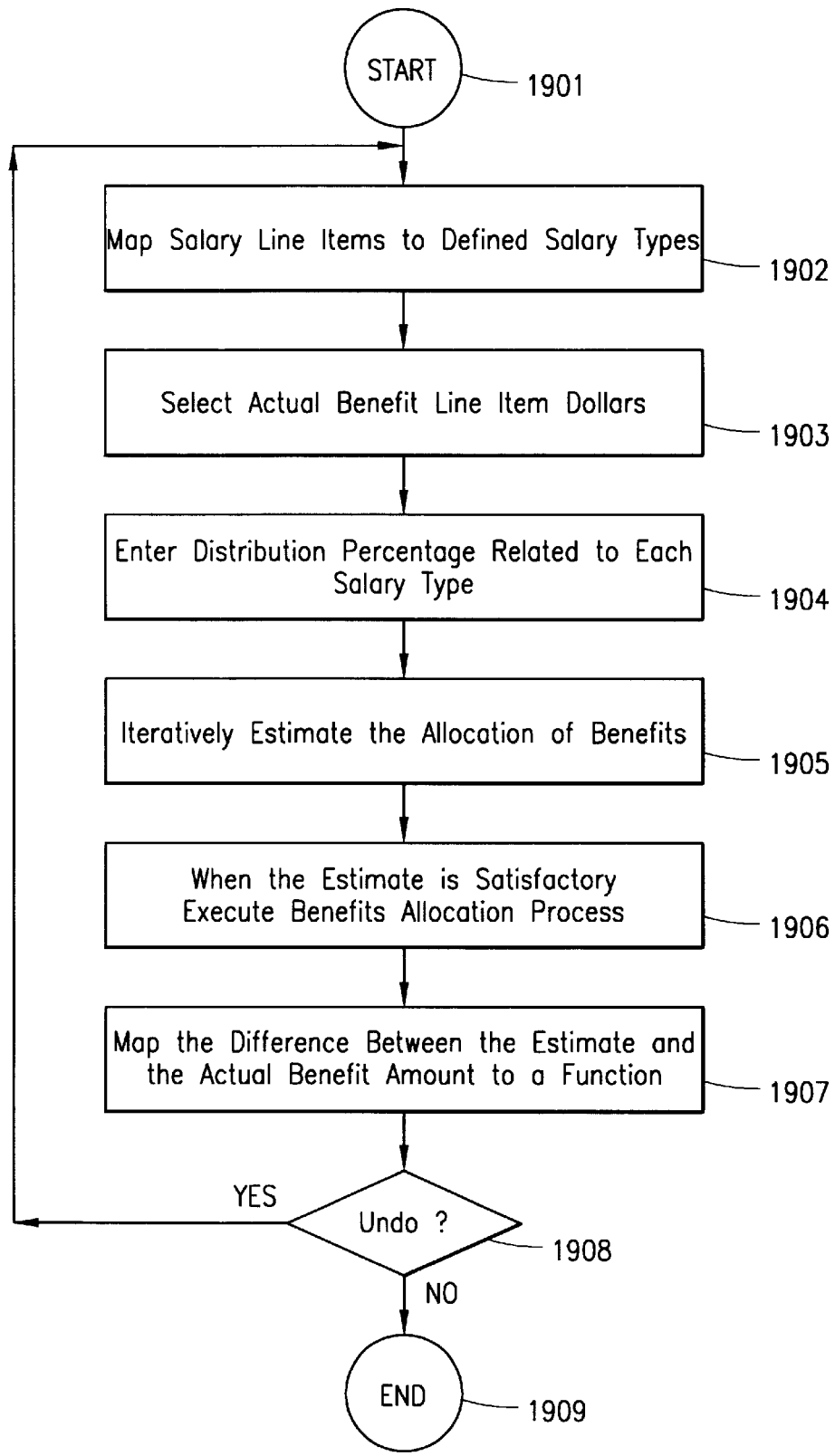
FIG. 19 is a high-level flow chart of the Benefits Allocation Process.

A high-level flow chart of the Benefits Allocation Process is shown in FIG. 19. The process starts at 1901. Salary line items are mapped to defined salary types at 1902. Actual benefit line item costs are selected at 1903. Initial percentage distribution weights related to each salary type are selected at 1904. The allocation of benefits is next estimated iteratively at 1905. If the estimated allocation of benefits is found to be satisfactory, the Benefits Allocations Engine is executed at 1906.

Any difference between the total estimated benefits and the total actual benefits is mapped to a reconciliation function at 1907. The user is then provided an opportunity to review the results of the Benefits Allocation Process at 1908. If the user wishes to undo the allocation, the process loops back to 1902. If the allocation results are acceptable to the user, the process ends at 1909.

Figure 20:
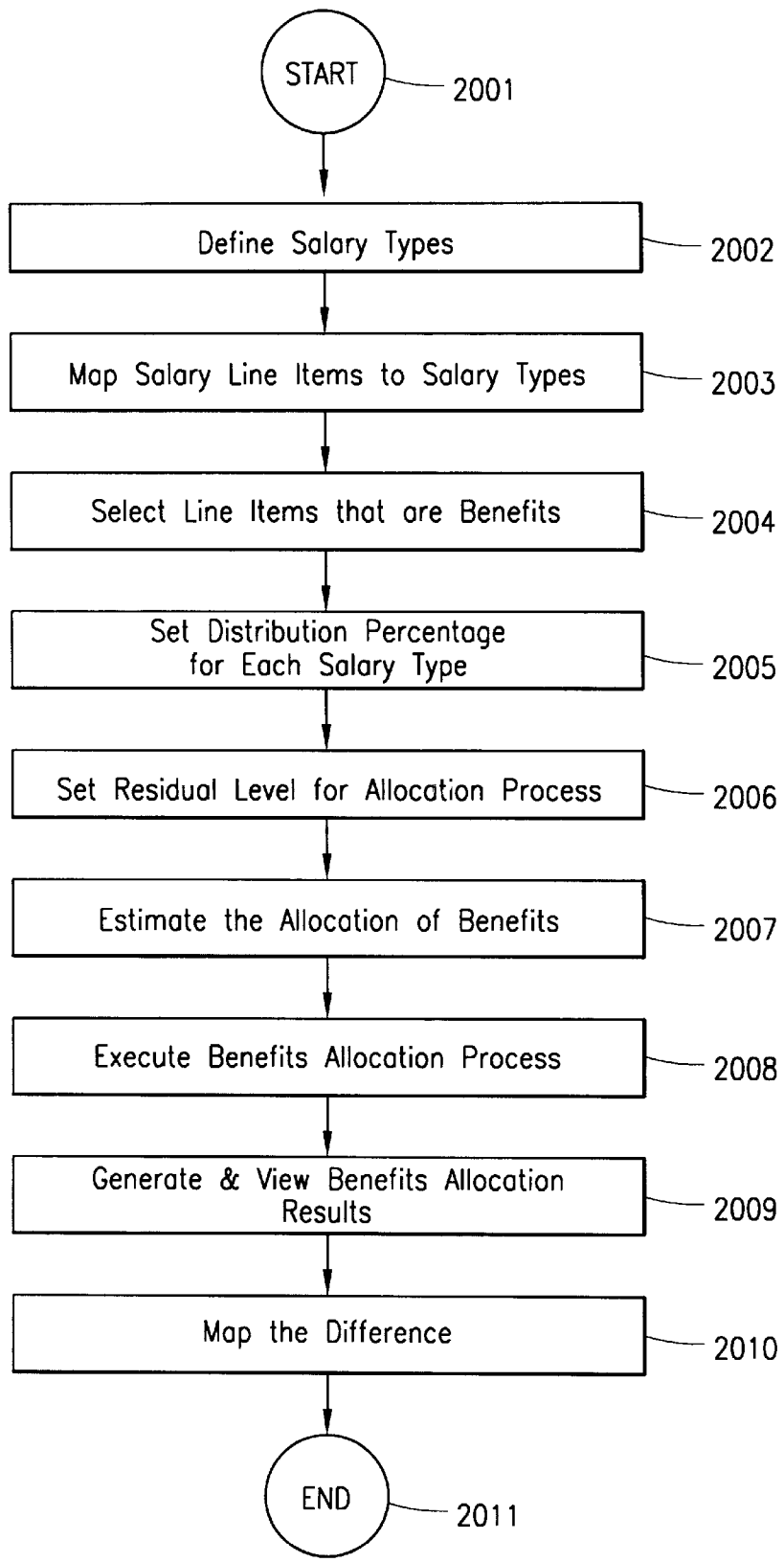
FIG. 20 is an intermediate-level flow chart of the steps of the Benefits Allocation Process.

An intermediate-level description of the Benefits Allocation Process is illustrated in FIG. 20 and starts at 2001. The first step is to define the various salary types at 2002. The next step is to map salary line items to corresponding salary types at 2003. As indicated before, this mapping can be done either one line-item at a time or collectively using the mass map feature of IN$ITE. This is followed by flagging (or identifying) line items that are benefits. All line items flagged as benefits at 2004 will be automatically allocated by IN$ITE based upon the corresponding salary line items.

The Benefits Estimations Process is then used to determine the appropriate distribution of benefit dollars based upon the Distribution Percentages for each salary type. The Distribution Percentage is the percentage of an employee's salary that an employee receives in benefits. It should be noted that the Distribution Percentage will most commonly vary by salary type as shown at 2005. An user sets the residual level for the benefits allocations process at 2006. The IN$ITE software automatically verifies that the costs of benefits are fully allocated to within this tolerance level.

The Benefits Allocations Process then estimates the allocation of benefits at 2007. The benefits allocations process was detailed earlier in the text accompanying FIG. 18. IN$ITE next determines, at 2008, the benefit dollars for each line item within each salary type based upon the Distribution Percentages selected at 2005. A new line item is created for each of the allocated benefit dollars that correspond to a salary line item.

After the IN$ITE software has examined all line items for all salary types, a new line item is created for the remainder of the unallocated benefits. The unallocated benefit line item then needs to be mapped by the user. This reconcialion line item, sometimes referred to as a "plug" record is set at 2010 to have a IN$ITE Function code of 000 and a IN$ITE Program code of 0. After the Benefits Allocations Process is complete the original benefit line items are deactivated. The results of the benefits allocation are then generated at 2009 for viewing by users. If the results of the Benefit Allocations Process proves to be unsatisfactory, a user can undo the allocation and selectively repeat all or part of the Benefits Allocations Process until satisfactory results are obtained. The Benefits Allocations Process then terminates at 2011.

The IN$ITE User Interface

Figure 21A:
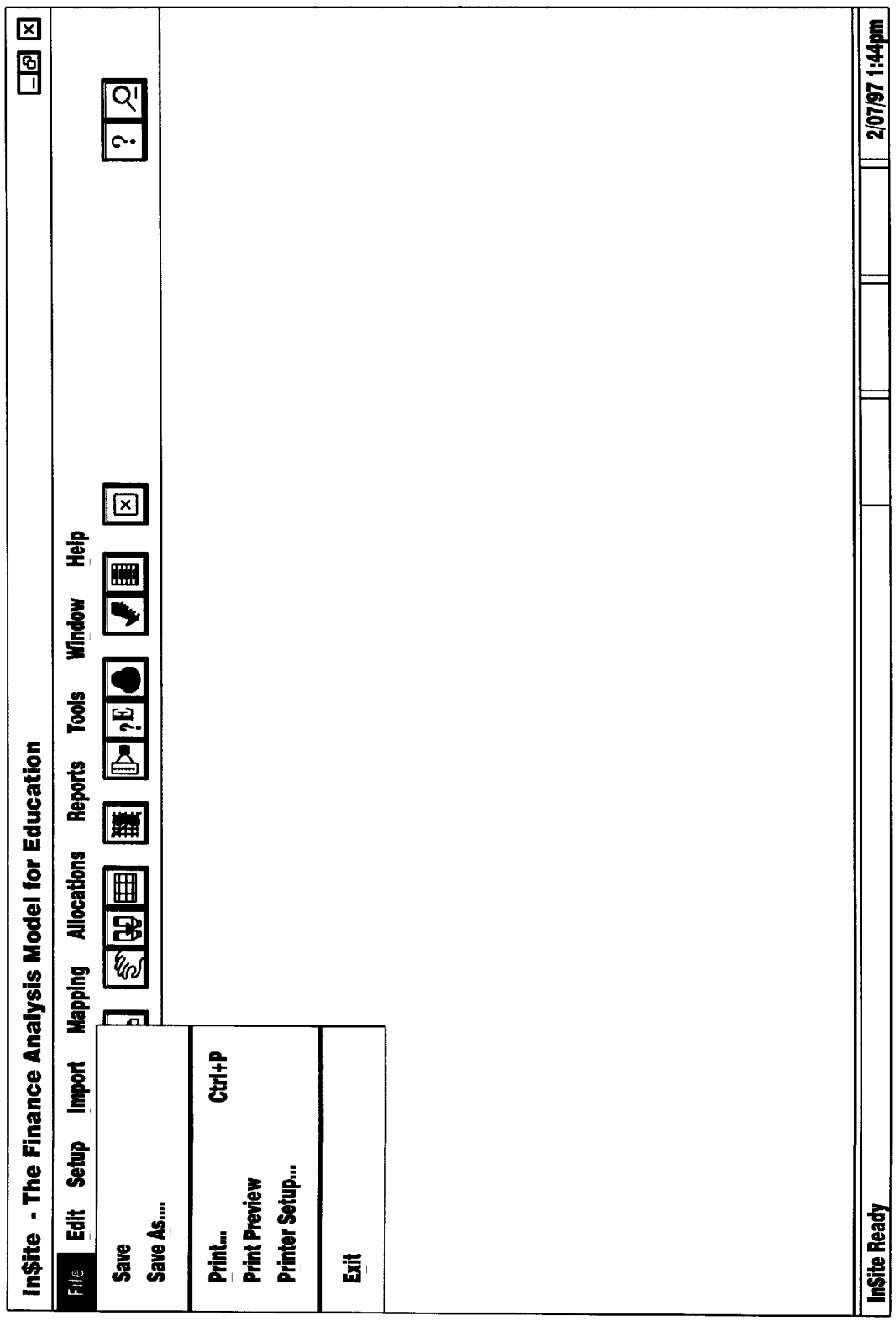
FIGS. 21a–21j show the Menu Bar and the commands of the IN$ITE User Interface.
Figure 21B:
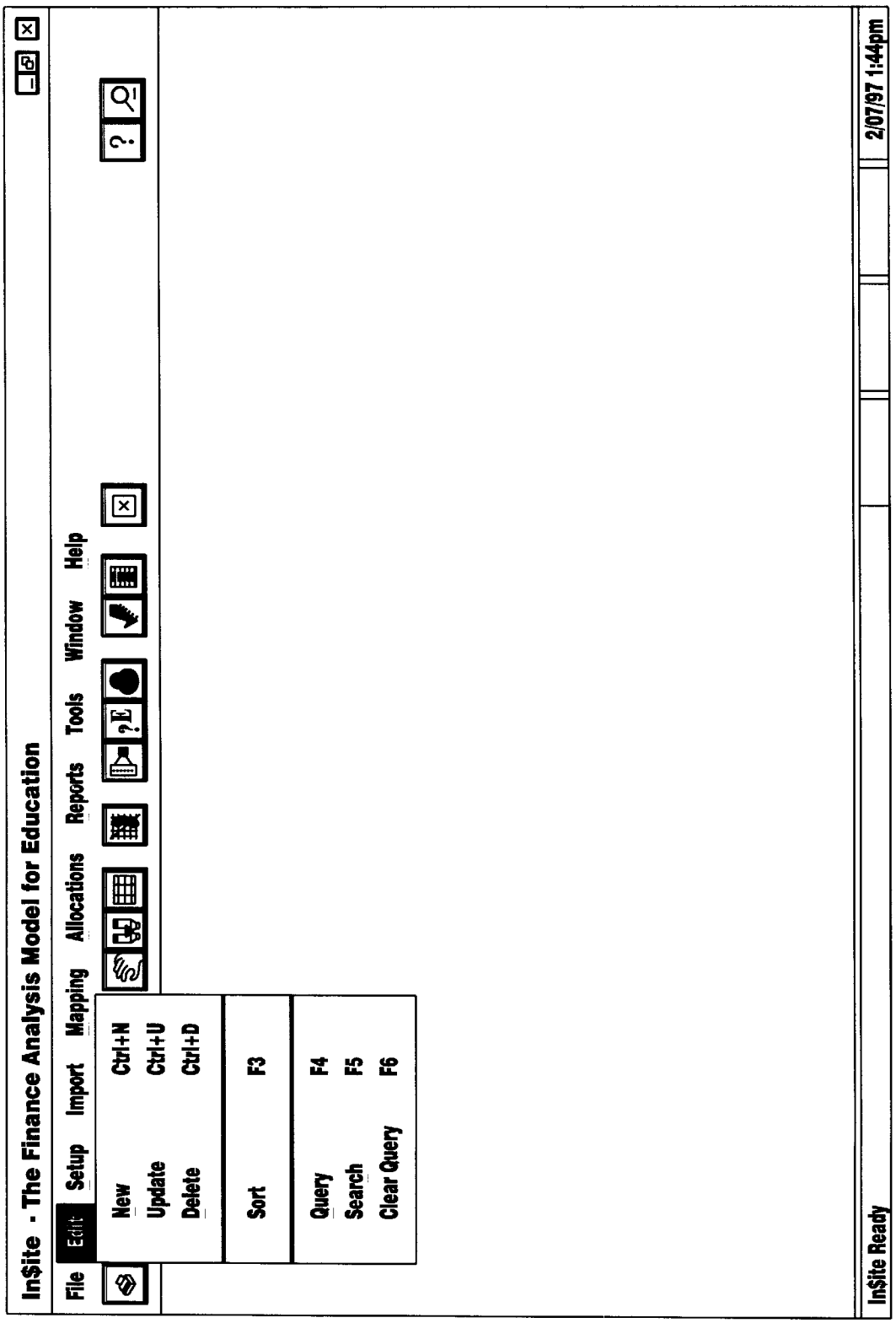
Figure 21C:
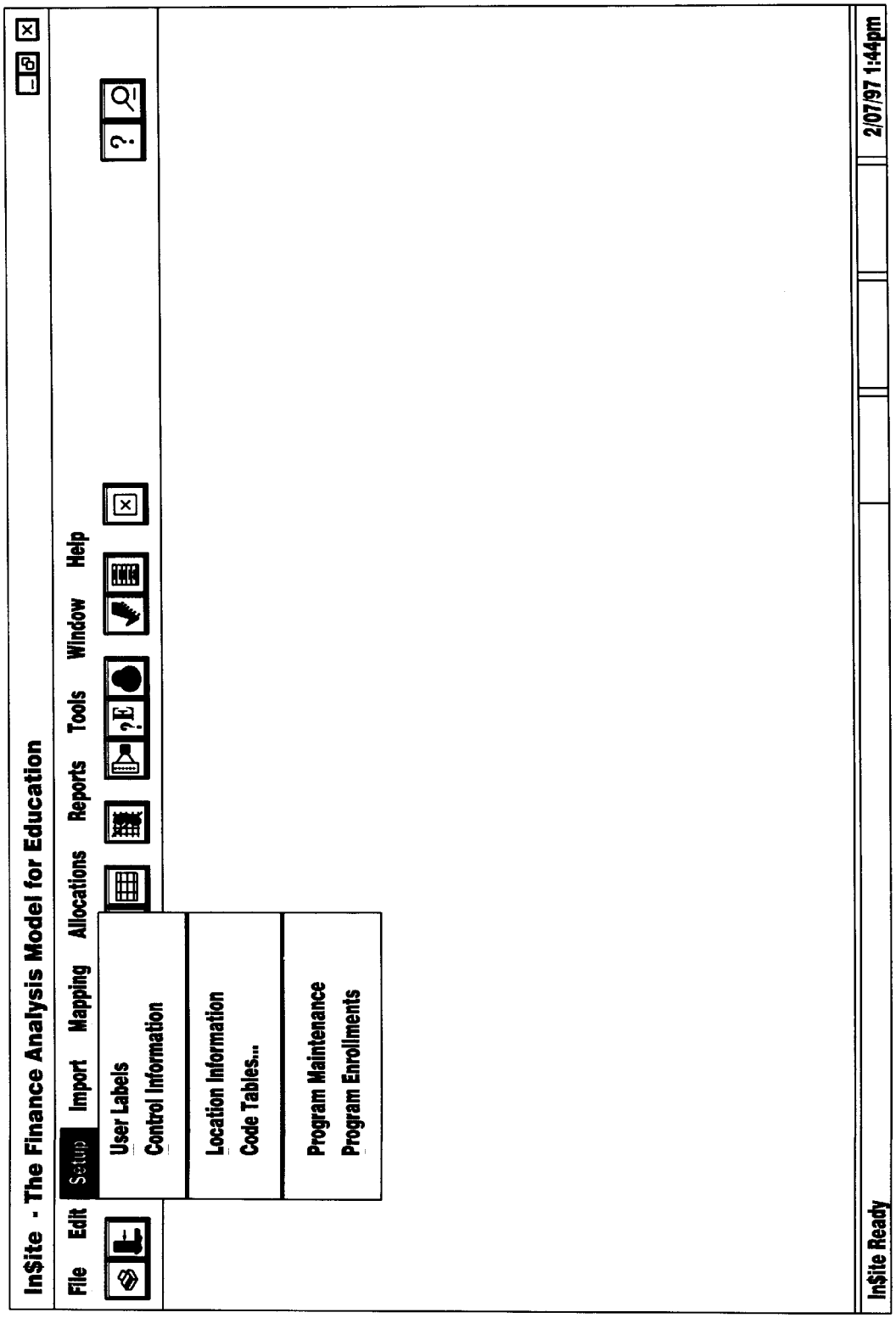
Figure 21D:
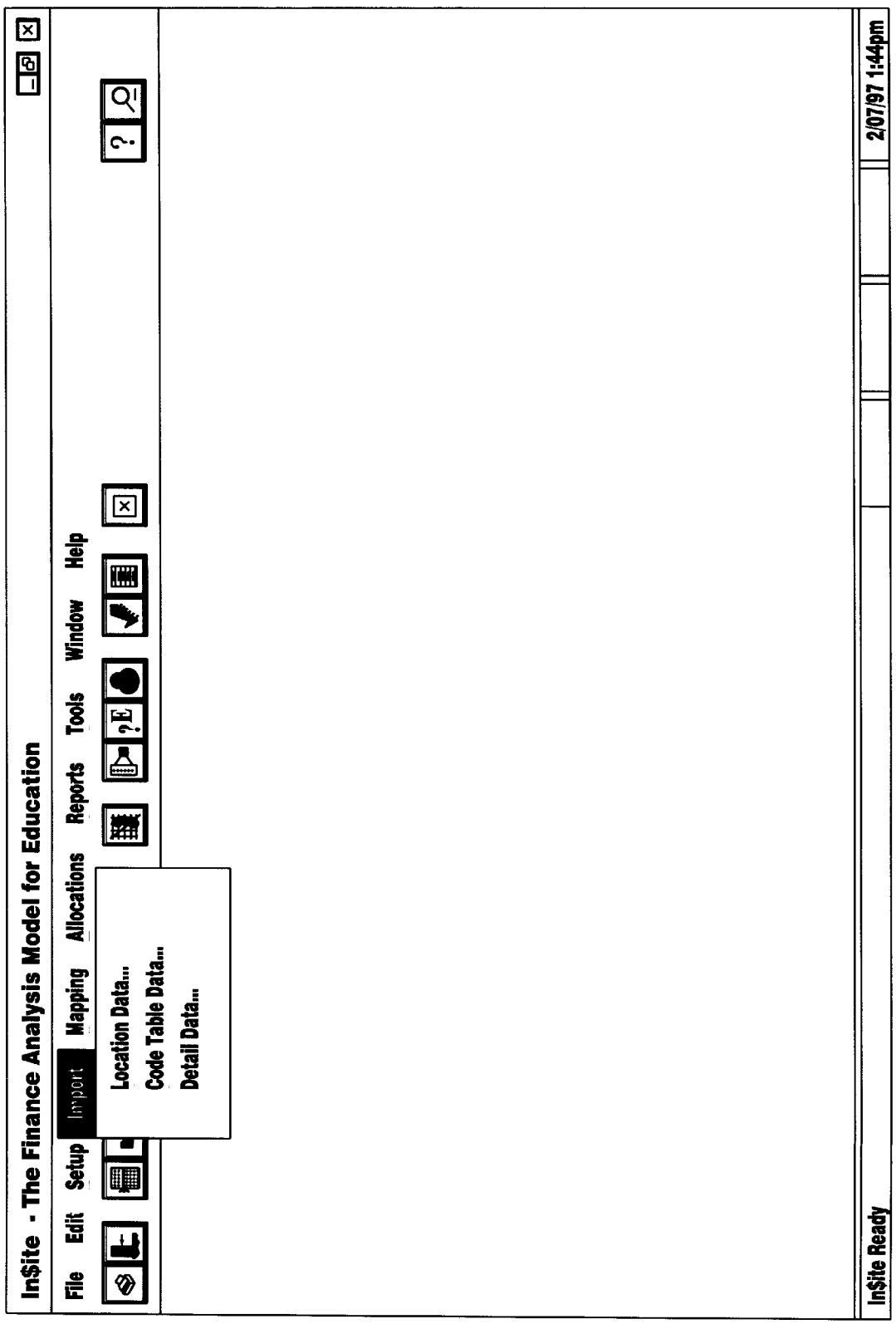
Figure 21E:
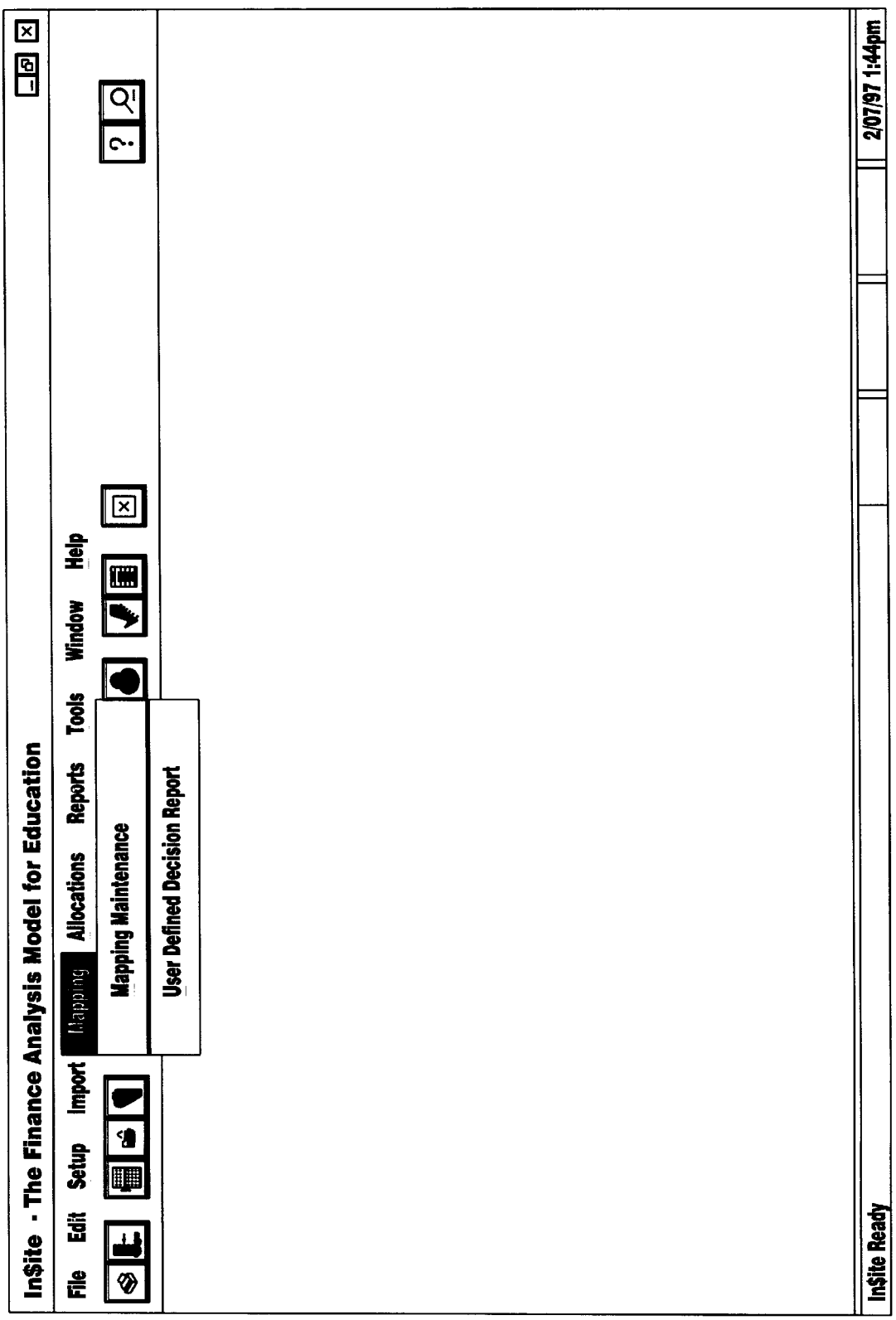
Figure 21F:
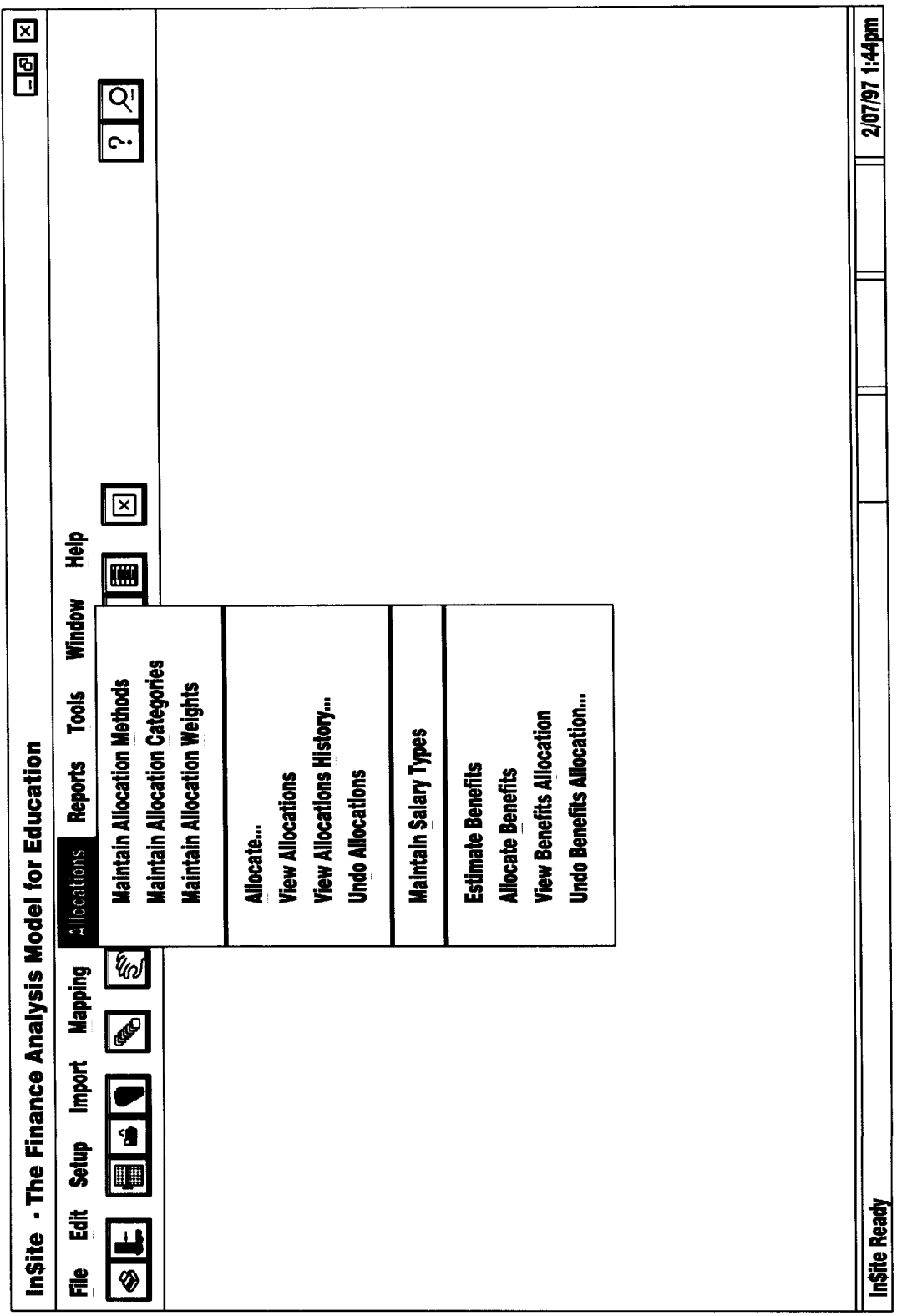
Figure 21G:
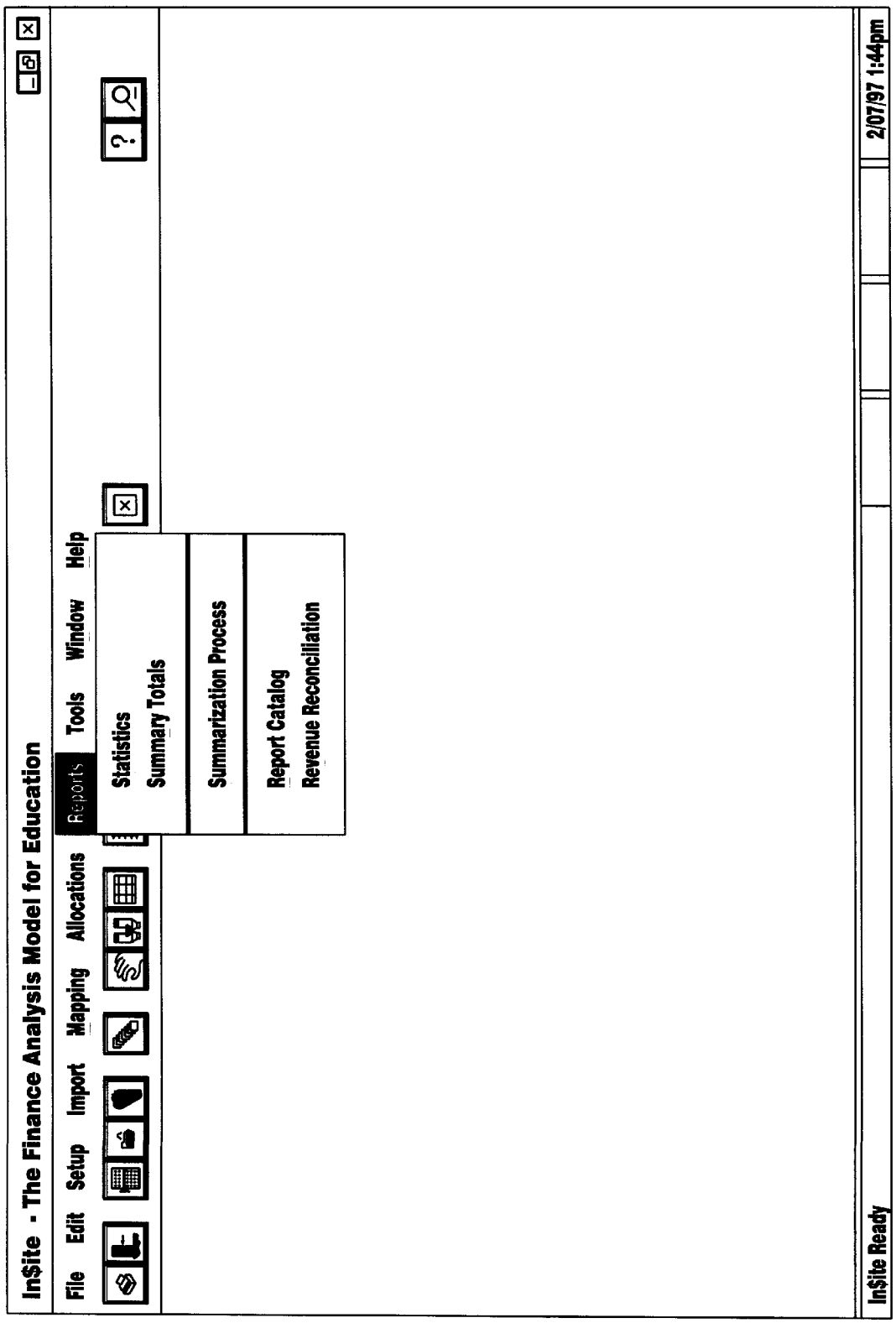
Figure 21H:
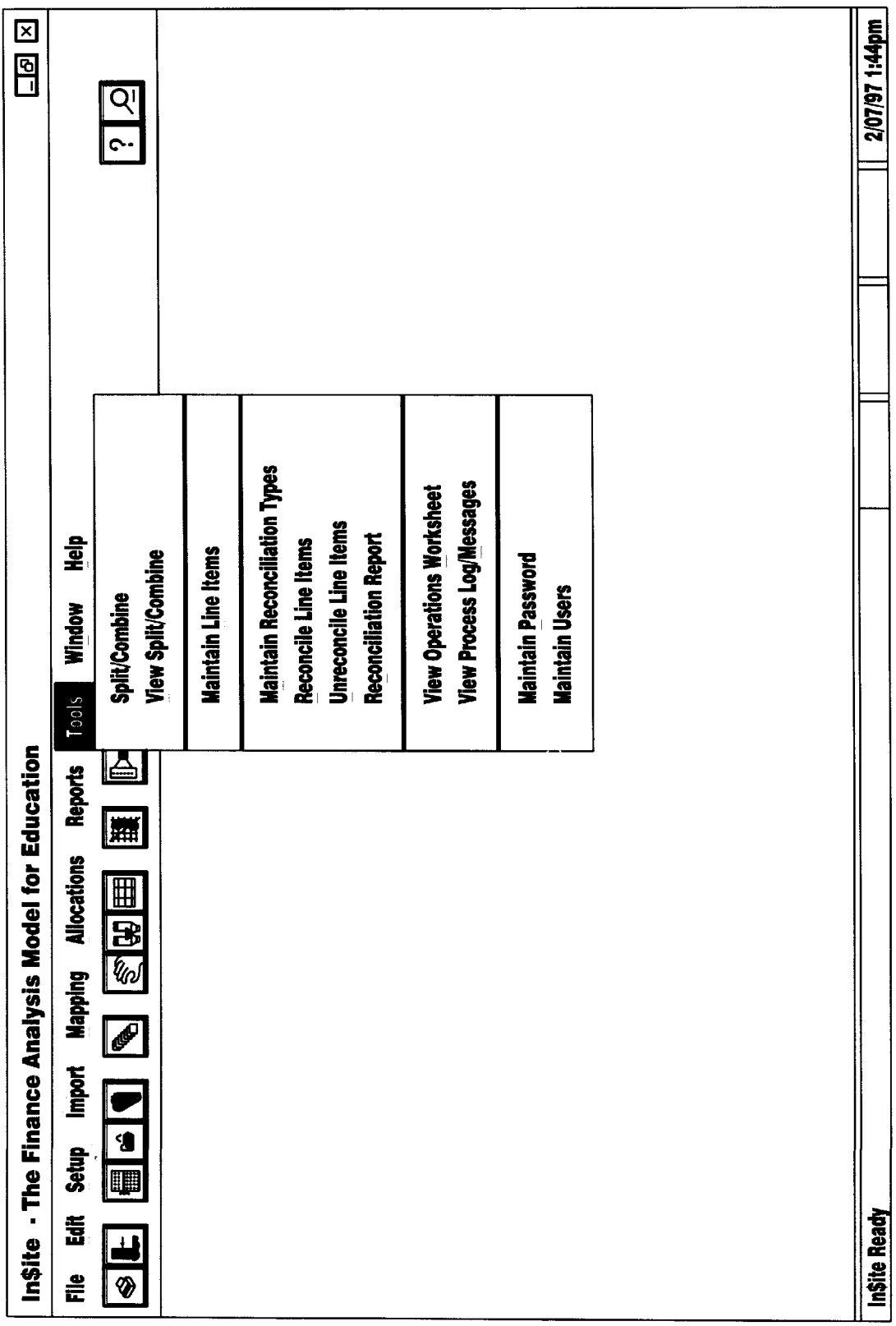
Figure 21I:
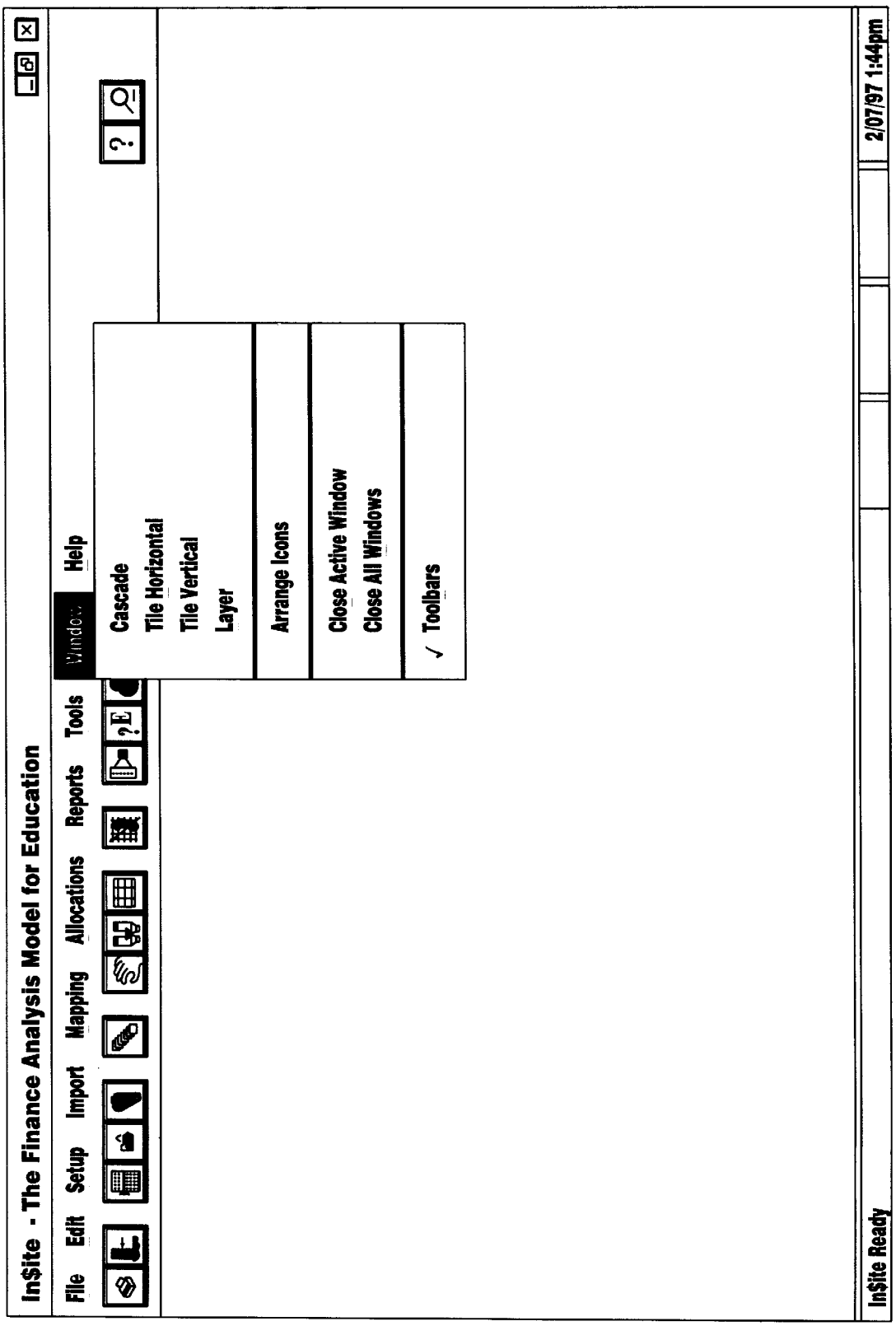
Figure 21J:
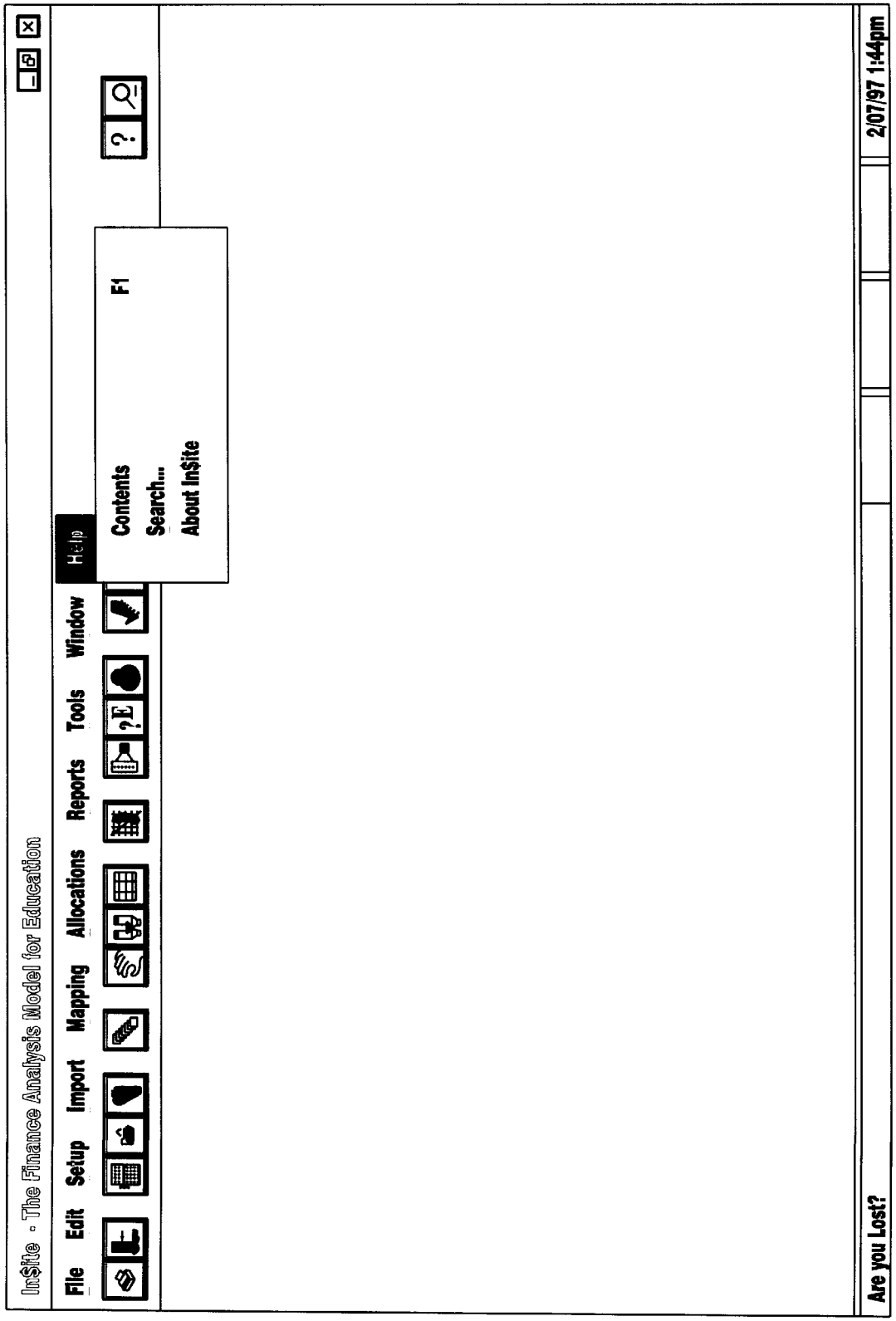

FIG. 21*a* shows the menu bar commands on the IN$ITE user interface. As can be seen, the IN$ITE menu bar offers ten choices to a user—File 2101, Edit 2102, Setup 2103, Import 2104, Mapping 2105, Allocations 2106, Reports 2107, Tools 2108, Window 2109 and Help 2110. Each of these menu choices offers further commands as detailed in FIGS. 21*b*–21*j*. It should be noted that some of these menu commands are common to other programs running on the Microsoft Windows™ operating system.

Figure 22:
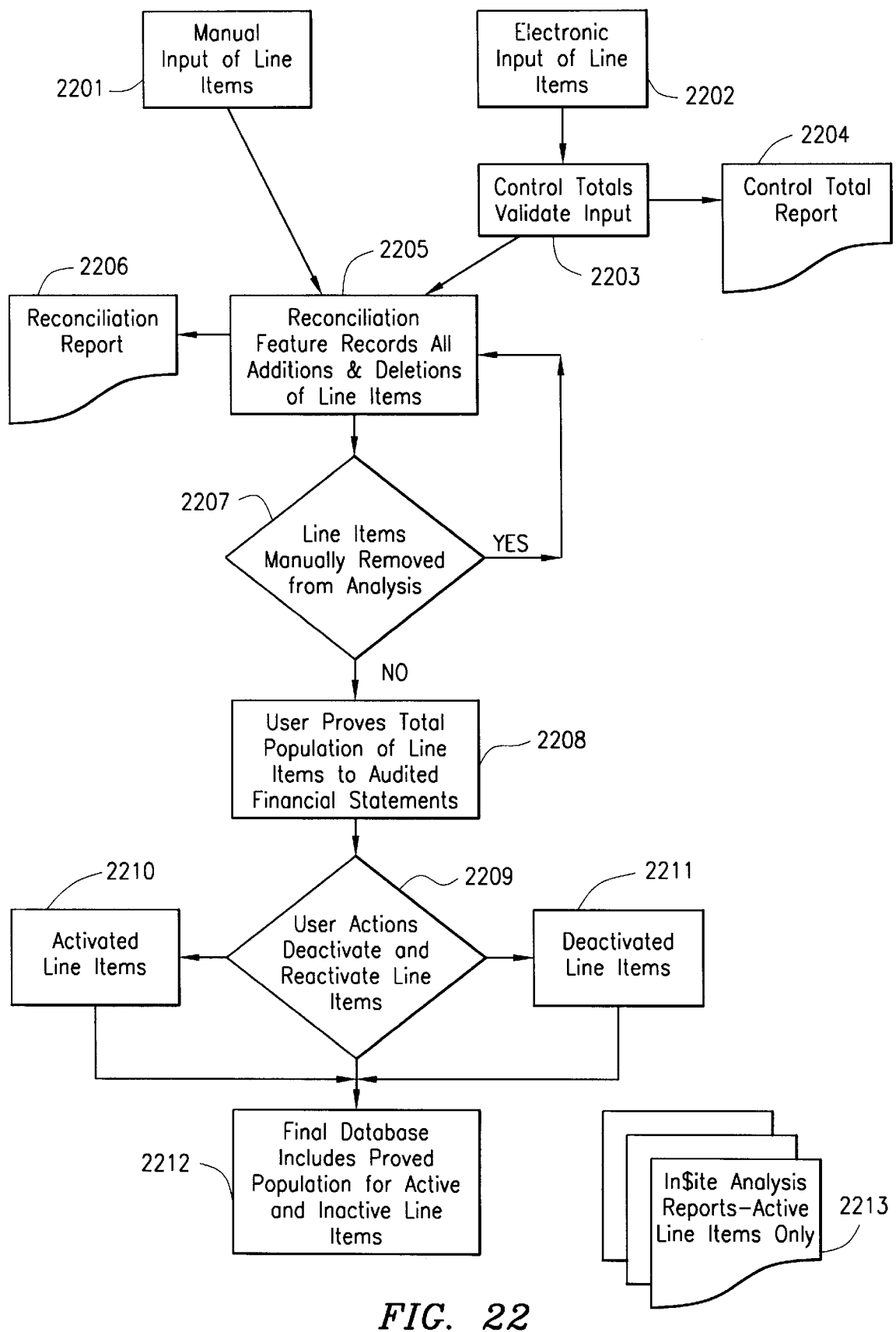
FIG. 22 is an illustrative block diagram of system controls over the addition and deletion of line items in IN$ITE.

FIG. 22 is an illustrative block diagram of system controls over the addition and deletion of line items in IN$ITE. The core unit of analysis in IN$ITE is the Line Item, i.e., one detail line item of expenditure from a general ledger or other data source. Line items can be imported into IN$ITE manually as shown at 2201, or electronically as shown at 2202. When line items are imported electronically, the IN$ITE Control Totals function 2203 enables a user to validate the accuracy of the import process using the optional Control Totals Report 2204.

A Reconciliation function 2205 (and an associated Reconciliation Report 2206) tracks the input and removal of all line items. IN$ITE permits a user to manually remove line items from analysis as shown at 2207. Thus, an user can reconcile the total of all expenditure line items known to IN$ITE with audited financial statements, as shown at 2208. IN$ITE maintains the integrity of the total expenditures being analyzed. IN$ITE automatically adds new line items for functions such as Allocation, Benefit Allocation and Line Splitting.

User control over expenditure totals is maintained by activating or deactivating line items based on user actions as shown at 2209. IN$ITE retains all line items so that the effect of various functions can be reversed using the "Undo" command. A record of all activated and deactivated line items is maintained at 2210 and 2211 respectively. After all activations and deactivations have been finalized, the IN$ITE database includes the proved population for all active and inactive line items as shown at 2212. However, the IN$ITE analysis reports 2213 contain only active line items.

Figure 23:
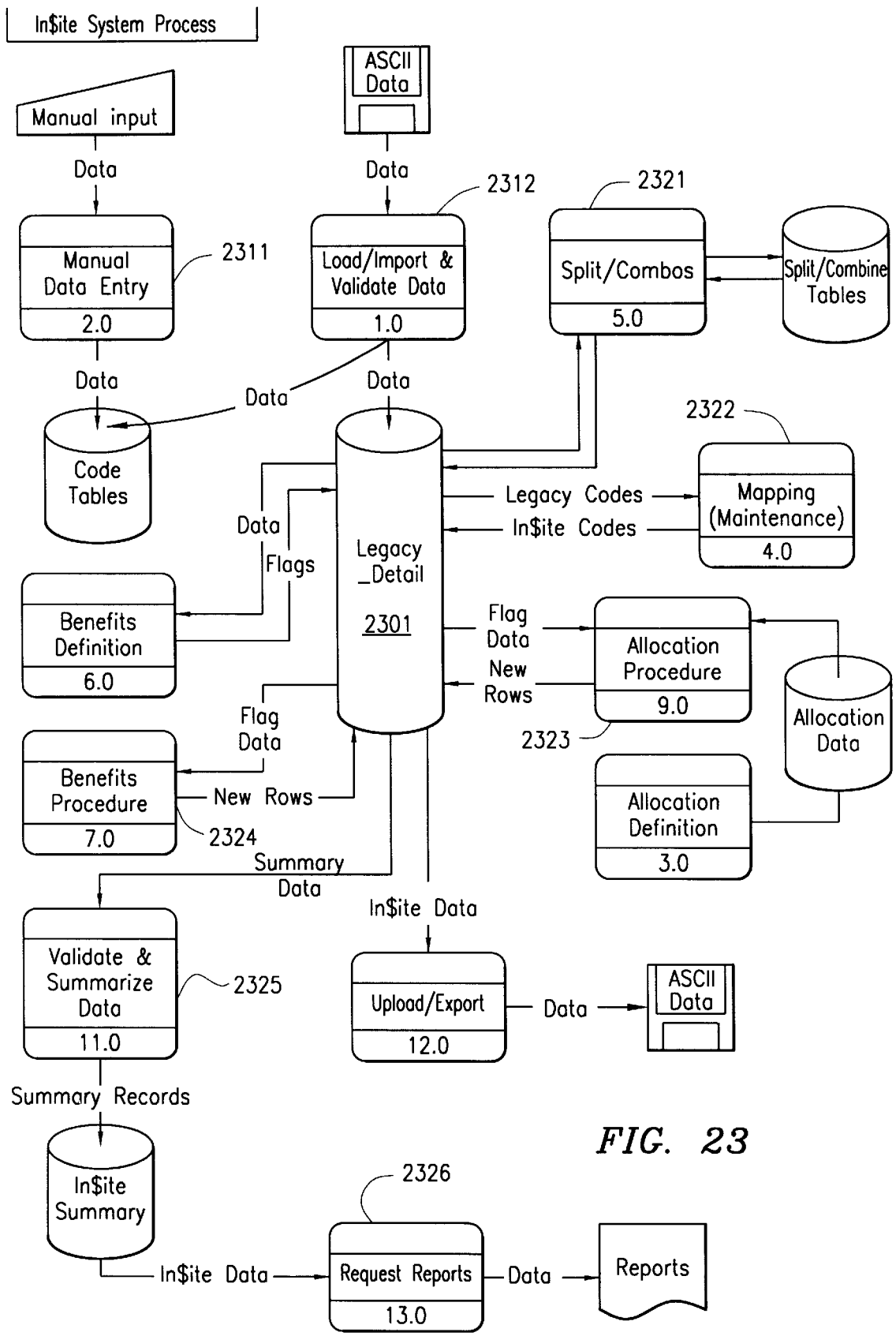
FIG. 23 is a high-level block diagram showing the interaction and data interchange between various IN$ITE System Processes.
Figure 24:
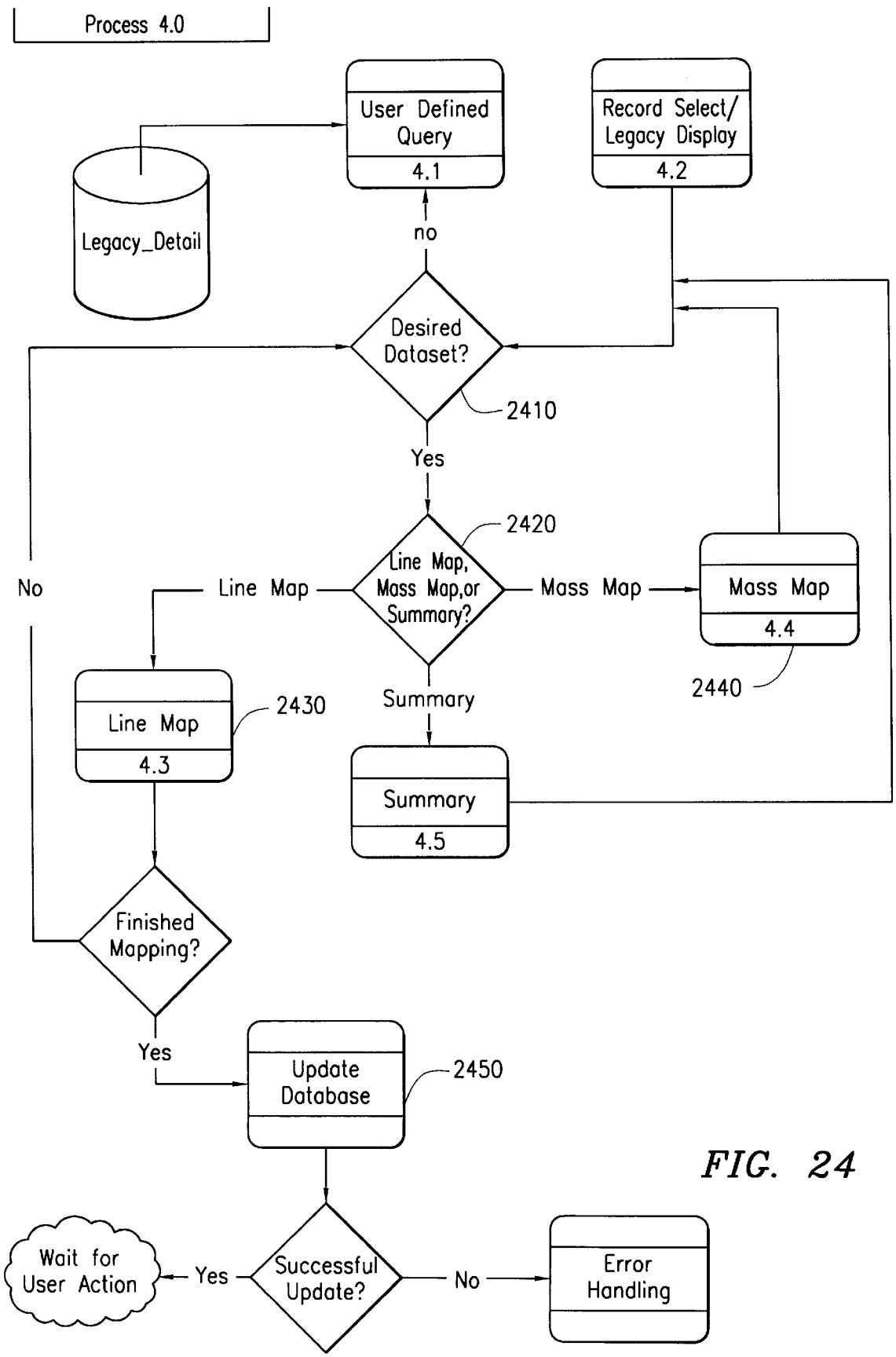
FIG. 24 is a process flow chart detailing the Mapping and Allocation Definition Processes in IN$ITE.
Figure 25:
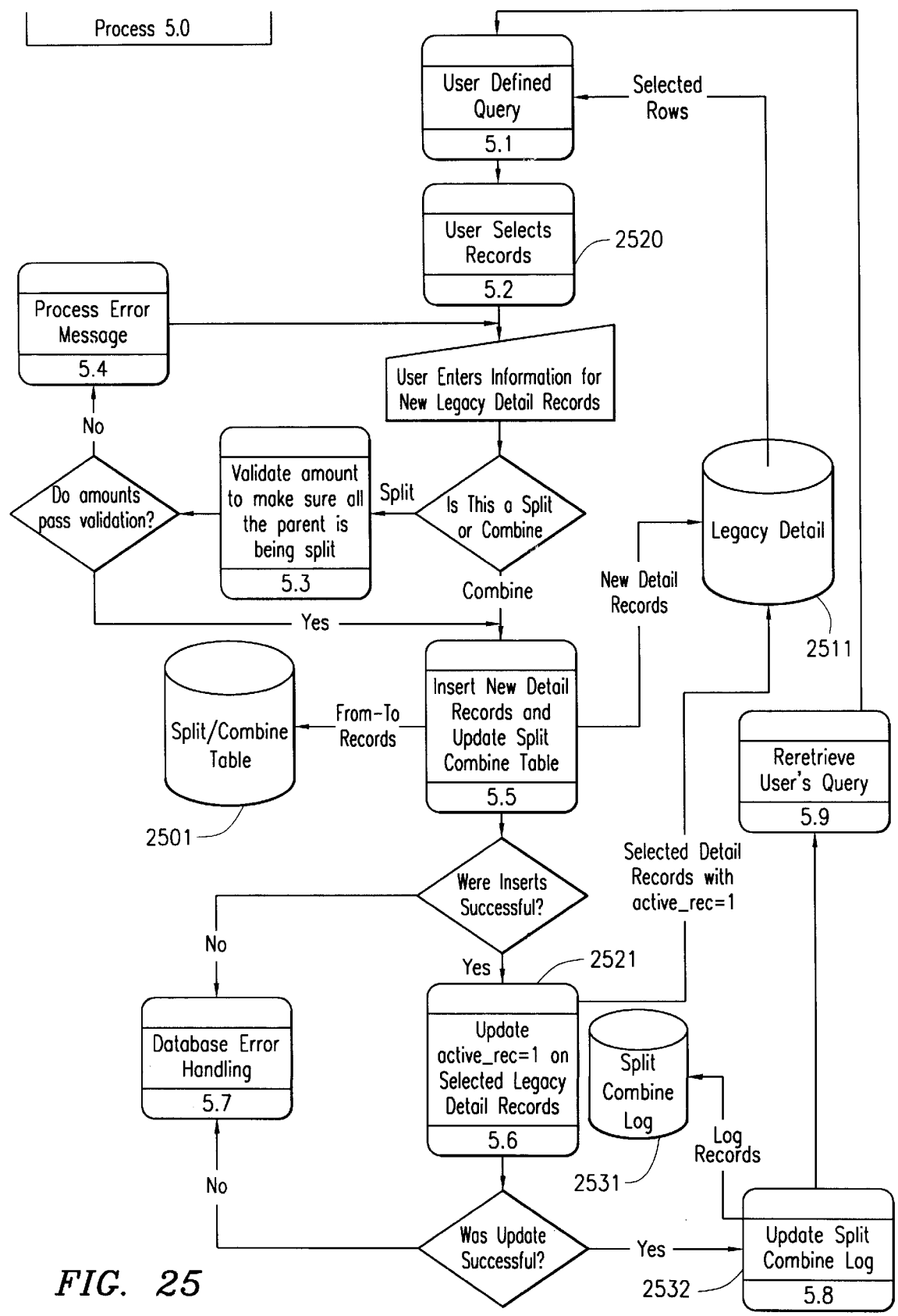
FIG. 25 is a process flow chart detailing the Splits & Combines Process in IN$ITE.
Figure 26:
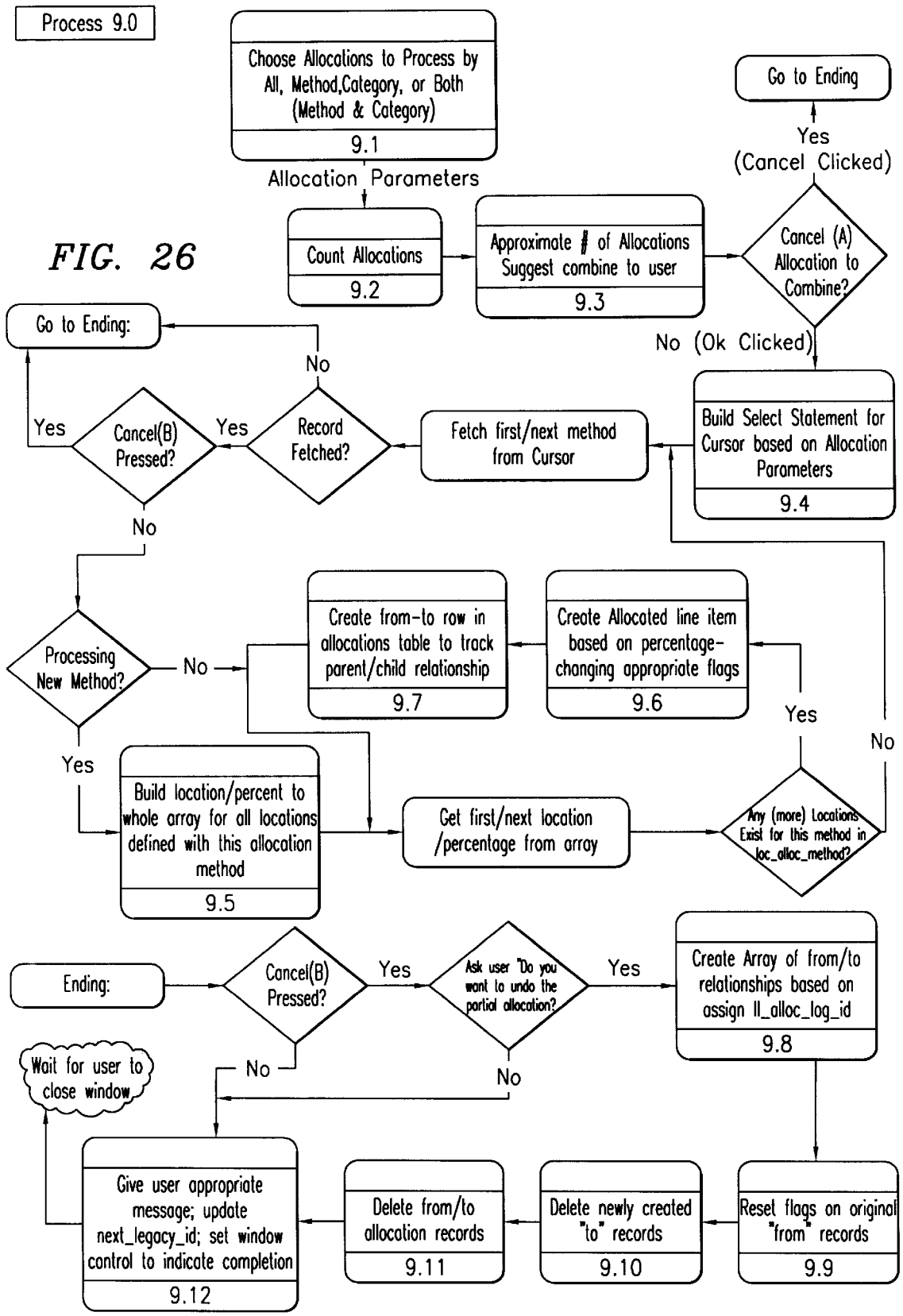
FIG. 26 is a process flow chart detailing the Allocation Process in IN$ITE.

A number of IN$ITE System Processes are shown in FIGS. 23–26. FIG. 23 is a high-level block diagram showing the interaction and data interchange between various IN$ITE System Processes. FIG. 24 is a process flow chart detailing the Mapping and Allocation Definition Processes in IN$ITE. FIG. 25 is a process flow chart of the Splits & Combines Process in IN$ITE. FIG. 26 is a process flow chart of the Allocation Process in IN$ITE.

The IN$ITE System Process diagram shown in FIG. 23 illustrates the major functions of the IN$ITE software. The Legacy_Detail table 2301 maintains the line item expenditures analyzed in IN$ITE. Also illustrated are the manual and electronic data input processes (2311 and 2312 respectively) that are used to populate the Legacy_Detail table 2301 with line item expenditures, the Split and Combine functions 2321, the Mapping function 2322, the Allocation function 2323, the Benefit Allocation function 2324, and the Summarization and Reporting functions 2325 and 2326 respectively.

The Mapping function 2322 enables a user to map a single line item of expenditure or a selected window (or group of expenditures) to an IN$ITE function and program. Mapping is explained further in the FIG. 24.

The Split function enables a user to split the mapping of a single line item to two or more IN$ITE functions. The Combine function enables a user to combine many line items of expenditure, of like-kind, into one line item as a means to manage database size when performing allocations. The Split and Combine functions 2321 are discussed further in conjunction with FIG. 25.

The Allocations function 2323 enables a user to distribute a single line item, or multiple line items, from one location (or site—central or school) to one or many other locations (or sites—central or school). The Allocation function is explained in conjunction with FIG. 26.

IN$ITE provides an interactive, Windows-based user interface for the Mapping function 2322. The Mapping window enables a user to query (i.e., electronically select) a group of line items to be mapped, and provides the ability to assign (or map) those line items to an IN$ITE function and program. As shown in FIG. 24, the first step is to query the desired line items at 2410 and decide at 2420 whether to Line Map (i.e. map one line item at a time), or to Mass Map (i.e. map the entire window of query results of multiple line items at one time). The Mass Map option 2440 automatically saves the mapping action. The Line Map option 2430 requires a user to use the Update command 2450 to save the mapping action. There is no specific "undo" function related to mapping. Mapping revisions are made by simply "overwriting" a previous mapping—i.e. by saving or updating a new mapping for a previously mapped line item.

FIG. 25 illustrates the Split and Combine functions 2321. As the diagram indicates, both Splits and Combines are accessed through a common window—the user selects which function is to be performed at 2520. Split and Combine actions are saved in the system in a Split Combine table 2501 for tracking and "undo" purposes. The resulting line items (children line items) from a Split or Combine update the Legacy_Detail database 2511 with a flag identifying their creation as the result of a Split or of a Combine. The original (parent) line items are appropriately coded as inactive at 2521 with a flag identifying why the line item was terminated. IN$ITE provides data validation to assure that the database properly processed the Split or Combine action. A Split/Combine Log 2531 is created for reporting purposes at 2532. There is a specific "undo" function to reverse a Split or Combine action.

FIG. 26 illustrates selected components of the Allocation function 2323. Before utilizing the Allocation function 2323 a user must map line items to an Allocation Method (e.g., by using the %-to-total method for allocating the line items). The Allocate Command activates the Allocation function. As shown in FIG. 26, the first step performed by IN$ITE is to gather statistics about the scope of the allocation, to display those statistics to the user, and ask the user whether or not the user wants to combine line items to simplify the allocation. The allocation process then creates the new allocation line items based on user selected locations to allocate to, and the %-to-total weights assigned to each location. There is a specific "undo" function for allocations, illustrated at the bottom of the diagram, that enables a user to undo one specific allocation out of many. An Allocations Log enables the undo action to return line items to their status prior to the allocation.

Additional details concerning the use, operation and functioning of the IN$ITE software environment may be found in the earlier-mentioned IN$ITE User's Manual and in the IN$ITE Training Manual entitled IN$ITE™: MANUAL OF INSTRUCTION which is hereby incorporated by reference herein, and in the IN$ITE Quick Reference Guide entitled IN$ITE™: QUICK REFERENCE also hereby incorporated by reference herein. The IN$ITE User's Manual and the IN$ITE Quick Reference Guide are essentially identical to APPENDICES B and C of the earlier-filed provisional patent application.

IN$ITE Reports

IN$ITE'S reports detail expenditures by IN$ITE Function and IN$ITE Program at the school site evel and "roll up" that data into the following categories:

For each school;

By Education Level—Elementary, Middle, High, Alternative, and Other Schools;

By All Schools—All school site expenditures, excluding central district expenditures;

By the Total District—All expenditures of the school district.

The Program dimension of IN$ITE, and related reports categorize all expenditures into six fixed standard programs. The six standard programs are:

Special Education;

Bilingual/ESL;

Chapter I/Title I;

Vocational Education;

Other Programs;

General Education;

IN$ITE'S reports present four key metrics by the dimensions detailed above:

Absolute Dollars Expended—for any population of sites by function and program;

%-To-Total—for a selected category of expenditure;

Per Pupil Expenditures—a common denominator for school-to-school comparisons;

%-To-Total District—to present common denominator metrics for comparison across all schools and al students for total district expenditures, including central office expenditures.

District Level Reports

The following district level reports present roll up summary of total district expenditures. These reports present the total population of expenditure line items.

| | |
|---|---|
| A-1 | Total District - Functions |
| A-2 | Total District - Sub-Functions |
| A-3 | Total District - Detail Functions |
| A-4 | Total District - Program Summary $ |
| A-6 | Total District by Education Level - Summary $ |
| A-8 | Total District by Fund - Summary $ (2 pages of funds) |
| B-1 | School Charged v. Centrally Charged |
| B-2 | Schools, Central Office and Other Commitments |
| B-3 | Direct to Schools, Allocated to Schools, Central & Other |
| C-6 | District - General Education |
| C-7 | District - Special Education Subprograms - $ |
| D-1 | District - Elementary School |

"All Schools" Level Reports

The following "All Schools" reports summarize the roll up of all individual school site expenditures. These reports include the sub-set population of all school expenditures regardless of type of school or grade level of school.

| | |
|---|---|
| E-1 | All Schools - Functions |
| E-3 | All Schools - Detail Functions |
| E-4 | All Schools - Program Summary - $ |
| F-2 | All Schools - Bilingual/ESL |

Elementary Level Reports (There are Similar Reports for Middle, High, Alternative & Other Schools)

The following Elementary sample of Education Level reports is also replicated in IN$ITE for Middle, Alternative and Other schools. The following sample reports include the sub-set of population of all elementary school expenditures.

| | | |
|---|---|---|
| G-3 | All Elementary Schools - Detail Functions | |
| G-4 | Elementary - Program Summary - $ | |
| G-6 | Comparative By Function - Instruction | |
| G-12 | Function Outliers - Instruction | |
| G-20 | Comparative by Program - Chapter 1/Title 1 | |
| G-27 | Program Outliers - Vocational Education | |
| H-5 | All Elementary Schools - Other Programs | |

School Level Reports (for Each School)

The following sample reports represent the lowest locational unit of measure within IN$ITE—the school. These reports reflect the sub-set of expenditures for a school—including both those expenditures charged directly to the school by the district and those allocated to the school using IN$ITE.

| | | |
|---|---|---|
| I-1 | Each Elementary School - Total School Spending (1 page, 1 school) | |
| I-2 | Each Elementary School - Direct v. Allocated (1 page/1 school) | |
| I-3 | Each Elementary School - By Program - Summary $ (1 page/1 school) | |
| I-5 | Each Elementary School - By Program - Per Pupil (1 page/1 school) | |
| I-6 | Each Elementary School - General Education (1 page/1 school) | |
| V-2 | School Amounts Allocated - Instructional Teachers | |

FIGS. 27–35 show a number of sample report formats that can be generated by the IN$ITE software. Other examples may be found in the IN$ITE Report Catalog, entitled LEARNING IN$ITE™: IMPLEMENTING THE FINANCE ANALYSIS MODEL™ which is hereby incorporated by reference herein and is essentially identical to APPENDIX D of the earlier-filed provisional application. The IN$ITE software package was implemented using the Power Builder user-interface development program in conjunction with the SYBASE relational database platform. However, the system and method of the present invention can also be implemented using other programming languages and development environments.

Although a preferred embodiment of the method and apparatus of the present invention has been illustrated in the accompanying drawings and described in the foregoing detailed description, it is to be understood that the invention is not limited to the embodiment(s) disclosed, but is capable of numerous rearrangements, modifications and substitutions without departing from the spirit of the invention as set forth and defined by the following claims.

What is claimed is:

1. A computer readable media storing a software program wherein said software program is based on a relational database, and wherein said software program implements a method for cost accounting and analysis, management reporting, performance assessment and decision support in an educational institution that permits the standardized evaluation and comparison of expenditure data of said educational institution with one or more other institutions to enable cost effective management of said educational institution, wherein said software comprises a method and said method comprising the steps of:

importing line items of financial data from a General Ledger of said educational institution;

classifying selected ones of said imported line items of financial data as benefit expenditure line items;

mapping said imported line items of financial data to a specific and standardized set of Functions, Programs and/or Locations;

allocating selected ones of said imported line items and said classified benefit expenditure line items to one or more Locations based upon user input, said allocation of selected imported line items being performed by an allocations process and said allocation of said classified benefit expenditure line items being performed by a benefits allocation process;

analyzing said allocations and creating summary expenditure data for each Location and wherein said summary expenditure data is internally stored and is externally manipulable in an intermediate format and wherein said intermediate format has multiple basic dimensions which further include a Functional Dimension, a Program Dimension and a Locational Dimension and wherein said Functional Dimension shows expenditures and budgets comprising all of an educational entity's funds and categorizes said expenditures and budgets into at least five classes, including an Instruction class, an Instructional Support class, an Operations class and an Other Commitments and Leadership class; and generating one or more reports based upon the results of said analysis.

2. The method of claim 1 for cost accounting and analysis, management reporting, performance assessment and decision support, wherein said step of importing financial data from said General Ledger system is performed manually.

3. The method of claim 1 for cost accounting and analysis, management reporting, performance assessment and decision support, wherein said step of importing financial data from said General Ledger system is performed automatically by said software program.

4. The method of claim 1 for cost accounting and analysis, management reporting, performance assessment and decision support, wherein said software program acts as an overlay on said General Ledger system or similar financial application program.

5. The method of claim 4 for cost accounting and analysis, management reporting, performance assessment and decision support, wherein regulatory reporting and financial accounting data is further converted into cost accounting and management reporting information.

6. A computer readable media storing a software program wherein said software program is based on a relational database, and wherein said software program implements a method for cost accounting and analysis, management reporting, performance assessment and decision support in an educational institution that permits the standardized evaluation and comparison of expenditure data of said educational institution with other institutions to enable cost effective management of said educational institution, said method comprising the steps of:

installing and customizing said software program to be operable on a selected hardware platform;

determining the format of data to be imported for analysis;

importing metric data and line items of financial data from a General Ledger system of said educational institution;

identifying selected ones of said imported line items of financial data as representing a benefit cost;

mapping said imported line items of financial data to a specific and standardized set of Functions, Programs and/or Locations;

defining one or more allocation methods, each having an associated allocation metric;

selecting one or more of said imported line items of financial data for allocation to one or more of said Locations;

assigning a selected allocation method to each one of said selected line items;

executing an allocations process on said selected line items using said allocation metric that is associated with said selected allocation method;

allocating said identified line items representing benefit cost in said imported line items of financial data to a specific Location using a benefits allocation process;

validating the results of the allocation processes and generating summaries therefrom; and generating one or more reports in a standardized format based upon said generated summaries.

7. The method of claim 6 for cost accounting and analysis, management reporting, performance assessment and decision support, wherein said allocation metric is the number of Full-Time Equivalent (FTEs) Reading Recovery Teachers.

8. The method of claim 6 for cost accounting and analysis, management reporting, performance assessment and decision support, wherein said allocation metric is the number of Special Education Students.

9. The method of claim 6 for cost accounting and analysis, management reporting, performance assessment and decision support, wherein said allocation metric is the number of meals served at each of a select group of Locations.

10. The method of claim 6 for cost accounting and analysis, management reporting, performance assessment and decision support, wherein said allocation metric is the relative value of a centrally-provided service measured using a proprietary or internal charge-back rate such as a Work-Order subsystem.

11. The method of claim 6 for cost accounting and analysis, management reporting, performance assessment and decision support, wherein said allocation metric is the student enrollment at each school-site.

12. The method of claim 6 for cost accounting and analysis, management reporting, performance assessment and decision support, wherein said allocation metric is an externally-generated measure of service utilization such as kilowatt-hours of electricity.

13. The methods of claim 1 or 6 for cost accounting and analysis, management reporting, performance assessment and decision support, wherein said allocations process further comprises the following steps:

selecting an allocation method and category;

identifying one or more of said imported line items as needing to be allocated;

mapping each of said identified line items to said selected allocation method and category;

computing an allocation weight for each of said mapped line items; and obtaining user approval to the creation or deletion of line items based upon said allocations process.

14. The methods of claim 1 or 6 for cost accounting and analysis, management reporting, performance assessment and decision support, wherein said benefits allocations process further comprises the following steps:

identifying one or more of said imported line items as salary line items;

mapping one or more of said identified salary line items to select ones of a defined set of salary types;

identifying one or more of said imported line items as actual benefit expenditure line items;

selecting a distribution percentage for each said salary type;

iteratively estimating the allocation of benefits till the said selection of a distribution percentage results in the allocation all or most of the sum of said identified actual benefit expenditure line items;

mapping any shortfall between actual benefit expenditure line items and estimated benefit expenditure line items to a Function; and providing obtaining user approval to the creation or deletion of line items based upon said benefits allocations process.

15. The method of claim 14 for cost accounting and analysis, management reporting, performance assessment and decision support, wherein said step of iteratively estimating the allocation of benefits is automatically terminated when said shortfall between actual benefit expenditure line items and estimated benefit expenditure line items is found to be less than a selected threshold value.

16. A computer readable media storing a software program wherein said software program is based on a relational database, wherein when executed by a computer said software provides instructions for a system for cost accounting and analysis, management reporting, performance assessment and decision support in an educational institution that permits the standardized evaluation and comparison of expenditure data of said educational institution with one or more other institutions to enable cost effective management of said educational institution, said system comprising:

means for importing line items of financial data from a General Ledger of said educational institution;

means for classifying selected ones of said imported line items of financial data as benefit expenditure line items;

means for mapping said imported line items of financial data to a specific and standardized set of Functions, Programs and/or Locations;

means for allocating selected ones of said imported line items and said classified benefit expenditure line items to one or more Locations based upon user input, said allocation of selected imported line items being performed by means for allocation and said allocation of said classified benefit expenditure line items being performed by means for benefits allocation;

means for analyzing said allocations and creating summary expenditure data for each Location wherein said summary expenditure data is internally stored and is externally manipulable in an intermediate format which has multiple basic dimensions and wherein said basic dimensions further include a Functional Dimension, a Program Dimension and a Locational Dimension and wherein said Functional Dimension shows expenditures and budgets comprising all of an educational entity's finds and categorizes said expenditures and budgets into at least five classes, including an Instruction class, an Instructional Support class, an Operations class and an Other Commitments and Leadership class and wherein said basic dimensions further include a Functional Dimension, a Program Dimension and a Locational Dimension and wherein said Functional Dimension shows expenditures and budgets comprising all of an educational entity's funds and categorizes said expenditures and budgets into at least five classes, including an Instruction class, an Instructional Support class, an Operations class and an Other Commitments and Leadership class; and means for generating one or more reports based upon the results of said analysis, wherein said summary data is internally stored and is externally manipulable in an intermediate format.

17. The system of claim 16 for cost accounting and analysis, management reporting, performance assessment and decision support, wherein said means for importing financial data from said General Ledger system is manual entry of data.

18. The system of claim 16 for cost accounting and analysis, management reporting, performance assessment and decision support, wherein said means for importing financial data from said General Ledger system is an automated process within said software program.

19. The system of claim 16 for cost accounting and analysis, management reporting, performance assessment and decision support, wherein said software program acts as an overlay on said General Ledger system or similar financial application program.

20. The system of claim 19 for cost accounting and analysis, management reporting, performance assessment and decision support, wherein regulatory reporting and financial accounting data is further converted into cost accounting and management reporting information.

21. A computer implemented software system based on a relational database, wherein said system is in the form of a software program stored on a computer readable media, said software program being for cost accounting and analysis, management reporting, performance assessment and decision support in an educational institution that permits the standardized evaluation and comparison of expenditure data of said educational institution with other institutions to enable cost effective management of said educational institution, said system comprising:

means for installing and customizing said software program to be operable on a selected hardware platform;

means for determining the format of data to be imported for analysis;

means for importing metric data and line items of financial data from a General Ledger system of said educational institution;

means for identifying selected ones of said imported line items of financial data as representing a benefit cost;

means for mapping said imported line items of financial data to a specific and standardized set of Functions, Programs and/or Locations;

means for defining one or more allocation methods, each having an associated allocation metric;

means for selecting one or more of said imported line items of financial data for allocation to one or more of said Locations;

means for assigning a selected allocation method to each one of said selected line items;

means for allocating said selected line items using said allocation metric that is associated with said selected allocation method;

means for allocating said identified line items representing benefit cost in said imported line items of financial data to a specific Location using means for benefits allocation;

means for validating the results of the allocation processes and generating summaries therefrom; and means for generating one or more reports in a standardized format based upon said generated summaries.

22. The system of claim 21 for cost accounting and analysis, management reporting, performance assessment and decision support, wherein said allocation metric is the number of Full-Time Equivalent (FTEs) Reading Recovery Teachers.

23. The system of claim 21 for cost accounting and analysis, management reporting, performance assessment and decision support, wherein said allocation metric is the number of Special Education Students.

24. The system of claim 21 for cost accounting and analysis, management reporting, performance assessment and decision support, wherein said allocation metric is the number of meals served at each of a select group of Locations.

25. The system of claim 21 for cost accounting and analysis, management reporting, performance assessment and decision support, wherein said allocation metric is the relative value of a centrally-provided service measured using a proprietary or internal charge-back rate such as a Work-Order subsystem.

26. The system of claim 21 for cost accounting and analysis, management reporting, performance assessment and decision support, wherein said allocation metric is the student enrollment at each school-site.

27. The system of claim 21 for cost accounting and analysis, management reporting, performance assessment and decision support, wherein said allocation metric is an externally-generated measure of service utilization such as kilowatt-hours of electricity.

28. The systems of claim 16 or 21 for cost accounting and analysis, management reporting, performance assessment and decision support, wherein said means for allocation further comprises the following:

means for selecting an allocation method and category;

means for identifying one or more of said imported line items as needing to be allocated;

means for mapping each of said identified line items to said selected allocation method and category;

means for computing an allocation weight for each of said mapped line items; and means for obtaining user approval to the creation or deletion of line items by said means for allocation.

29. The systems of claim 16 or 21 for cost accounting and analysis, management reporting, performance assessment and decision support, wherein said means for benefits allocations further comprises:

means for identifying one or more of said imported line items as salary line items;

means for mapping one or more of said identified salary line items to select ones of a defined set of salary types;

means for identifying one or more of said imported line items as actual benefit expenditure line items;

means for selecting a distribution percentage for each said salary type;

means for iteratively estimating the allocation of benefits till the said selection of a distribution percentage results in the allocation all or most of the sum of said identified actual benefit expenditure line items;

means for mapping any shortfall between actual benefit expenditure line items and estimated benefit expenditure line items to a Function; and means for providing obtaining user approval to the creation or deletion of line items based upon said benefits allocations process.

30. The system of claim 29 for cost accounting and analysis, management reporting, performance assessment and decision support, wherein said means for iteratively estimating the allocation of benefits additionally comprises means for automatically terminating said benefits allocation when said shortfall between actual benefit expenditure line items and estimated benefit expenditure line items is found to be less than a selected threshold value.

* * * * *

UNITED STATES PATENT AND TRADEMARK OFFICE
CERTIFICATE OF CORRECTION

PATENT NO. : 5,991,741

DATED : November 23, 1999

INVENTOR(S) : Speakman, et al.

It is certified that error appears in the above-identified patent and that said Letters Patent is hereby corrected as shown below:

On the Title Page:

[57] Abstract  Last paragraph missing, please insert the following:

--In one aspect, the invention acts as an overlay upon a general ledger or associated financial application program, permitting regulatory reporting and financial accounting data to be converted into cost accounting and management reporting information. In another aspect, the In$ite software is a decision support tool that permits scenario evaluations without impacting upon the integrity of the underlying general ledger data.--

Column 26, line 52  Replace "finds" With --funds--

Signed and Sealed this

Tenth Day of April, 2001

*Attest:*

NICHOLAS P. GODICI

*Attesting Officer*   *Acting Director of the United States Patent and Trademark Office*